(12) United States Patent
Kawana et al.

(10) Patent No.: US 8,451,401 B2
(45) Date of Patent: *May 28, 2013

(54) COLOR IMAGE DISPLAY DEVICE

(75) Inventors: Shin Kawana, Yokohama (JP); Hideaki Kaneda, Ushiku (JP); Naoto Kijima, Yokohama (JP); Naoki Sako, Yokohama (JP); Noriko Endou, Yokohama (JP)

(73) Assignee: Mitsubishi Chemical Corporation, Tokyo (JP)

( * ) Notice: Subject to any disclaimer, the term of this patent is extended or adjusted under 35 U.S.C. 154(b) by 1041 days.

This patent is subject to a terminal disclaimer.

(21) Appl. No.: 12/297,645

(22) PCT Filed: Apr. 19, 2007

(86) PCT No.: PCT/JP2007/058546
§ 371 (c)(1),
(2), (4) Date: Apr. 21, 2009

(87) PCT Pub. No.: WO2007/123183
PCT Pub. Date: Nov. 1, 2007

(65) Prior Publication Data
US 2009/0322990 A1    Dec. 31, 2009

(30) Foreign Application Priority Data
Apr. 19, 2006  (JP) .................. 2006-116018

(51) Int. Cl.
*G02F 1/1335* (2006.01)
*C09K 11/08* (2006.01)
*C09K 11/66* (2006.01)
*C09K 11/77* (2006.01)

(52) U.S. Cl.
USPC ............. 349/69; 252/301.4 F; 252/301.4 R

(58) Field of Classification Search
USPC ............................................. 349/69
See application file for complete search history.

(56) References Cited

U.S. PATENT DOCUMENTS

| 6,717,353 B1 | 4/2004 | Mueller et al. | |
|---|---|---|---|
| 2003/0085853 A1* | 5/2003 | Shiiki et al. ............ | 345/60 |
| 2004/0051111 A1 | 3/2004 | Ota et al. | |

(Continued)

FOREIGN PATENT DOCUMENTS

| CN | 10-1158777 A | 4/2008 |
|---|---|---|
| EP | 1411558 | 4/2004 |

(Continued)

OTHER PUBLICATIONS

Akihiro Mori, Monthly Display, Apr. 2003, pp. 42-47.

(Continued)

*Primary Examiner* — Jessica M Merlin
(74) *Attorney, Agent, or Firm* — Oblon, Spivak, McClelland, Maier & Neustadt, L.L.P.

(57) ABSTRACT

To attain a high color reproducibility as a whole image without impairing the brightness of the entire image. A color image display device comprising a combination of light shutters, a color filter having color elements of at least three colors of red, green and blue corresponding to the light shutters, and a backlight for transmission illumination, wherein a light source to be used for the backlight comprises a combination of a blue or deep blue LED and a phosphor, and the relationship between the NTSC ratio W as a color reproduction range of the color image display element and the light use efficiency Y is represented $Y \geq -0.38W+51$ (wherein $W \geq 87$).

4 Claims, 12 Drawing Sheets

U.S. PATENT DOCUMENTS

| | | | |
|---|---|---|---|
| 2004/0090174 A1 | 5/2004 | Tasch et al. | |
| 2004/0218115 A1* | 11/2004 | Kawana et al. | 349/71 |
| 2005/0077532 A1 | 4/2005 | Ota et al. | |
| 2005/0082574 A1 | 4/2005 | Tasch et al. | |
| 2005/0156496 A1* | 7/2005 | Takashima et al. | 313/237 |
| 2005/0162069 A1 | 7/2005 | Ota et al. | |
| 2005/0189863 A1* | 9/2005 | Nagatomi et al. | 313/486 |
| 2006/0170332 A1* | 8/2006 | Tamaki et al. | 313/498 |
| 2006/0267031 A1 | 11/2006 | Tasch et al. | |
| 2007/0007494 A1 | 1/2007 | Hirosaki et al. | |
| 2007/0090383 A1 | 4/2007 | Ota et al. | |
| 2007/0259206 A1 | 11/2007 | Oshio | |
| 2007/0284994 A1 | 12/2007 | Morimoto et al. | |
| 2008/0128654 A1 | 6/2008 | Oshio | |
| 2008/0182127 A1 | 7/2008 | Oshio | |
| 2008/0191610 A1 | 8/2008 | Oshio | |
| 2008/0211389 A1 | 9/2008 | Oshio | |
| 2008/0212305 A1 | 9/2008 | Kawana et al. | |
| 2008/0258110 A1 | 10/2008 | Oshio | |

FOREIGN PATENT DOCUMENTS

| | | |
|---|---|---|
| EP | 1 865 564 | 12/2007 |
| EP | 1 867 695 | 12/2007 |
| EP | 1 985 683 A1 | 10/2008 |
| EP | 1 995 294 A1 | 11/2008 |
| JP | 2004 134805 | 4/2004 |
| JP | 2004-134805 | 4/2004 |
| JP | 2004-163902 | 6/2004 |
| JP | 2005-336450 | 12/2005 |
| JP | 2006-008721 | 1/2006 |
| JP | 2006 47975 | 2/2006 |
| JP | 2006-047975 | 2/2006 |
| JP | 2006 49799 | 2/2006 |
| JP | 2006-049799 | 2/2006 |
| JP | 2006-309209 | 11/2006 |
| JP | 2006-310817 | 11/2006 |
| JP | 2007-005781 | 1/2007 |
| JP | 2007-025657 | 2/2007 |
| JP | 2007-027796 | 2/2007 |
| JP | 2007-277277 | 10/2007 |
| JP | 2007-318050 | 12/2007 |
| JP | 2008-088399 | 4/2008 |
| JP | 2008-138156 | 6/2008 |
| WO | WO 02/054503 | 7/2002 |
| WO | WO 2004/025359 | 3/2004 |
| WO | WO 2005/052087 | 6/2005 |
| WO | WO 2005/103199 A1 | 11/2005 |
| WO | WO 2005/111707 | 11/2005 |
| WO | WO 2006/098450 | 9/2006 |
| WO | WO 2006/106948 | 10/2006 |
| WO | WO 2007/088966 | 8/2007 |
| WO | WO 2007/091687 | 8/2007 |

OTHER PUBLICATIONS

U.S. Appl. No. 12/766,600, filed Apr. 23, 2010, Kawana, et al.
Extended European Search Report issued Nov. 6, 2009, in Patent Application No. 07741982.8.
Office Communication issued Apr. 23, 2010, in Patent Application No. 07741982.8.

* cited by examiner

Fig. 11
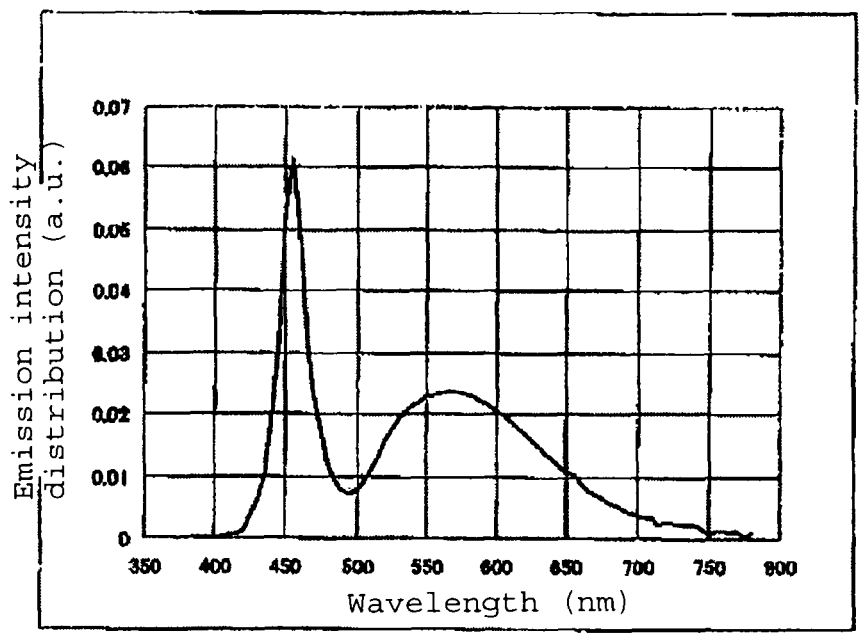
Fig. 12   Color filter for Example 1
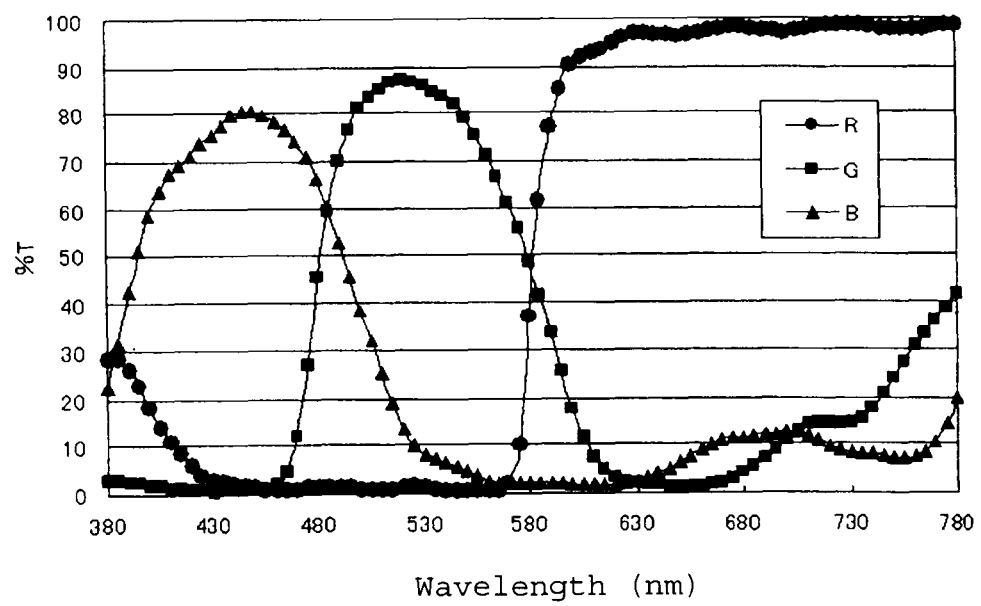

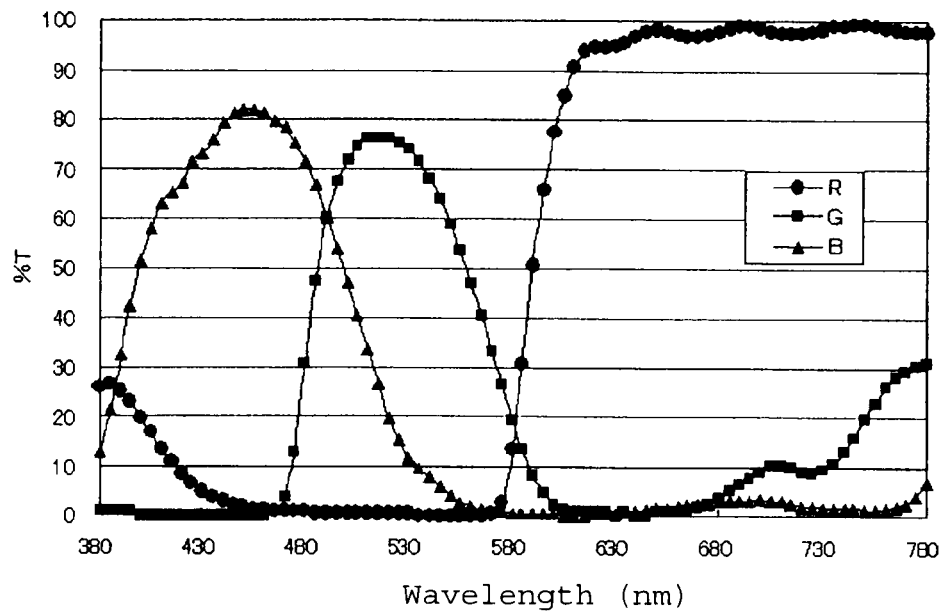
Fig. 21 Color filter for Example 8
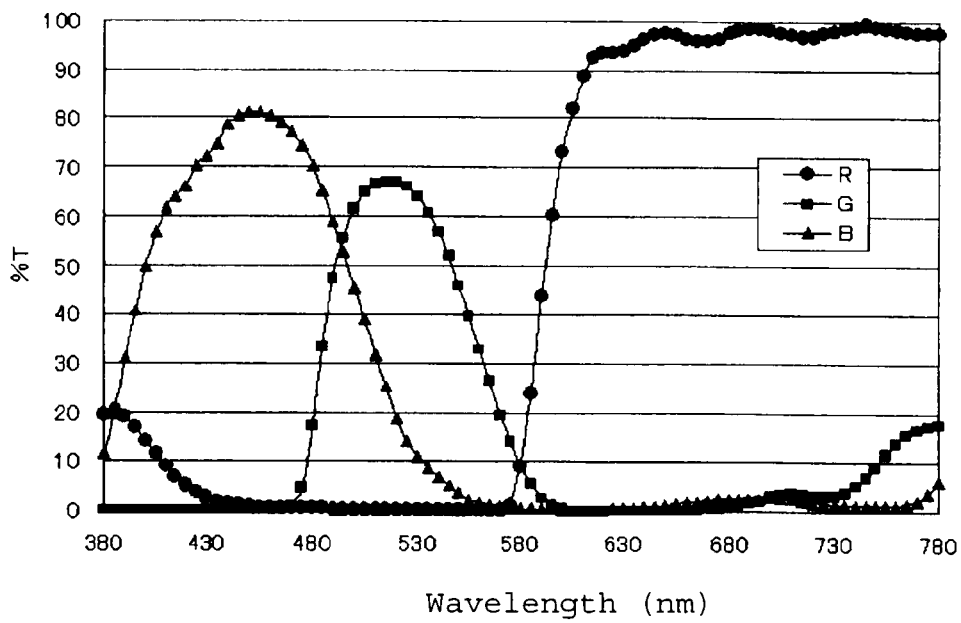
Fig. 22 Color filter for Example 9

COLOR IMAGE DISPLAY DEVICE

TECHNICAL FIELD

The present invention relates to a color image display device. Particularly, it relates to a color image display device to realize an image having a high color purity corresponding to the emission wavelength of an improved LED backlight.

BACKGROUND ART

In recent years, the liquid crystal display elements are expected to be useful not only in the conventional application to personal computer monitors but also in application to ordinary color televisions. The color reproduction range of the color liquid crystal display elements is determined by colors of light emitted from the red, green and blue pixels and, where chromaticity points of the respective color pixels in the CIE XYZ calorimetric system are represented by $(x_R, y_R)$, $(x_G, y_G)$ and $(x_B, y_B)$, the color reproduction range is represented by an area of a triangle defined by these three points on an x-y chromaticity diagram. Namely, the larger the area of this triangle, the more vivid color image the display elements reproduce. The area of this triangle is normally expressed by a ratio of the area of the triangle to an area of a reference triangle formed by three points of the three primary colors, red (0.67, 0.33), green (0.21, 0.71) and blue (0.14, 0.08), in the standard system defined by U.S. National Television System Committee (NTSC) (in unit of %, which will be referred to hereinafter as "NTSC ratio"). The ordinary notebook computers have the values of approximately 40 to 50%, the desktop computer monitors the values of 50 to 60%, and the existing liquid crystal TVs the values of approximately 70%.

In the color liquid crystal display elements, the color filter extracts only wavelengths in necessary regions from the emission distribution of the backlight, to provide the red, green and blue pixels.

Methods for production of this color filter proposed heretofore include such methods as dyeing, pigment dispersion, electrodeposition, printing, ink jetting and so on. The colorants for coloring used to be dyes, but are now pigments in terms of reliability and durability as liquid crystal display elements. Accordingly, at present, the pigment dispersion is most commonly used as a method for production of the color filter from the viewpoint of productivity and performance. In general, when the same colorant is used, the NTSC ratio and the brightness are in a trade-off relation, and the colorant is suitably selected for use depending on the particular application. Namely, if it is attempted to increase the NTSC ratio by adjusting the color filter in order to reproduce a vivid color image, the screen tends to be dark. Inversely, if the brightness is increased, the NTSC ratio tends to be low, and it tends to be difficult to reproduce a vivid image.

On the other hand, as a backlight, it has been common to employ one using as a light source a cold-cathode tube with emission wavelengths in the red, green and blue wavelength regions and using a light guide plate for converting light emitted from this cold-cathode tube, into white area light source. In recent years, a light emitting diode (LED) has been used, since it has a longer operating life, requires no inverter, presents high brightness, is mercury free, etc.

Here, in a conventional LED type backlight, a blue emission from LED and a yellow phosphor obtained by excitation by means of such a blue emission were used as a white area light source.

However, in the above light source, the phosphor was yellow, whereby emission with wavelength unnecessary from the viewpoint of the color purity of red and green was substantial, and it was difficult to obtain a display with high color reproducibility (High Gamut). Here, it is at least in principle possible to increase the color purity of red and green by cutting off light with unnecessary wavelength by means of a color filter, but as mentioned above, if it is attempted to increase the NTSC ratio by adjusting the color filter in order to reproduce the vivid color image, the majority of emission of the backlight will be cut off, whereby there has been a problem that the brightness decreases substantially. Especially, by this method, emission of red decreases substantially, whereby it has been practically impossible to reproduce a strongly reddish color.

In order to overcome this problem, a method of combining red-, green- and blue-emitting LEDs (Non-Patent Document 1) has been proposed, and by this method, a display having an extremely high color reproducibility has been prepared on a trial basis. However, in such a color image display device, LED chips independent for red, green and blue, respectively, are combined, whereby is there have been problems such that 1) it takes time and labor to mount them, 2) since the respective LED chips for red, green and blue are disposed at finite distances, it is required to take the distance of a light guide plate to be long to sufficiently mix emitted lights from the respective LED chips, and 3) since the white chromaticity is adjusted by combining the integral multiple of the respective LED chips, adjustment of the white balance can not be continuously carried out.

Further, a color image display device having an NTSC ratio of at least 60% has been disclosed which is constituted by a combination of a blue or deep blue LED and a phosphor (Patent Document 2). With this color image display device, a high color reproducibility may be attained as compared with the above mentioned yellow phosphor, but emitted lights with wavelengths which are unnecessary from the viewpoint of the color purity of red and green, are substantial, and a still higher color reproducibility has been desired.

Non-Patent Document 1: Monthly display, April 2003 issue (p 42-46)

Patent Document 2: WO2005/111707

DISCLOSURE OF THE INVENTION

Object to be Accomplished by the Invention

The present invention has been made under these circumstances, and it is an object of the present invention to provide a color image display device which is capable of attaining high color reproducibility as an entire image by adjustment with a color filter without impairing the brightness of the image even with a LED backlight and whereby adjustment of the white balance is easy without impairing the productivity from the viewpoint of the mounting by carrying out emission of red, green and blue by one chip.

Means to Accomplish the Object

As a result of an extensive study, the present inventors have found it possible to improve the entire performance of a color image display device by having the NTSC ratio and the light use efficiency closely related to each other.

As mentioned above, heretofore, the NTSC ratio and the light use efficiency were in a trade-off relation to each other, and in a case where it was attempted to improve the performance of a color image display device, the main aim used to be either to improve the NTSC ratio at the sacrifice of the light use efficiency or to improve the light use efficiency at the sacrifice of the NTSC ratio.

Whereas, the present inventors have found a backlight whereby the light emission efficiency can be set at a level higher than ever by combining a plurality of phosphors having improved emission wavelengths, which undergo emission (excitation) efficiently by LED having a specific emission wavelength.

Further, they have found it possible to realize an image display having a high color purity by combining such a backlight with a color filter most suitable to the emission wavelength of the backlight, namely, to realize a color image display device having a light use efficiency higher than ever even at a high NTSC ratio.

The present invention is based on such discoveries and provides the following (A) to (F).

(A) A color image display device comprising a combination of light shutters, a color filter having color elements of at least three colors of red, green and blue corresponding to the light shutters, and a backlight for transmission illumination, wherein a light source to be used for the backlight comprises a combination of a blue or deep blue LED and a phosphor, and the relationship between the NTSC ratio W as a color reproduction range of the color image display element and the light use efficiency Y is represented by the following formula:

$$Y \geq -0.38W + 51 \quad (\text{wherein } W \geq 87)$$

$$X = \frac{\int_{380}^{780} \bar{x}(\lambda) S(\lambda) T(\lambda) d\lambda}{\int_{380}^{780} \bar{y}(\lambda) S(\lambda) d\lambda} \quad x = \frac{X}{X+Y+Z}$$

$$Y = \frac{\int_{380}^{780} \bar{y}(\lambda) S(\lambda) T(\lambda) d\lambda}{\int_{380}^{780} \bar{y}(\lambda) S(\lambda) d\lambda} \quad y = \frac{Y}{X+Y+Z}$$

$$Z = \frac{\int_{380}^{780} \bar{z}(\lambda) S(\lambda) T(\lambda) d\lambda}{\int_{380}^{780} \bar{y}(\lambda) S(\lambda) d\lambda}$$

wherein the definitions of the respective symbols are as follows:

$\bar{x}(\lambda), \bar{y}(\lambda), \bar{z}(\lambda)$: color-matching functions of XYZ calorimetric system, $S(\lambda)$: relative emission spectrum of the backlight, $T(\lambda)$: transmittance of the color filter.

(B) A color image display device comprising a combination of light shutters, a color filter having color elements of at least three colors of red, green and blue corresponding to the light shutters, and a backlight for transmission illumination, wherein a light source to be used for the backlight comprises a combination of a blue or deep blue LED and a phosphor, and when the color reproduction range of the color image display element is a NTSC ratio of 74%, the light use efficiency $Y_1$ as defined below is at least 28%:

$$X = \frac{\int_{380}^{780} \bar{x}(\lambda) S(\lambda) T(\lambda) d\lambda}{\int_{380}^{780} \bar{y}(\lambda) S(\lambda) d\lambda} \quad x = \frac{X}{X+Y_1+Z}$$

$$Y_1 = \frac{\int_{380}^{780} \bar{y}(\lambda) S(\lambda) T(\lambda) d\lambda}{\int_{380}^{780} \bar{y}(\lambda) S(\lambda) d\lambda} \quad y = \frac{Y}{X+Y_1+Z}$$

$$Z = \frac{\int_{380}^{780} \bar{z}(\lambda) S(\lambda) T(\lambda) d\lambda}{\int_{380}^{780} \bar{y}(\lambda) S(\lambda) d\lambda}$$

wherein the definitions of the respective symbols are as follows:

$\bar{x}(\lambda), \bar{y}(\lambda), \bar{z}(\lambda)$: color-matching functions of XYZ calorimetric system, $S(\lambda)$: relative emission spectrum of the backlight, $T(\lambda)$: transmittance of the color filter.

(C) A color image display device comprising a combination of light shutters, a color filter having color elements of at least three colors of red, green and blue corresponding to the light shutters, and a backlight for transmission illumination, wherein a light source to be used for the backlight comprises a combination of a blue or deep blue LED and a phosphor, and when the color reproduction range of the color image display element is a NTSC ratio of 85%, the light use efficiency $Y_2$ as defined below is at least 25%:

$$X = \frac{\int_{380}^{780} \bar{x}(\lambda) S(\lambda) T(\lambda) d\lambda}{\int_{380}^{780} \bar{y}(\lambda) S(\lambda) d\lambda} \quad x = \frac{X}{X+Y_2+Z}$$

$$Y_2 = \frac{\int_{380}^{780} \bar{y}(\lambda) S(\lambda) T(\lambda) d\lambda}{\int_{380}^{780} \bar{y}(\lambda) S(\lambda) d\lambda} \quad y = \frac{Y}{X+Y_2+Z}$$

$$Z = \frac{\int_{380}^{780} \bar{z}(\lambda) S(\lambda) T(\lambda) d\lambda}{\int_{380}^{780} \bar{y}(\lambda) S(\lambda) d\lambda}$$

wherein the definitions of the respective symbols are as follows:

$\bar{x}(\lambda), \bar{y}(\lambda), \bar{z}(\lambda)$: color-matching functions of XYZ calorimetric system, $S(\lambda)$: relative emission spectrum of the backlight, $T(\lambda)$: transmittance of the color filter.

(D) A color image display device comprising a combination of light shutters, a color filter having color elements of at least three colors of red, green and blue corresponding to the light shutters, and a backlight for transmission illumination, wherein a light source to be used for the backlight comprises a combination of a blue or deep blue LED and a phosphor, and when the color reproduction range of the color image display element is a NTSC ratio of 94%, the light use efficiency $Y_3$ as defined below is at least 15%:

$$X = \frac{\int_{380}^{780} \bar{x}(\lambda) S(\lambda) T(\lambda) d\lambda}{\int_{380}^{780} \bar{y}(\lambda) S(\lambda) d\lambda} \quad x = \frac{X}{X+Y_3+Z}$$

$$Y_3 = \frac{\int_{380}^{780} \bar{y}(\lambda) S(\lambda) T(\lambda) d\lambda}{\int_{380}^{780} \bar{y}(\lambda) S(\lambda) d\lambda} \quad y = \frac{Y}{X+Y_3+Z}$$

-continued $$Z = \frac{\int_{380}^{780} \bar{z}(\lambda)S(\lambda)T(\lambda)d\lambda}{\int_{380}^{780} \bar{y}(\lambda)S(\lambda)d\lambda}$$

wherein the definitions of the respective symbols are as follows:

$\bar{x}(\lambda)$, $\bar{y}(\lambda)$, $\bar{z}(\lambda)$: color-matching functions of XYZ calorimetric system, $S(\lambda)$: relative emission spectrum of the backlight, $T(\lambda)$: transmittance of the color filter.

(E) A color image display device comprising a combination of light shutters, a color filter having color elements of at least three colors of red, green and blue corresponding to the light shutters, and a backlight for transmission illumination, wherein the backlight has a phosphor layer or a phosphor film, and the phosphor layer or the phosphor film contains a compound which contains a crystal phase represented by the following formula (2A) and which, when an object color is represented by a L*a*b* color system, satisfies:

$L^* \geq 90$, $a^* \leq -20$, $b^* \geq 30$, and $\{a^*/b^*\} \leq -0.45$;

$(M^I_{(1-x)}M^{II}_x)_\alpha SiO_\beta$ (2A)

in the above formula (2A), $M^I$ is at least one element selected from the group consisting of Ba, Ca, Sr, Zn and Mg, $M^{II}$ is at least one metal element which may take bivalent and trivalent atomic valencies, provided that the molar ratio of a bivalent element based on the entire $M^{II}$ is from 0.5 to 1, and x, α and β are numbers satisfying, respectively:

$0.01 \leq x < 0.3$, $1.5 \leq \alpha \leq 2.5$, and $3.5 \leq \beta \leq 4.5$.

(F) A color image display device comprising a combination of light shutters, a color filter having color elements of at least three colors of red, green and blue corresponding to the light shutters, and a backlight for transmission illumination, wherein the backlight has a phosphor layer or a phosphor film, and the phosphor layer or the phosphor film contains a compound represented by the following formula (2B):

$M1_x Ba_y M2_z L_u O_v N_w$ (2B)

in the above formula (2B), M1 is at least one activating element selected from the group consisting of Cr, Mn, Fe, Ce, Pr, Nd, Sm, Eu, Tb, Dy, Ho, Er, Tm and Yb, M2 is at least one bivalent metal element selected from the group consisting of Sr, Ca, Mg and Zn, L is a metal element selected from metal elements belonging to Groups 4 and 14 of the Periodic Table, and x, y, z, u, v and w are numerical values within the following ranges, respectively:

$0.00001 \leq x \leq 3$, $0 \leq y \leq 2.99999$, $2.6 \leq x+y+z \leq 3$, $0 < u \leq 11$, $6 < v \leq 25$, and $0 < w \leq 17$.

In the above description, "a color image display device" means an entire construction including not only light shutters, a color filter and a backlight but also their driving circuits, control circuits, etc., which is capable of displaying a color image in a state controlled in accordance with input signals.

Further, "a color image display element" means a construction to emit light from the backlight through the light shutters and color filter, having a construction to control the driving of the optical shutters and backlight excluded from the "color image display device".

Effects of the Invention

According to the color image display device of the present invention, it is possible to provide a color image display device whereby reproduction of deep red and green is realized without impairing the brightness of an image even by a LED backlight; a high color reproducibility as a whole image can be accomplished; emission of red, green and blue is carried out by one chip, whereby the productivity will not be impaired by its mounting; and yet adjustment of the white balance is easy.

BRIEF DESCRIPTION OF THE DRAWINGS

FIG. 11 is a relative emission spectrum of a backlight 7 obtained in Preparation Example 7.

FIG. 12 is a transmittance spectrum of a color filter for Example 1.

FIG. 21 is a transmittance spectrum of a color filter for Example 8.
FIG. 22 is a transmittance spectrum of a color filter for Example 9.

DESCRIPTION OF REFERENCE SYMBOLS

| | |
|---|---|
| 1: | Light emitting diode |
| 2: | Light guide plate |
| 3: | Light diffuser sheet |
| 4, 10: | Polarizers |
| 5, 8: | Glass substrates |
| 6: | TFE |
| 7: | Liquid crystal |
| 9: | Color filter |
| 11: | Light guide member |
| 12: | Array |
| 13: | Light control sheet |
| 14, 14': | Light extracting mechanisms |
| 15: | Reflecting sheet |

BEST MODE FOR CARRYING OUT THE INVENTION

Now, embodiments of the color image display device of the present invention will be described in detail, but they are examples of practical modes of the present invention, and the present invention is by no means thereby restricted.

The color image display device of the present invention is one comprising a combination of light shutters, a color filter having color elements of at least three colors of red, green and blue corresponding to the light shutters, and a backlight for transmission illumination. Its specific construction is not particularly limited. However, a color liquid crystal display device of TFT (thin film transistor) type may, for example, be mentioned, whereby the light shutters are light shutters utilizing liquid crystal, as shown in FIG. 1.

Figure 1:
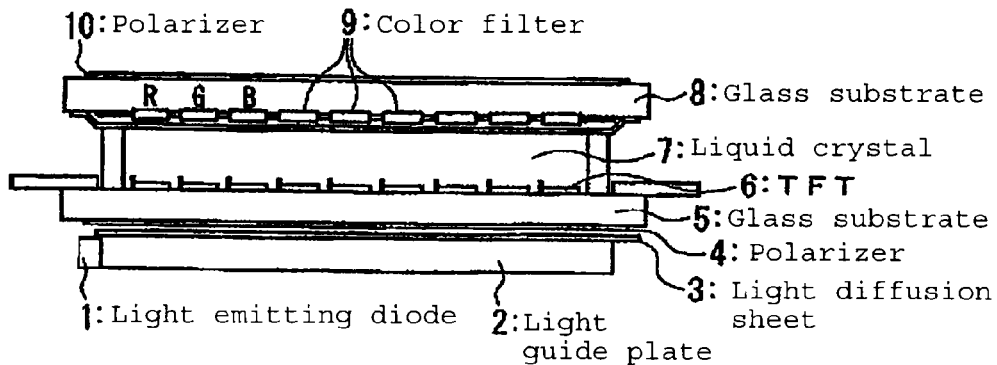
FIG. 1 is a view showing a construction of a color liquid crystal display device of a TFT type.

FIG. 1 shows an example of the color liquid crystal display device of the TFT type using a side-light type backlight device and a color filter. In this liquid crystal display device, light emitted from a light source (light emitting diode) 1 is converted into an area light source by a light guide plate 2, a light diffuser sheet 3 further enhances uniformity of the light, and the light then passes a prism sheet to enter a polarizer 4. For this incident light, a direction of polarization is controlled in each pixel by TFT 6 and thereafter the light is incident into a color filter 9. Finally, the light passes through a polarizer 10 with the direction of polarization perpendicular to that of the polarizer 4 and then reaches an observer. The degree of change of the polarization direction of the incident light varies depending upon an applied voltage to TFT 6, so as to change the quantity of light passing through the polarizer 10, thus enabling display of a color image. Numerals 5 and 8 denote transparent substrates (glass substrates), and 7 a liquid crystal.

Further, the color image display device of the present invention has a construction which will be described in detail, whereby when the color reproduction range of the color image display element is a NTSC ratio of 74%, the light use efficiency $Y_1$ as defined below is at least 28%, preferably at least 30%. The higher the upper limit (100%) of the light use efficiency $Y_1$, the better, but it is usually at most 50%.

$$X = \frac{\int_{380}^{780} \overline{x}(\lambda)S(\lambda)T(\lambda)d\lambda}{\int_{380}^{780} \overline{y}(\lambda)S(\lambda)d\lambda} \quad x = \frac{X}{X+Y_1+Z}$$

$$Y_1 = \frac{\int_{380}^{780} \overline{y}(\lambda)S(\lambda)T(\lambda)d\lambda}{\int_{380}^{780} \overline{y}(\lambda)S(\lambda)d\lambda} \quad y = \frac{Y}{X+Y_1+Z}$$

$$Z = \frac{\int_{380}^{780} \overline{z}(\lambda)S(\lambda)T(\lambda)d\lambda}{\int_{380}^{780} \overline{y}(\lambda)S(\lambda)d\lambda}$$

wherein the definitions of the respective symbols are as follows:

$\overline{x}(\lambda), \overline{y}(\lambda), \overline{z}(\lambda)$: color-matching functions of XYZ calorimetric system, $S(\lambda)$: relative emission spectrum of the backlight, $T(\lambda)$: transmittance of the color filter.

Further, the color image display device of the present invention is such that when the color reproduction range of the color image display element is a NTSC ratio of 85%, the light use efficiency $Y_2$ to be calculated in the same manner as the above light use efficiency $Y_1$, is at least 25%, preferably at least 27%. The higher the upper limit (100%) of $Y_2$, the better, but it is usually at most 50%.

Otherwise, the color image display device of the present invention is such that when the color reproduction range of the color image display element is a NTSC ratio of 94%, the light use efficiency $Y_3$ to be calculated in the same manner as the above light use efficiency $Y_1$, is at least 15%, preferably at least 18%. The higher the upper limit (100%) of $Y_3$, the better, but it is usually at most 50%.

The color image display device of the present invention is characterized in that the relationship between the NTSC ratio W as a color reproduction range of the color image display element and the light use efficiency Y is represented by the following formula (a), preferably the following formula (b), more preferably the following formula (c), particularly preferably the following formula (d), wherein $W \geq 87$:

$$Y \geq -0.38W + 50 \quad \text{(a)}$$

$$Y \geq -0.38W + 53 \quad \text{(b)}$$

$$Y \geq -0.38W + 56 \quad \text{(c)}$$

-continued $$Y \geqq -0.38W + 57 \quad (d)$$

$$X = \frac{\int_{380}^{780} \bar{x}(\lambda)S(\lambda)T(\lambda)d\lambda}{\int_{380}^{780} \bar{y}(\lambda)S(\lambda)d\lambda} \quad x = \frac{X}{X+Y+Z}$$

$$Y = \frac{\int_{380}^{780} \bar{y}(\lambda)S(\lambda)T(\lambda)d\lambda}{\int_{380}^{780} \bar{y}(\lambda)S(\lambda)d\lambda} \quad y = \frac{Y}{X+Y+Z}$$

$$Z = \frac{\int_{380}^{780} \bar{z}(\lambda)S(\lambda)T(\lambda)d\lambda}{\int_{380}^{780} \bar{y}(\lambda)S(\lambda)d\lambda}$$

wherein the definitions of the respective symbols are as follows:

$\bar{x}(\lambda)$, $\bar{y}(\lambda)$, $\bar{z}(\lambda)$: color-matching functions of XYZ calorimetric system, $S(\lambda)$: relative emission spectrum of the backlight, $T(\lambda)$: transmittance of the color filter.

Namely, heretofore, up to a NTSC ratio of 85%, it was possible to control the light use efficiency to some extent, but with a color image display device designed to have a NTSC ratio exceeding 85%, particularly a NTSC ratio of at least 87%, especially at least 90%, it was not possible for those skilled in the art to devise a specific construction to increase the light use efficiency because of the nature of the emission spectrum of the pigment or phosphor to be used for a resist of a conventional color filter, or the backlight spectrum obtained by a combination of a semiconductor emission element and a phosphor.

In the color image display device of the present invention, the relationship between the NTSC ratio W and the light use efficiency Y has been set as follows.

(i) With a color image display device with a NTSC ratio exceeding 85% formed by a combination of a specific novel backlight and a color filter, based on the emission spectrum (measured value) of the backlight, a virtual color filter is simulated by calculation so that the NTSC ratio of the color image display device would be about 85% and 94%.

(ii) With the virtual color image display device having the virtual color filter simulated in the above (i), the light use efficiency is calculated at two points where the NTSC ratio would be about 85% and 94%. In the present invention, two points of (NTSC ratio, light use efficiency)=(85.4%, 25.1%) and (94.2%, 21.7%) are calculated.

(iii) The inclination of the linear line connecting the two points calculated in the above (ii), is taken as the inclination in the relational expression of the NTSC ratio W and the light use efficiency Y, and a linear function obtained by applying a color image display device of the present invention wherein when the above mentioned NTSC ratio is 94%, the light use efficiency $Y_3$ is at least 15%, is represented by the formula (a); a linear function obtained by applying a color image display device of the present invention wherein the light use efficiency $Y_3$ is within a preferred range of at least 18%, is represented by the formula (b); a linear function passing through the measured values (NTSC ratio of 93.4%, light use efficiency of 21.5%) of the color image display device actually prepared by the combination of the above (i), is represented by the formula (c); and a linear function passing through the simulated values (94.2%, 21.7%) of the virtual color image display device of the above (ii), is represented by the formula (d).

Further, a color image display device may be mentioned wherein the relationship between the NTSC ratio W and the light use efficiency Y is represented more preferably by the following formula (e), further preferably by the following formula (f) wherein $W \geqq 87$:

$$Y=-0.38W+58 \quad (e)$$

$$Y=-0.40W+61 \quad (f)$$

The above formulae (e) and (f) are obtainable by calculating the relationship between the NTSC ratio W and the light use efficiency Y in the same manner with respect to a color image display device with a NTSC ratio exceeding 85%, formed by a combination of a specific novel backlight and a color filter, which is different from the color image display device, based on which the formulae (a) to (d) are calculated.

Figure 2:
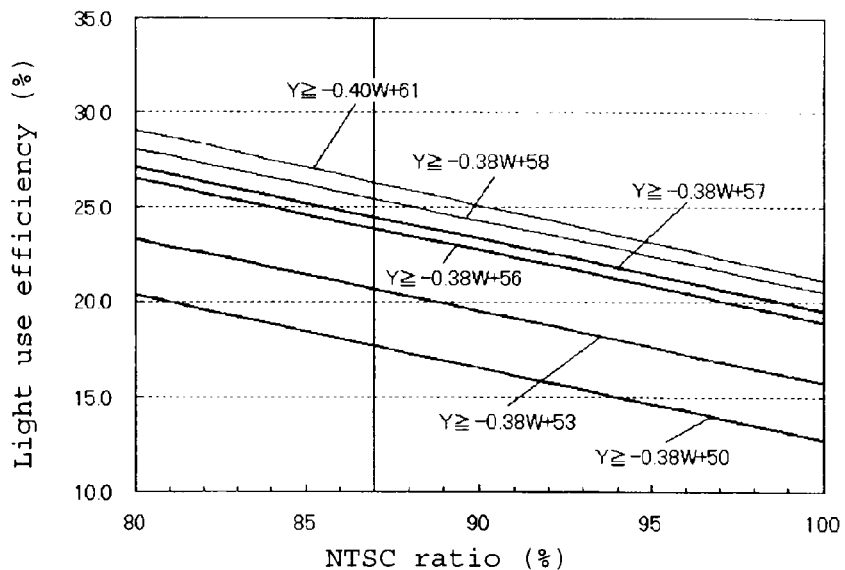
FIG. 2 is a graph showing the relation between the NTSC ratio and the light use efficiency of a color image display device according to the present invention.

A graph showing the relationships between the NTSC ratio and the light use efficiency, representing the formulae (a) to (f), is shown in FIG. 2.

In the present invention, Y, $Y_1$, $Y_2$ and $Y_3$ can specifically be calculated by measuring the relative emission spectrum $S(\lambda)$ of the backlight by a high luminance measuring apparatus and the transmittance spectrum $T(\lambda)$ of the color filter by a spectrophotometer, and by applying the measured values to the above formulae.

Further, the color image display device of the present invention is characterized in that it has high color reproducibility.

Namely, the color image display device of the present invention is a color image display device comprising a combination of light shutters, a color filter having color elements of at least three colors of red, green and blue corresponding to the light shutters, and a backlight for transmission illumination, wherein a light source for the backlight comprises a combination of a blue or deep blue LED and a phosphor, and the light source has at least one emission peak wavelength in each of wavelength regions of from 430 to 470 nm, from 500 to 540 nm and from 600 to 680 nm, and the color reproduction range of the color image display element is a NTSC ratio of at least 60%. The NTSC ratio is preferably at least 70%.

Further, the color image display device of the present invention usually has a color temperature of from 5,000 to 10,000 K, preferably from 5,500 to 9,500 K, more preferably from 6,000 to 9,000 K. If the color temperature is too low, the image tends to be entirely reddish. On the other hand, if the color temperature is too high, the brightness tends to be low.

(1) Backlight Device

First, the construction of the backlight device to be is used in such a color liquid crystal display device will be described.

The backlight device used in the present invention is an area light source device disposed on a back face of a liquid crystal panel and used as a back light source means for a transmission type or semi-transmission type color liquid crystal display device.

A specific construction of the backlight device includes a white-emitting LED and a light uniformizing means for converting this light-source light into a nearly uniform area light source.

Typical examples of the method for installation of the light source include a method of placing the light source immediately below the back face of the liquid crystal elements (direct backlight system), and a method of placing the light source on a side face and using an optically transparent light guide such as an acrylic plate or the like to convert the light into area light to obtain an area light source (side light system). Among them, the side light system as shown in FIGS. 3 and 4 is suitably applicable as an area light source being thin and excellent in uniformity of luminance distribution, and is now most commonly put to practical use.

Figure 3:
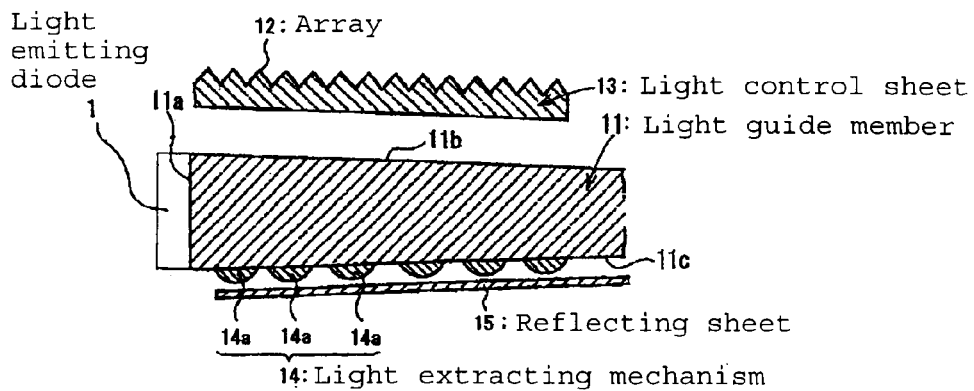
FIG. 3 is a cross sectional view showing an example of a backlight device suitable for the present invention.

The backlight device of FIG. 3 is constructed so that a light emitting diode 1 is placed along one side end face 11*a* of a substrate consisting of an optically transparent flat plate, i.e., a light guide 11, and light is permitted to enter through one side end face 11*a* as a light entrance face into the interior of the light guide 11. One surface 11*b* of the light guide 11 serves as a light exit face, and a light control sheet 13 with an array 12 of nearly triangular prism shape formed therein is placed above the light exit face 11*b* so that apex angles of the array 12 are directed toward the observer. A light extracting mechanism 14 printed in a predetermined pattern of many dots 14*a* of light scattering ink is provided on the other face 11*c* opposite to the light exit face 11*b* in the light guide 11. On this face 11*c* side, a reflecting sheet 15 is provided in proximity to this face 11*c*.

Figure 4:
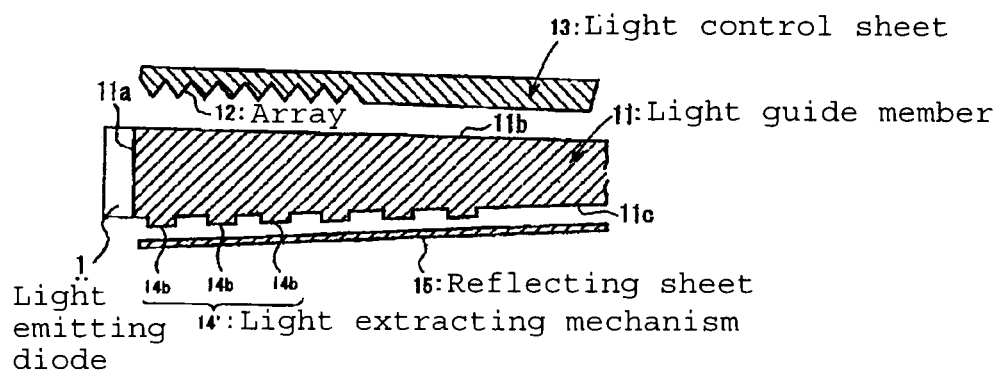
FIG. 4 is a cross sectional view showing another example of a backlight device suitable for the present invention.

The backlight device of FIG. 4 is constructed in much the same construction as the backlight device shown in FIG. 3, except that the light control sheet 13 with the prism array 12 of nearly triangular prism shape formed therein is located so that the apex angles of the array 12 are directed toward the light exit face 11*b* of the light guide 11 and except that the light extracting mechanism 14' provided in the face 11*c* opposite to the light exit face 11*b* of the light guide 11 is comprised of a rough pattern 14*b* with each surface being formed as a rough surface.

By adopting the backlight devices of the side light system as described above, it is feasible to bring out the lightweight and low-profile features of the liquid crystal display device more effectively.

The light source of the backlight device of this invention is characterized in that it contains LED (hereinafter optionally referred to as a light emitting diode) in its structure. As such a light source, any one may usually be used so long as it is of a type to provide emissions within the red, green and blue wavelength regions i.e. within the ranges of from 580 to 700 nm, from 500 to 550 nm and from 400 to 480 nm.

For the backlight to satisfy such conditions, the light source comprises a combination of a blue or deep blue LED and a phosphor, and the light source is adjusted so that it has at least one emission main component in each wavelength region of the red region (region of usually at least 600 nm, preferably at least 610 nm, more preferably at least 620 nm and usually at most 680 nm, preferably at most 670 nm), the green region (region of usually at least 500 nm, preferably least 510 nm, and usually at most 540 nm, preferably at most 535 nm, more preferably at most 530 nm, particularly preferably at most 525 nm, especially preferably at most 520 nm) and the blue region (region of usually at least 530 nm, preferably at least 440 nm, and usually at most 470 nm, preferably at most 460 nm).

The light quantity in each region of red, green and blue in a transmissive or semi-transmissive transparent mode, is determined by the product of the emission from the backlight and the spectral transmittance of the color filter. Accordingly, it is necessary to select the backlight to satisfy the conditions which will be described hereinafter in the section (c) colorants for the composition for a color filter.

Now, specific examples of the backlight device of the present invention will be described, but so long as the above conditions are satisfied, the light source for the backlight of the present invention is not limited thereto.

The light source is preferably a blue or deep blue LED. The emission wavelength of the light source is usually at least 440 nm, preferably at least 450 nm, and usually at most 480 nm, preferably at most 490 nm. The blue or deep blue LED is suitably used, since a light source having a high emission efficiency can thereby be obtained.

The light source is preferably a semiconductor of e.g. InGaN type, GaAlN type, InGaAlN type or ZnSeS type crystal-grown by e.g. MOCVD method on a substrate of e.g. silicon carbide, sapphire or gallium nitride. To obtain a high output, the size of the light source may be increased, or a plurality of light sources may be used. Further, it may be an end surface emission type or area emission type laser diode.

A frame for fixing the light source has at least positive and negative electrodes to conduct an electrical current to the light source. A concave cup is provided on the frame, and the light source is disposed on its bottom surface, whereby it is possible to let the outgoing light have directivity and thereby to effectively utilize the light. Further, by subjecting the inner surface of the concave portion or the entirety of the frame to plating treatment with a highly reflective metal such as silver, platinum or aluminum or its alloy, it is possible to increase the reflectance in the entire visible light region and thereby to increase the light use efficiency, such being more preferred. Further, similar effects can be obtained by making the surface of the concave portion or the entirety of the frame from an injection molding resin containing a highly reflective material such as a white-colored glass fiber, alumina powder or titania powder.

To fix the light source, an adhesive of e.g. epoxy type, imide type or acrylic type, a solder of AuSn or AgSn, or a bump of e.g. Au may, for example, be used.

In a case where the light source is electrically connected through the adhesive, an electrically conductive filler such as fine silver particles may be incorporated to the adhesive, or, for example, a silver paste or carbon paste may be applied thinly and uniformly thereon. Further, in the case of a light emitting diode or laser diode of a large current type where the heat dissipation becomes important, solder is effective. In a case where the light source is not electrically connected through the adhesive, any adhesive may be used for fixing the light source, but in consideration of the heat dissipation, a silver paste or solder is preferred.

In a case where a plurality of light sources are employed, use of a solder is not advisable, since the light sources are likely to be repeatedly exposed at high temperature or so exposed for a long time, whereby the useful life of the power sources may be deteriorated. On the other hand, when a bump is used, the operation can be carried out at a temperature lower than the solder, and bonding can be carried out simply and certainly. Especially in a case where a flip chip type LED is to be used, a silver paste adhesive may short-circuit the p-type and n-type electrodes, but the bump is free from such a trouble and is preferred.

The light source and the electrodes of the frame are electrically connected by wire bonding. As such a wire, a gold or aluminum wire having a diameter of from 20 to 40 µm will be used. The method for electrically connecting the light source and the electrodes of the frame may otherwise be a flip chip bonding method without using a wire.

A blue-emitting phosphor, a green-emitting phosphor and a red-emitting phosphor are mixed to a transparent binder such as an epoxy resin or a silicon resin and applied to the light emitting diode. The mixing ratio may optionally be changed so that a desired color can be obtained. Here, the blue-emitting phosphor, the green emitting phosphor and the red-emitting phosphor may separately be applied on the light-emitting diode.

By further adding a dispersing agent to the transparent binder, it is possible to make the outgoing light more uniform. As such a dispersing agent, a colorless material having an average particle diameter of from 100 nm to a few tens μm is preferred. Alumina, zirconia, yttria or the like is more preferred, since it is stable within a practical temperature range of from −60 to 120° C. Further, it is more preferred that the refractive index is high, whereby the effect of the dispersing agent will be high. Further, in a case where a phosphor having a large particle diameter is to be used, color irregularities or color shift is likely to result due to settling of the phosphor, and it is advisable to use an anti-settling agent. As such an anti-settling agent, fumed silica is common.

When the completed light emitting device is switched on, firstly the light emitting diode will emit a blue or deep blue color. The phosphor will absorb a part of the emission and will emit a green or red color. As the light coming out from the light emitting device, substantially white colored one is obtainable as the initial blue color of the light emitting diode, and the green and red colors having wavelength changed by the phosphor, have been mixed.

(2) Phosphor

Now, the phosphor will be described.

In the color image display device of the present invention, it is preferred that the above mentioned backlight has a phosphor layer or a phosphor film, and the phosphor layer or the phosphor film contains the following phosphors.

(2-1) Red Phosphor

As the red phosphor to be used for the phosphor layer or the phosphor film to be used in the color image display device of the present invention, it is possible to use various phosphors having an emission peak wavelength within a wavelength range of 620 nm$\leq \lambda_n \leq$680 nm. A europium-activated phosphor is preferred as a red phosphor to realize an image having such a high color purity. As such a europium-activated phosphor, a nitride phosphor, an oxynitride phosphor, a sulfide phosphor or an oxysulfide phosphor may be mentioned. Among them, a nitride phosphor or an oxynitride phosphor is preferred. Further, among nitride phosphors and oxynitride phosphors, a nitride phosphor or an oxynitride phosphor containing an activating element $M^1$, a bivalent metal element $M^2$ and a tetravalent metal element $M^4$ containing at least Si, is preferred.

Now, specific examples of the red phosphor to be preferably employed, will be described.

(2-1-1) Nitride Phosphor, Oxynitride Phosphor

As a specific example of the nitride phosphor or the oxynitride phosphor of the present invention, a phosphor may be mentioned which contains a compound comprising, as a matrix, a nitride or an oxynitride represented by the following formula (1A) and which may contain an activating element $M^1$, a bivalent metal element $M^2$, a trivalent metal element $M^3$ and a tetravalent metal element $M^4$ containing at least Si:

  (1A)

wherein a, b, c, d, e and f are values within the following ranges, respectively:

$0.00001 \leq a \leq 0.15$ $a+b=1$ $0.5 \leq c \leq 1.5$ $0.5 \leq d \leq 1.5$ $2.5 \leq e \leq 3.5$ $0 \leq f \leq 0.5$.

As the activating element $M^1$, it is possible to use various light emitting ions which may be contained in a crystal matrix constituting the phosphor comprising a nitride or an oxynitride as the matrix. However, it is preferred to use at least one element selected from the group consisting of Cr, Mn, Fe, Ce, Pr, Nd, Sm, Eu, Tb, Dy, Ho, Er, Tm and Yb, since it is thereby possible to produce a phosphor having high light emitting characteristics. Further, the activating element $M^1$ preferably contains one or more of Mn, Ce, Pr and Eu and more preferably contains Ce and/or Eu, since it is thereby possible to obtain a phosphor showing a high luminance red emission, and particularly preferred is Eu. Further, in order to increase the brightness or to provide various functions such as to impart a light storage function, the activating element $M^1$ may contain one or more co-activating elements in addition to Ce and/or Eu.

As elements other than the activating element $M^1$, various bivalent, trivalent or tetravalent metal elements may be used, but it is preferred that the bivalent metal element $M^2$ is at least one member selected from the group consisting of Mg, Ca, Sr, Ba and Zn, the trivalent metal element $M^3$ is at least one member selected from the group consisting of Al, Ga, In and Sc, and the tetravalent metal element $M^4$ containing at least Si is at least one member selected from the group consisting of Si, Ge, Sn, Ti, Zr and Hf, since it is thereby possible to obtain a phosphor having high emission characteristics.

Further, it is preferred to adjust the composition so that at least 50 mol % of the bivalent metal element $M^2$ will be Ca and/or Sr since it is thereby possible to obtain a phosphor having high emission characteristics; it is more preferred that at least 80 mol % of $M^2$ will be Ca and/or Sr; it is further preferred that at least 90 mol % will be Ca and/or Sr; and it is most preferred that all of $M^2$ will be Ca and/or Sr.

Further, it is preferred to adjust the composition so that at least 50 mol % of the bivalent metal element $M^2$ will be Ca, since it is thereby possible to elongate to longer wavelength the emission wavelength of the phosphor thereby to obtain a phosphor having a good color purity; it is more preferred that at least 80 mol % of $M^2$ will be Ca; it is further preferred that at least 90 mol % will be Ca; and it is most preferred that all of $M^2$ will be Ca.

Further, it is preferred to adjust the composition so that at least 50 mol % of the trivalent metal element $M^3$ will be Al, since it is thereby possible to obtain a phosphor having high emission characteristics; it is more preferred that at least 80 mol % of $M^3$ will be Al; it is further preferred that at least 90 mol % will be Al; and it is most preferred that all of $M^3$ will be Al.

Further, it is preferred to adjust the composition so that at least 50 mol % of the tetravalent metal element $M^4$ containing at least Si will be Si, since it is thereby possible to obtain a phosphor having high emission characteristics; it is more preferred that at least 80 mol % of $M^4$ will be Si; it is further preferred that at least 90 mol % will be Si; and it is most preferred that all of $M^4$ will be Si.

It is particularly preferred to adjust the composition so that at least 50 mol % of the bivalent metal element $M^2$ will be Ca and/or Sr, at least 50 mol % is of the trivalent metal element $M^3$ will be Al, and at least 50 mol % of the tetravalent metal element $M^4$ containing at least Si will be Si, since it is thereby possible to produce a phosphor having particularly high emission characteristics.

Further, the above mentioned numerical value ranges of a to f in the formula (1A) are preferred for the following reasons.

If a is smaller than 0.00001, no adequate emission intensity tends to be obtainable, and if a is larger than 0.15, the concentration quenching tends to be large, whereby the emission intensity tends to be low. Accordingly, the raw materials are mixed so that a will be within a range of 0.00001≦a≦0.15. For the same reason, 0.000≦a≦0.1 is preferred, 0.001≦a≦0.05 is more preferred, 0.002≦a≦0.04 is further preferred, and 0.004≦a≦0.02 is most preferred.

Further, in a case where Eu is used as the activating element $M^1$, in order to improve the color purity of red by elongating to longer wavelength the emission wavelength of the phosphor, 0.005≦a≦0.1 is preferred, 0.01≦a≦0.05 is more preferred, and 0.015≦a≦0.04 is further preferred.

In the crystal matrix of the phosphor, the atomic position of the metal element $M^2$ may be substituted by the activating element $M^1$, and accordingly, the composition of the raw material mixture is adjusted so that the total of a and b will be 1.

If c is smaller than 0.5, or c is larger than 1.5, a heterophase is likely to be formed during the production, and the yield of the phosphor tends to be low. Therefore, the raw materials are mixed so that c will be within a range of 0.5≦c≦1.5. Also from the viewpoint of the emission intensity, 0.5≦c≦1.5 is preferred, 0.6≦c≦1.4 is more preferred, and 0.8≦c≦1.2 is most preferred.

If d is smaller than 0.5, or d is larger than 1.5, a heterophase is likely to form during the production, and the yield of the phosphor tends to be low. Therefore, the raw materials are mixed so that d will be within a range of 0.5≦d≦1.5. Further, also from the viewpoint of the emission intensity, 0.5≦d≦1.5 is preferred, 0.6≦d≦1.4 is more preferred, and 0.8≦d≦1.2 is most preferred.

Whereas e is a coefficient representing the content of nitrogen and is represented by the following formula:

$$e = \frac{2}{3} + c + \frac{4}{3}d$$

When 0.5≦c≦1.5 and 0.5≦d≦1.5 are substituted for this formula, the range of e will be 1.84≦e≦4.17. However, in the phosphor composition represented by the formula (1A), if e representing the content of nitrogen is less than 2.5, the yield of the phosphor tends to be low. Further, if e exceeds 3.5, the yield of the phosphor tends to be low. Accordingly, e is usually 2.5≦e≦3.5.

In a case where oxygen in the phosphor represented is by the above formula (1A) is included as an impurity in the raw material metals, it is conceivable that it is introduced during the production process such as the pulverization step or the nitriding step. The proportion of oxygen, f, is preferably within a range of 0≦f≦0.5 where the deterioration in the emission characteristics of the phosphor is admissible. Further, in a case where Eu is used as the activating element $M^1$, in order to improve the color purity of red by prolonging to longer wavelength the emission wavelength of the phosphor, 0≦f≦0.2 is preferred, 0≦f≦0.15 is more preferred, and 0≦f≦0.1 is particularly preferred.

Among phosphors represented by the above formula (1A), a phosphor represented by the following formula (1B) may preferably be used:

$$M^{1'}{}_{a'}Sr_{b'}Ca_{c'}M^{2'}{}_{d'}Al_{e'}Si_{f'}N_{g'} \quad (1B)$$

wherein a', b', c', d', e', f' and g' are values within the following ranges, respectively:

0.00001≦a'≦0.15

0≦b'≦0.99999

0≦c'<1

0≦d'<1 a'+b'+c'+d'=1

0.5≦e'≦1.5

0.5≦f'≦1.5

0.8×(2/3+e'+4/3×f')≦g'≦1.2×(2/3+e'+4/3×f').

Here, $M^{1'}$ represents, like $M^1$ in the above formula (1A), at least one activating element selected from the group consisting of Cr, Mn, Fe, Ce, Pr, Nd, Sm, Eu, Tb, Dy, Ho, Er, Tm and Yb. Among them, the activating element $M^{1'}$ preferably contains one or more of Mn, Ce, Pr and Eu and particularly preferably contains Eu and/or Ce. Among them, Eu is preferred.

$M^{2'}$ represents Mg and/or Ba, preferably Mg. By the incorporation of Mg, it is possible to prolong to longer wavelength the emission wavelength of the phosphor.

If a' is smaller than 0.00001, it tends to be difficult to obtain a sufficient emission intensity, and if a' is larger than 0.15, the concentration quenching tends to increase, whereby the emission intensity tends to be low. Accordingly, the raw materials are mixed so that a' will be within a range of 0.0001≦a'≦0.15. For the same reason, 0.0001≦a'≦0.1 is preferred, 0.001≦a'≦0.05 is more preferred, 0.002≦a'≦0.04 is further preferred, and 0.004≦a'≦0.02 is most preferred.

Further, in a case where Eu is used as the activating element $M^1$, in order to improve the color purity of red by prolonging to longer wavelength the emission wavelength of the phosphor, 0.005≦a'≦0.1 is preferred, 0.01≦a'≦0.05 is more preferred, and 0.015≦a'≦0.04 is further preferred.

The range of b' is usually 0≦b'≦0.99999. If b' is large, the emission wavelength of the phosphor tends to be short.

The range of c' is usually 0≦c'<1, preferably 0.1≦c'<1, more preferably 0.15≦c'<1. If this value is too small, the structure tends to be unstable.

The range of d is usually 0≦d'<1, preferably 0≦d'≦0.5, more preferably 0≦d'≦0.2.

The mutual relationship of a', b', c' and d' usually satisfies:

a'+b'+c'+d'=1

The range of e' is usually 0.5≦e'≦1.5, preferably 0.8≦e'≦1.2, more preferably 0.9≦e'≦1.1.

The range of f' is usually 0.5≦f'≦1.5, preferably 0.8≦f'≦1.2, more preferably 0.9≦f'≦1.1.

The range of g' is usually 0.8(2/3+e'+4/3×f')≦g'≦1.2×(2/3+e'+4/3×f'), preferably 0.9×(2/3+e'+4/3×f')≦g'≦1.1×(2/3+e'+4/3×f'), more preferably 2.5≦g'≦3.5.

Oxygen contained in the phosphor of the present invention may be one included as an impurity in the raw material metals or one included during the production process step such as a pulverization step or nitriding step.

The content of oxygen is usually at most 5 wt %, preferably at most 2 wt %, most preferably at most 1 wt %, within a range where deterioration of emission characteristics of the phosphor is admissible.

(2-1-2) Other Nitride Phosphor

As a specific example of other nitride phosphor, a yellow or red-emitting phosphor may be mentioned which is characterized by having a host lattice, such as a nitride silicate type MxSiyNzEu.

Here, M is at least one alkaline earth metal selected from the group consisting of Ca, Sr and Ba, or Zn, and $z=2/3x+4/3y$.

The phosphor is preferably of a type wherein $x=2$ and $y=5$. In another preferred embodiment, the phosphor is of a type wherein $x=1$ and $y=7$.

Metal M in the phosphor is preferably strontium, since the resulting phosphor will emit a light with a relatively short wavelength within a range of yellow to red. Thus, the efficiency is substantially high as compared with the majority of other selected metals M.

In another embodiment, the phosphor uses a mixture of different metals as component M, for example, Ca (10 atomic %) together with Ba (barium).

Such a material shows a high absorption and excellent excitation in UV and blue color visible spectrum (over 450 nm), a high quantum efficiency and a low temperature quenching to 100° C.

As specific examples of the above phosphor of the present invention, known phosphors disclosed in e.g. JP-A-2003-515655, JP-A-2005-117057, etc. may be mentioned.

(2-1-3) Sulfide Phosphor

As specific examples of the sulfide phosphor, compounds represented by the formula (1C) may be mentioned.

$$Eu_hCa_iSr_jM^5_kS_l \quad (1C)$$

Here, $M^5$ represents at least one element selected from the group consisting of Ba, Mg and Zn, and h to l are values within the following ranges, respectively:

$0.0002 \leq h \leq 0.02$ $0.3 \leq i \leq 0.9998$ d is $0 \leq j \leq 0.1$ $h+i+j+k=1$ $0.9 \leq l \leq 1.1$ From the viewpoint of the heat stability, the chemical formula amount h of Eu in the formula (1C) is preferably within a range of $0.0002 \leq h \leq 0.02$, more preferably within a range of $0.0004 \leq h \leq 0.02$.

From the viewpoint of the temperature characteristics, the chemical formula amount h of Eu in the formula (1C) is preferably within a range of $0.0004 \leq h \leq 0.01$, more preferably within a range of $0.0004 \leq h \leq 0.007$, further preferably within a range of $0.0004 \leq h \leq 0.005$, particularly preferably within a range of $0.0004 \leq h \leq 0.004$.

From the viewpoint of the emission intensity, the chemical formula mount h of Eu in the formula (1C) is preferably within a range of $0.0004 \leq h \leq 0.02$, more preferably within a range of $0.001 \leq h \leq 0.008$.

If the content of $Eu^{2+}$ as an emission center ion is too small, the emission intensity tends to be small. On the other hand, if it is too large, the emission intensity tends to likewise decrease due to a phenomenon so called concentration quenching.

In order to provide all of the heat stability, temperature characteristics and emission intensity, the chemical formula amount h of Eu in the formula (1C) is preferably within a range of $0.0004 \leq h \leq 0.004$, more preferably within a range of $0.001 \leq h \leq 0.004$.

In the basic crystal $Eu_hCa_iSr_jM^5_kS_l$ of the formula (1C), the molar ratio of cation sites occupied by Eu, Ca, Sr or $M^5$ to anion sites occupied by S is 1:1. However, even if cation deficiency or anion deficiency is present to some extent, such deficiency is not substantially influential over the fluorescent performance as an object of the present invention, and accordingly, the above mentioned basic crystal of the formula (1C) may be used within such a range that the molar ratio l of anion sites occupied by S is within a range of from 0.9 to 1.1.

In the chemical substance of the above formula (1C), $M^5$ representing at least one element selected from the group consisting of Ba, Mg and Zn, is not necessarily an essential element to the present invention, but even if $M^5$ is contained in the chemical substance of the above formula (1C) in such a proportion that the molar ratio k is $0 \leq k \leq 0.1$, the object of the present invention can be accomplished.

There is no practical problem even when the chemical substance of the formula (1C) contains an element other than Eu, Ca, Sr, Ba, Mg, Zn and S as an impurity in an amount of at most 1 wt %.

(2-2) Green Phosphor

As a green phosphor to be used for a phosphor layer or a phosphor film to be used for the color image display device of the present invention, it is possible to use various phosphors having an emission peak wavelength within a wavelength range of 500 nm $\leq \lambda_n \leq$ 530 nm.

The green phosphor to realize an image having a high color purity, preferably contains a phosphor activated with cerium and/or europium. As the phosphor activated with cerium and/or europium, an oxide phosphor, a nitride phosphor or an oxynitride phosphor may be mentioned. Among them, an oxide phosphor activated with cerium, or an oxide phosphor or oxynitride phosphor activated with europium, is preferred.

Further, one having a garnet crystal structure as the crystal structure of the phosphor is preferred, since such a phosphor tends to be excellent in the heat resistance, etc.

Now, a specific example of the green phosphor which is preferably employed, will be described.

(2-2-1) Specific Example of Green Phosphor

As a specific example, the phosphor layer or the phosphor film contains a compound which contains a crystal phase represented by the following formula (2A) and which, when an object color is represented by a L*a*b* color system, satisfies:

$L^* \geq 90$, $a^* \leq -20$, $b^* \geq 30$, and $\{a^*/b^*\} \leq -0.45$;

$$(M^I_{(1-x)}M^{II}_x)_\alpha SiO_\beta \quad (2A)$$

In the above formula (2A), $M^I$ is at least one element selected from the group consisting of Ba, Ca, Sr, Zn and Mg, $M^{II}$ is at least one metal element which may take bivalent and trivalent atomic valencies, provided that the molar ratio of a bivalent element based on the entire $M^{II}$ is from 0.5 to 1, and x, α and β are numbers satisfying, respectively:

$0.01 \leq x \leq 0.3$, $1.5 \leq \alpha \leq 2.5$, and $3.5 \leq \beta 4.5$.

In the formula (2A), $M^I$ is at least one element selected from the group consisting of Ba, Ca, Sr, Zn and Mg. $M^I$ may contain one of these elements alone or may contain two or more of them in an optional combination and ratio.

It is particularly preferred that $M^I$ contains at least Ba. In such a case, the molar ratio of Ba based on the entire $M^I$, is usually at least 0.5, preferably at least 0.55, more preferably at least 0.6, particularly preferably at least 0.7, especially preferably at least 0.8, most preferably at least 0.9 and usually less than 1, preferably at most 0.97, more preferably at most 0.95, further preferably at most 0.93. If the molar ratio of Ba is too low, the emission peak wavelength tends to shift to the long wavelength side, whereby the emission efficiency tends to decrease. On the other hand, if the molar ratio of Ba is too high, the emission peak wavelength tends to shift to the short wavelength side, whereby the color purity of green tends to decrease.

It is particularly preferred that $M^I$ contains at least Ba and Sr. Here, when the molar ratios of Ba and Sr based on the entire $M^I$ are represented by [Ba] and [Sr], respectively, the proportion of [Ba] in the total of [Ba] and [Sr] i.e. the value represented by [Ba]/([Ba]+[Sr]) is usually larger than 0.5, preferably at least 0.6, more preferably at least 0.65, further preferably at least 0.7, particularly preferably at least 0.8, most preferably at least 0.9, and usually at most 1, preferably at most 0.9, more preferably at most 0.95, further preferably at most 0.93. If this value [Ba]/([Ba]+[Sr]) is too small (i.e. the ratio of Ba is too small), the emission peak wavelength of the phosphor to be obtained tends to shift to the long wavelength side, and the half value width tends to increase, such being undesirable. On the other hand, if this value [Ba]/([Ba]+[Sr]) is too large (namely, the ratio of Ba is too high), the emission peak wavelength tends to shift to the short wavelength side, and the color purity of green tends to decrease, such being undesirable.

Further, the relative ratio of [Ba] to [Sr], i.e. the value represented by [Ba]/[Sr], is usually within a range of larger than 1, preferably larger than 1.2, more preferably larger than 1.5, further preferably larger than 1.8, further preferably larger than 2.5, further preferably larger than 4, further preferably larger than 10 and usually at most 35, preferably at most 20, more preferably at most 15, further preferably at most 13. If this value of [Ba]/[Sr] is too small (i.e. if the ratio of Ba is too small), the emission peak wavelength of the obtainable phosphor tends to shift to the long wavelength side, whereby the half value width tends to increase, such being undesirable. On the other hand, if this value of [Ba]/[Sr] is too large (i.e. if the ratio of Ba is too large), the emission peak wavelength tends to shift to the short wavelength side, whereby the color purity of green tends to decrease, such being undesirable.

Further, in a case where in the formula (2A), $M^I$ contains at least Sr, it is preferred that part of Sr is substituted by Ca. In such a case, the amount for substitution by Ca is usually within a range of at most 10%, preferably at most 5%, more preferably at most 2%, by a molar ratio of the amount of substituted Ca to the total amount of Sr. If the proportion of the amount for substitution by Ca is too high, the emission efficiency tends to decrease.

Further, Si may be partially substituted by another element such as Ge. However, from the viewpoint of the green emission intensity, etc., the proportion of Si substituted by another element should better be as small as possible. Specifically, another element such as Ge may be contained in an amount of not more than 20 mol % of Si, and it is more preferred that Si is entirely Si without substitution.

In the above formula (2A), $M^{II}$ is at least one metal element which is mentioned as an activating element and which may take bivalent and trivalent atomic valencies. Specifically, a transition metal element such as Cr or Mn; or a rare earth element such as Eu, Sm, Tm or Yb, may, for example, be mentioned. $M^{II}$ may contain any one of such elements alone or may contain two or more of them in an optional combination and ratio. Among them, as M, Sm, Eu and Yb are preferred, and Eu is particularly preferred. Further, the molar ratio of bivalent elements to the entire $M^{II}$ (the total of bivalent elements and trivalent elements) is usually at least 0.5, preferably at least 0.7, more preferably at least 0.8 and usually less than 1, and the closer to 1, the better. If the molar ratio of bivalent elements to the entire $M^{II}$ is too low, the emission efficiency tends to decrease. Both bivalent elements and trivalent elements will be taken into a crystal lattice, but trivalent elements are considered to absorb the emission energy in the crystal.

In the formula (2A), x is a number representing the moles of $M^{II}$, and specifically, it is usually at least 0.01, preferably at least 0.03, more preferably at least 0.04, particularly preferably at least 0.05, and usually less than 0.3, preferably at most 0.2, more preferably at most 0.15. If the value of x is too small, the emission intensity tends to be small. On the other hand, if the value of x is too large, the emission intensity tends to decrease.

In the formula (2A), $\alpha$ is preferably close to 2, but it represents a number within a range of usually at least 1.5, preferably at least 1.8, more preferably at least 1.9 and usually at most 2.5, preferably at most 2.2, further preferably at most 2.1. If the value of $\alpha$ is too small or too large, a heterophase crystal is likely to be formed, whereby the emission characteristics tend to deteriorate.

In the formula (2A), $\beta$ represents a number within a range of usually at least 3.5, preferably at least 3.8, more preferably at least 3.9, and usually at most 4.5, preferably at most 4.4, more preferably at most 4.1. If the value of $\beta$ is too small or too large, a heterophase crystal is likely to be formed, whereby the emission characteristics tend to deteriorate.

Specific examples of preferred compositions of the phosphor of the present invention are presented in the following Table 1, but it should be understood that the composition of the phosphor of the present invention is by no means restricted to such examples.

TABLE 1

|  | $M^I$ | | $M^{II}$ | | | |
| --- | --- | --- | --- | --- | --- | --- |
|  | Ba | Sr | Eu | $\alpha$ | $M^{II}/\alpha$ | Ba/Sr |
| Ex. 1 | 1.39 | 0.46 | 0.15 | 2 | 0.075 | 3 |
| Ex. 2 | 1.28 | 0.64 | 0.075 | 2 | 0.038 | 2 |
| Ex. 3 | 1.29 | 0.65 | 0.060 | 2 | 0.030 | 2 |
| Ex. 4 | 1.80 | 0.14 | 0.060 | 2 | 0.030 | 2 |
| Ex. 5 | 1.31 | 0.66 | 0.025 | 2 | 0.013 | 2 |
| Ex. 6 | 1.85 | 0 | 0.15 | 2 | 0.075 | ∞ |
| Ex. 7 | 1.70 | 0.15 | 0.15 | 2 | 0.045 | 11.3 |

Further, among the phosphors represented by the above formula (2A), one having the relative ratio of [Ba] to [Sr], the proportion of [Ba] based on the total of [Ba] and [Sr] and the number x representing moles of $M^{II}$ within the following ranges, is able to realize an image forming device whereby the emission peak wavelength is relatively short, the half value width is narrow, the brightness is high, and the color reproduction range is wide, and thus may preferably be employed.

The relative ratio of [Ba] to [Sr], i.e. the value represented by [Ba]/[Sr], is within a range of usually at least 8.5, preferably at least 9, more preferably at least 10, and usually at most 100, preferably at most 50, more preferably at most 25. If this value of [Ba]/[Sr] is too small (i.e. the ratio of Ba is too small), the emission peak wavelength of the phosphor tends to shift to the long wavelength side, whereby the half value width tends to increase. On the other hand, if this value of [Ba]/[Sr] is too large (i.e. if the ratio of Ba is too high), the emission peak wavelength of the phosphor tends to shift to the short wavelength side.

Further, the proportion of [Ba] based on the total of [Ba] and [Sr], i.e. the value represented by [Ba]/([Ba]+[Sr]), is preferably within a range of larger than 0.5, preferably at least 0.8, more preferably at least 0.9 and less than 1, more preferably at most 0.98, particularly preferably at most 0.97. If this value of [Ba]/([Ba]+[Sr]) is too small (i.e. if the ratio of Ba is too small), the emission peak wavelength of the phosphor tends to shift to the long wavelength side, whereby the half value width tends to increase. On the other hand, if this value of [Ba]/([Ba]+[Sr]) is too large (i.e. if the ratio of Ba is too high), the emission peak wavelength of the phosphor tends to shift to the short wavelength side.

Further, x represents a number of at least 0.04, preferably at least 0.05, particularly preferably at least 0.06, and at most 0.3, preferably at most 0.2, more preferably at most 0.15. If the value of x is too small, the emission intensity tends to be small. On the other hand, if the value of x is too large, the emission intensity tends to decrease.

The above phosphor of the present invention has another characteristic such that when its object color is represented by a L*a*b* color system, the value a* and the value b* satisfy the following formulae:

$L^* \geq 90$, $a^* \leq -20$, $b^* \geq 30$, and $\{a^*/b^*\} \leq -0.45$

When the above phosphor of the present invention has an object color satisfying the above conditions, it is possible to realize an emission device having a high emission efficiency, when such a phosphor is used for the emission device which will be described hereinafter.

Specifically, the upper limit value for a* of the above phosphor of the present invention is usually at most −20, preferably at most −22, more preferably at most −24. With a phosphor wherein a* is too large, the total luminous flux tends to be small, such being undesirable. Also with a view to making the brightness high, the value of a* should better be small.

Further, b* of the above phosphor of the present invention is within a range of usually at least 30, preferably at least 33. If b* is too small, the brightness tends to decrease, such being undesirable. On the other hand, the upper limit of b* is theoretically at most 200, but is usually preferably at most 120. If b* is too large, the emission wavelength tends to shift to the long wavelength side, whereby the brightness tends to decrease, such being undesirable.

Further, the ratio of a* to b*, i.e. the value represented by a*/b*, of the above phosphor of the present invention is within a range of usually at most −0.45, preferably at most −0.5, more preferably at most −0.55. If the value of a*/b* is too large, the object color tends to be yellowish, and the brightness also tends to decrease, such being undesirable.

Further, L* of the above phosphor of the present invention is usually at least 90, preferably at least 95. If the value of L* is too small, emission tends to be weak, such being undesirable. On the other hand, the upper limit value of L* usually does not exceed 100 since usually, an object not to emit light under irradiation with light is handled. However, with the above phosphor of the present invention, an emitted light formed under excitation with irradiated light will be superimposed on reflected light, whereby the value of L* may sometimes exceed 100. Specifically, the upper limit value of L* of the phosphor of the present invention is usually at most 115.

Further, the measurement of the object color of the phosphor of the present invention may be carried out by using e.g. a commercially available object color measuring apparatus (e.g. CR-300, manufactured by MINOLTA K.K.).

(2-2-2) Another Specific Example (1) of Green Phosphor

Further, as another specific example, the green phosphor layer or the green phosphor film contains a compound represented by the following formula (2B):

$$M1_x Ba_y M2_z L_u O_v N_w \qquad (2B)$$

In the above formula (2B), M1 is at least one activating element selected from the group consisting of Cr, Mn, Fe, Ce, Pr, Nd, Sm, Eu, Tb, Dy, Ho, Er, Tm and Yb, M2 is at least one bivalent metal element selected from the group consisting of Sr, Ca, Mg and Zn, L is a metal element selected from metal elements belonging to Groups 4 and 14 of the Periodic Table, and x, y, z, u, v and w are numerical values within the following ranges, respectively:

$0.00001 \leq x \leq 3$, $0 \leq y \leq 2.99999$, $2.6 \leq x+y+z \leq 3$, $0 < u \leq 11$, $6 < v \leq 25$, and $0 < w \leq 17$.

In the formula (2B), M1 is an activating element.

As M1, in addition to Eu, at least one transition metal element or rare earth element selected from the group consisting of Cr, Mn, Fe, Ce, Pr, Nd, Sm, Tb, Dy, Ho, Er, Tm and Yb may be mentioned. M1 may contain any one of these elements alone or may contain two or more of them in an optional combination and ratio. Among them, in addition to Eu, Ce, Sm, Tm or Yb as a rare earth element, may be mentioned as a preferred element. Further, among them, the above M1 preferably contains at least Eu or Ce from the viewpoint of luminescent quantum efficiency. Among them, one containing at least Eu is more preferred from the viewpoint of the emission peak wavelength, and it is particularly preferred to employ only Eu.

The activating element M1 will be present in the form of a bivalent cation and/or a trivalent cation in the phosphor of the present invention. At that time, the activating element M1 preferably has a higher proportion of the bivalent cation. In a case where M1 is Eu, the proportion of $Eu^{2+}$ based on the entire amount of Eu is specifically usually at least 20 mol %, preferably at least 50 mol %, more preferably at least 80 mol %, particularly preferably at least 90 mol %.

Here, the proportion of $Eu^{2+}$ in the entire Eu contained in the phosphor of the present invention may be examined, for example, by the measurement of the X-ray absorption fine structure. Namely, when the L3 absorption edge of Eu atoms is measured, $Eu^{2+}$ and $Eu^{3+}$ show separate absorption peaks, and their ratio can be determined from the peak areas. Further, the proportion of $Eu^{2+}$ in the entire Eu contained in the phosphor of the present invention may be also known by the measurement of electron spin resonance (ESR).

Further, in the formula (2B), x is a numerical value within a range of $0.00001 \leq x \leq 3$. Within such a range, x is preferably at least 0.03, more preferably at least 0.06, particularly preferably at least 0.12. On the other hand, if the content of the activating element M1 is too large, the concentration quenching is likely to result, and accordingly, x is preferably at most 0.9, more preferably at most 0.7, particularly preferably at most 0.45.

Further, in the phosphor of the present invention, the sites of Ba may be substituted by Sr, Ca, Mg and/or Zn, while the BSON phase crystal structure is maintained. Accordingly, in the above formula (2B), M2 is at least one bivalent metal element selected from the group consisting of Sr, Ca, Mg and Zn. At that time, M2 is preferably Sr, Ca and/or Zn, more preferably Sr and/or Ca, further preferably Sr. Further, Ba and M2 may further be partially substituted by such metal element ions.

Further, M2 may contain any one of these elements alone or may contain two or more of them in an optional combination or ratio.

In the substitution by Ca ions, the proportion of Ca based on the total amount of Ba and Ca is preferably at most 40 mol %. If the amount of Ca exceeds this proportion, the emission wavelength tends to shift to the long wavelength side, whereby the emission intensity is likely to decrease.

In the substitution by Sr ions, the proportion of Sr based on the total amount of Ba and Sr is preferably at most 50 mol %. If the amount of Sr exceeds this proportion, the emission wavelength tends to shift to the long wavelength side, and the emission intensity is likely to decrease.

In the substitution by Zn ions, the proportion of Zn based on the total amount of Ba and Zn is preferably at most 60 mol %. If the amount of Zn exceeds this proportion, the emission wavelength tends to shift to the long wavelength side, and the emission intensity is likely to decrease.

Accordingly, in the formula (2B), the amount of z may be set depending upon the type of the metal element M2 and the amount of y. Specifically, in the formula (2B), y is a numerical value within a range of $0 \leq y \leq 2.9999$. Further, in the formula (2B), x+y+z is $2.6 \leq x+y+z \leq 3$.

In the phosphor of the present invention, Ba or M2 element may sometimes be deficient together with oxygen or nitrogen. Accordingly, in the formula (2B), the value of x+y+z may sometimes be less than 3, and x+y+z may usually take a value of $2.6 \leq x+y+z \leq 3$, but ideally x+y+z=3.

Further, the phosphor of the present invention preferably contains Ba from the viewpoint of the stability of the crystal structure. Thus, in the above formula (2B), y is preferably larger than 0, more preferably at least 0.9, particularly preferably at least 1.2, and, from the relation to the content of activating elements, it is preferably smaller than 2.99999, more preferably at most 2.99, further preferably at most 2.98, particularly preferably at most 2.95.

In the formula (2B), L represents a metal element selected from metal elements in Group 4 of the Periodic Table such as Ti, Zr and Hf and metal elements in Group 14 of the Periodic Table such as Si and Ge. Here, L may contain any one of such metal elements alone or may contain two or more of them in an optional combination and ratio. Here, L is preferably Ti, Zr, Hf, Si or Ge, more preferably Si or Ge, particularly preferably Si. Here, L may partially contain metal elements capable of becoming trivalent cations such as B, Al and Ga, so long as no adverse effects are given to the performance of the phosphor from the viewpoint of the electrical charge balance of the crystal of the phosphor. The content of such metal elements is usually at most 10 atomic %, preferably at most 5 atomic %, based on L.

Further, in the formula (2B), u is a numerical value of usually at most 11, preferably at most 9, more preferably at most 7 and usually larger than 0, preferably at least 3, more preferably at least 5.

The amounts of O ions and N ions are represented by numerical values v and w in the formula (2B). Specifically, in the formula (2B), v is a numerical value of usually larger than 6, preferably larger than 7, more preferably larger than 8 and further preferably larger than 9, particularly preferably larger than 11, and a numerical value of usually at most 25, preferably smaller than 20, more preferably smaller than 15, further preferably smaller than 13.

Further, the phosphor of the present invention is an oxynitride, and therefore, N is an essential component. Thus, in the formula (2B), w is a numerical value larger than 0. Further, w is a numerical value of usually at most 17, preferably smaller than 10, more preferably smaller than 4, further preferably smaller than 2.4.

Accordingly, from the above described viewpoint, in the formula (2B), u, v and w are particularly preferably $5 \leq u \leq 7$, $9<v<15$ and $0<w<4$, respectively. It is thereby possible to increase the emission intensity of the phosphor.

Further, in the phosphor of the present invention, the proportion of oxygen atoms to metal elements such as (M1+Ba+M2) and L is preferably larger than the proportion of nitrogen atoms, and the amount of nitrogen atoms to the amount of oxygen atoms (N/O) is at most 70 mol %, preferably at most 50 mol %, more preferably at most 30 mol %, further preferably less than 20 mol %. Further, the lower limit is usually larger than 0 mol %, preferably at least 5 mol %, more preferably at least 10 mol %.

Specific examples of preferred compositions of the phosphor of the present invention will be given below, but it should be understood that the composition of the phosphor of the present invention is by no means restricted to the following examples.

In the following examples, the composition in the brackets means a composition comprising at least one of elements divided by a comma (,). For example, $(Ca,Sr,Ba)_3(Si,Ge)_6O_{12}N_2:(Eu,Ce,Mn)$ represents a phosphor which comprises at least one atom selected from the group consisting of Ca, Sr and Ba, and at least one atom selected from the group consisting of Si and Ge, O and N and which is further activated by at least one atom selected from the group consisting of Eu, Ce and Mn.

A preferred specific example of the phosphor of the present invention may, for example, be $(Ca,Sr,Ba)_3(Si,Ge)_6O_{12}N_2:(Eu,Ce,Mn)$, $(Ca,Sr,Ba)_3(Si,Ge)_6O_9N_4:(Eu,Ce,Mn)$, $(Ca,Sr,Ba)_3(Si,Ge)_6O_3N_8:(Eu,Ce,Mn)$, $(Ca,Sr,Ba)_3(Si,Ge)_7O_{12}N_{8/3}:(Eu,Ce,Mn)$, $(Ca,Sr,Ba)_3(Si,Ge)_8O_{12}N_{14/3}:(Eu,Ce,Mn)$, $(Ca,Sr,Ba)_3(Si,Ge)_8O_{12}N_6:(Eu,Ce,Mn)$, $(Ca,Sr,Ba)_3(Si,Ge)_{28/3}O_{12}N_{22/3}:(Eu,Ce,Mn)$, $(Ca,Sr,Ba)_3(Si,Ge)_{29/3}O_{12}N_{26/3}:(Eu,Ce,Mn)$, $(Ca,Sr,Ba)_3(Si,Ge)_{6.5}O_{13}N_2:(Eu,Ce,Mn)$, $(Ca,Sr,Ba)_3(Si,Ge)_7O_{14}N_2:(Eu,Ce,Mn)$, $(Ca,Sr,Ba)_3(Si,Ge)_8O_{16}N_2:(Eu,Ce,Mn)$, $(Ca,Sr,Ba)_3(Si,Ge)_9O_{18}N_2:(Eu,Ce,Mn)$, $(Ca,Sr,Ba)_3(Si,Ge)_{10}O_{20}N_2:(Eu,Ce,Mn)$ or (Ca,Sr, $Ba)_3$ $(Si,Ge)_{11}O_{22}N_2$:(Eu,Ce,Mn), and a more preferred example may, for example, be $Ba_3Si_6O_{12}N_2$:Eu, $Ba_3Si_6O_9N_4$:Eu, $Ba_3Si_6O_3N_8$:Eu, $Ba_3Si_7O_{12}N_{8/3}$:Eu, $Ba_3Si_8O_{12}N_{14/3}$:Eu, $Ba_3Si_8O_{12}N_6$:Eu, $Ba_3Si_{28/3}O_{12}N_{22/3}$:Eu, $Ba_3Si_{29/3}O_{12}N_{26/3}$:Eu, $Ba_3Si_{6.5}O_{13}N_2$:Eu, $Ba_3Si_7O_{14}N_2$:Eu, $Ba_3Si_8O_{16}N_2$:Eu, $Ba_3Si_9O_{18}N_2$:Eu, $Ba_3Si_{10}O_{20}N_2$:Eu, $Ba_3Si_{11}O_{22}N_2$:Eu, $Ba_3Si_6O_{12}N_2$:Eu, Mn, $Ba_3Si_6O_9N_4$:Eu, Mn, $Ba_3Si_6O_3N_8$:Eu, Mn, $Ba_3Si_7O_{12}N_{8/3}$:Eu, Mn, $Ba_3Si_8O_{12}N_{14/3}$:Eu, Mn, $Ba_3Si_8O_{12}N_6$:Eu, Mn, $Ba_3Si_{28/3}O_{12}N_{22/3}$:Eu, Mn, $Ba_3Si_{29/3}O_{12}N_{26/3}$:Eu, Mn, $Ba_3Si_{6.5}O_{13}N_2$:Eu, Mn, $Ba_3Si_7O_{14}N_2$:Eu, Mn, $Ba_3Si_8O_{16}N_2$:Eu, Mn, $Ba_3Si_9O_{18}N_2$:Eu, Mn, $Ba_3Si_{10}O_{20}N_2$:Eu, Mn, $Ba_3Si_{11}O_{22}N_2$:Eu, Mn, $Ba_3Si_6O_{12}N_2$:Ce, $Ba_3Si_6O_9N_4$:Ce, $Ba_3Si_6O_3N_8$:Ce, $Ba_3Si_7O_{12}N_{8/3}$:Ce, $Ba_3Si_8O_{12}N_{14/3}$:Ce, $Ba_3Si_8O_{12}N_6$:Ce, $Ba_3Si_{28/3}O_{12}N_{22/3}$:Ce, $Ba_3Si_{29/3}O_{12}N_{26/3}$:Ce, $Ba_3Si_{6.5}O_{13}N_2$:Ce, $Ba_3Si_7O_{14}N_2$:Ce, $Ba_3Si_8O_{16}N_2$:Ce, $Ba_3Si_9O_{18}N_2$:Ce or $Ba_3Si_{10}O_{20}N_2$:Ce and $Ba_3Si_{11}O_{22}N_2$:Ce.

(2-2-3) Another Specific Example (2) of Green Phosphor

Further, another specific example may, for example, be $M^6Si_2N_2O_2$ activated by europium (wherein $M^6$ is one or more alkaline earth metals), specifically β-SiAlON activated by europium, or the like, disclosed in "Success in Development of Green Phosphor for White LED", reference material for Science Reporters Association, Reporters Association for the Ministry of Education, Culture, Sports, Science and Technology, Reporters Association for Tsukuba Kenkyugakuen-toshi, Published by Independent Administrative Institution National Institute for Materials Science on Mar. 23, 2005.

(2-2-4) Another Specific Example (3) of Green Phosphor

Further, another specific example may, for example, be a $Eu^{2+}$-activated Sr—SiON which has a chemical formula $(Sr_{1-m-n}Ca_nBa_o)Si_xN_yO_z:Eu_m$ (wherein m=0.002 to 0.2, n=0.0 to 0.25, o=0.0 to 0.25, x=1.5 to 2.5, y=1.5 to 2.5, and z=1.5 to 2.5) and which can be excited by light with a wavelength within a range of from UV to blue.

As specific examples of such a phosphor to be used in the present invention, phosphors disclosed in e.g. EP1413618, JP-A-2005-530917 and JP-A-2004-134805 may, for example, be mentioned.

(3) Color Filter

The color filter to be used for the color image display device of the present invention is not particularly limited, and for example, the following one may be employed.

The color filter is a filter obtained by forming fine pixels of red, green, blue and so on a transparent substrate of glass or the like by a method of dyeing, printing, electrodeposition, pigment dispersion, or the like. In order to block leaking light between these pixels and obtain images with higher quality, it is often the case to provide a light shielding pattern called a black matrix between pixels.

A color filter by dyeing is fabricated as follows: an image is formed by a photosensitive resin obtained by mixing a dichromate as a photosensitive agent into gelatin, polyvinyl alcohol, or the like, followed by dyeing.

A color filter by printing is fabricated by transferring a heat-curing or photo-curing ink onto a transparent substrate of glass or the like by such a method as screen printing, gravure printing, flexographic printing, inversion printing or soft lithography (imprint printing).

A color filter by electrodeposition is formed by electrophoresis effected while a transparent substrate of glass or the like with an electrode thereon is immersed in a bath containing a pigment or a dye.

A color filter by pigment dispersion is formed by applying a composition in which a colorant such as a pigment is dispersed or dissolved in a photosensitive resin, onto a transparent substrate of glass or the like to form a coating film thereon, exposing the coating film to radiation through a photomask to effect exposure, and removing unexposed portions by a development process to form a pattern.

The color filter can also be fabricated by other methods than these, including a method of applying a polyimide type resin composition in which a colorant is dispersed or dissolved, and forming a pixel image by etching, a method of attaching a film coated with a resin composition containing a colorant, to a transparent substrate, peeling it off, and effecting image exposure and development to form a pixel image, a method of forming a pixel image by an ink jet printer, and so on.

In recent years, the pigment dispersion method is mainstream in fabrication of the color filters for liquid crystal display elements by virtue of its high productivity and excellent microfabrication property, but the color filter according to the present invention can be fabricated by any one of the above-mentioned production methods.

Examples of methods of forming the black matrix include a method of forming a chromium and/or chromium oxide single-layer or multi-layer film over an entire surface of a transparent substrate of glass or the like by a method such as sputtering, and thereafter removing only color pixel portions by etching, a method of applying a photosensitive composition in which a light shielding component is dispersed or dissolved, onto a transparent substrate of glass or the like to form a coating film, exposing the coating film to radiation through a photomask to effect exposure, and removing unexposed portions by development to form a pattern, and so on.

(3-1) Method for Producing Color Filter

Now, a specific example of the method for producing is the color filter of the present invention will be described.

The color filter of the present invention can be produced usually by forming red, green and blue pixel images on a transparent substrate provided with a black matrix. At the time of forming the respective color pixels on the transparent substrate, pigments and film thicknesses are optimized basically in order to let the peak wavelengths in the red, blue and green regions in the emission spectrum of the backlight permeate most efficiently. More specifically, the most suitable pigments and film thicknesses are set by calculating the white point, the color index of the spectrum of the backlight and the desired NTSC ratio, by a color matching system.

The material for the transparent substrate is not particularly limited. The material may, for example, be a polyester such as polyethylene terephthalate; a polyolefin such as polyethylene; a thermoplastic sheet of e.g. polycarbonate, polymethyl methacrylate or polystyrene; a thermosetting sheet of e.g. an epoxy resin, an unsaturated polyester resin or a poly(meth) acrylic resin; and various glass plates. Among them, a glass plate or a heat resistant plastic is preferred from the viewpoint of heat resistance.

To the transparent substrate, in order to improve the physical property such as the adhesive property of the surface, corona discharge treatment, ozone treatment or thin film treatment with a silane coupling agent or various polymers such as urethane polymer may be preliminarily applied.

A black matrix is formed on a transparent substrate by using a metal thin film or a pigment dispersion for black matrix.

The black matrix using a metal thin film may, for example, be formed by a single chromium layer or by two layers of chromium and chromium oxide. In such a case, firstly, a thin film of such a metal or metal-metal oxide is formed on the transparent substrate by vapor deposition or sputtering. Then, a photosensitive coating film is formed thereon, and then, by using a photomask having a repeated pattern of a stripe, mosaic, triangle, etc., the photosensitive coating film is exposed and developed to form a resist image. Then, the thin film is subjected to etching treatment to form a black matrix.

In a case where a pigment dispersion for black matrix is to be used, a composition for a color filter containing a black colorant is used as a colorant to form a black matrix. For example, black colorants such as carbon black, bone black, graphite, iron black, aniline black, cyanine black and titanium black may be used alone or in combination as a mixture of a plurality of them, or a composition for a color filter containing a black colorant by mixing red, green, blue, etc. suitably selected from inorganic or organic pigments or dyes, is used to form a black matrix in the same manner as the following method for forming red, green and blue pixel images.

On the transparent substrate provided with the black matrix, the above mentioned composition for a color filter containing one colorant among red, green and blue, is applied and dried, and then, a photomask is placed on this coating film, and the image exposure via the photomask, development and if necessary, heat-curing or photo-curing are carried out to form pixel images to form a colored layer. This operation is carried out for each of color filter compositions for three colors of red, green and blue to form a color filter image.

Application of the color filter composition can be carried out by a coating device such as a spinner, a wire bar, a flow coater, a die coater, a roll coater or a spray.

The drying after the coating, may be carried out by using a hot plate, an IR oven, or a convection oven. With respect to the drying temperature, the adhesive property to the transparent substrate will be improved as the temperature becomes high. However, if it is too high, the photo polymerization initiator system tends to be decomposed, thus inducing heat polymerization to cause development failure. Therefore, the drying temperature is usually within a range of from 50 to 200° C., preferably from 50 to 150° C. Further, the drying time is usually from 10 seconds to 10 minutes, preferably from 30 seconds to 5 minutes. Further, prior to such drying by a heat, it is also possible to apply a drying method under reduced pressure.

The thickness of the coating film after the drying is within a range of usually from 0.5 to 3.5 µm, preferably from 1.0 to 3.0 µm. If the film thickness is too thick, non-uniformity in the film thickness tends to be large, and if it is too thin, the pigment concentration tends to be high, and it tends to be difficult to form images.

In the present invention, the light use efficiency of the backlight is excellent, whereby the color filter may be made thin. By making the color filter thin, it is possible to shorten the time and simplify the production steps, thus leading to improvement of the productivity and reduction of the price, and it is also possible to save the power consumption of the backlight when operated as a display panel. Further, it is possible to realize a thin image display device, and it is particularly suitable for a cellphone whereby a thin-form is required for the device itself.

Further, the composition for the color filter to be used comprises a binder resin and an ethylenic compound, and when the binder resin is an acrylic resin having ethylenic double bonds and carboxyl groups in side chains, a very high sensitivity and a high resolution are obtainable, whereby an image may be formed by exposure and development without providing an oxygen-shielding layer of e.g. polyvinyl alcohol, such being desirable.

The exposure light source useful for the image exposure is not particularly limited. For example, a lamp light source such as a xenon lamp, a halogen lamp, a tungsten lamp, a high pressure mercury lamp, a super high pressure mercury lamp, a metal halide lamp, a medium pressure mercury lamp, a low pressure mercury lamp, a carbon arc or a fluorescent lamp; or a laser light source such as an argon ion laser, a YAG laser, an excimer laser, a nitrogen laser, a helium cadmium laser or a semiconductor laser, may be used. An optical filter may be used in a case where only a certain wavelength is to be used.

After the image exposure by means of such a light source, development is carried out by means of an organic solvent, or an aqueous solution containing a surfactant and an alkali agent, to form an image on the substrate. Such an aqueous solution may further contain an organic solvent, a buffering agent, a dye, a pigment, etc.

The treating method for the development is not particularly limited, but usually, a method of immersion development, spray development, brush development or ultrasonic wave development may be used at a development temperature of usually from 10 to 50° C., preferably from 15 to 45° C.

The alkali agent to be used for the development may, for example, be an inorganic alkali agent such as sodium silicate, potassium silicate, sodium hydroxide, potassium hydroxide, lithium hydroxide, sodium triphosphate, sodium diphosphate, sodium carbonate, potassium carbonate, or sodium bicarbonate, or an organic amine such as trimethylamine, diethylamine, isopropylamine, n-butylamine, monoethanolamine, diethanolamine, triethanolamine or tetraalkylammonium hydroxide. They may be used alone or in combination as a mixture of two or more of them.

As the surfactant, a nonionic surfactant such as a polyoxyethylene alkyl ether, a polyoxyethylene alkyl aryl ether, a polyoxyethylene alkyl ester, a sorbitan alkyl ester of a monoglyceride alkyl ester; an anionic surfactant such as an alkylbenzene sulfonate, an alkylnaphthalene sulfonate, an alkyl sulfate, an alkyl sulfonate or a sulfosuccinate; or an amphoteric surfactant such as an alkylbetaine or an amino acid, may be used.

The organic solvent may be used alone or in combination with an aqueous solution, and in either case, isopropyl alcohol, benzyl alcohol, ethyl cellosolve, butyl cellosolve, phenyl cellosolve, propylene glycol or diacetone alcohol may, for example, be used.

(3-2) Composition for Color Filter

The composition (resist) for a color filter to be used for the color image display device of the present invention is not particularly limited, and the following one may, for example, be used.

Raw materials for production of the color filter will be described below, using an example of the pigment dispersion method which is recently mainstream.

The pigment dispersion method uses a composition in which a colorant such as a pigment is dispersed in a photosensitive resin as described above (hereinafter called a "composition for a color filter"). This composition for a color filter is generally a color composition for a color filter in which (a)

a binder resin and/or (b) a monomer, (c) a colorant and (d) other components are dissolved or dispersed as the constituting components in a solvent.

Each of the components will be described below in detail. In the description below, "(meth)acryl", "(meth)acrylate" and "(meth)acrylol" mean "acryl or methacryl", "acrylate or methacrylate" and "acrylol or methacrylol", respectively.

(a) Binder Resin

Where a binder resin is used singly, an appropriate one is properly selected in consideration of the desired image forming property and performance, a production method desired to adopt, and so on. Where a binder resin is used in combination with a monomer described later, the binder resin is added in order to modify the composition for a color filter and improve the physical properties after photo-curing. In this case, therefore, a binder resin is properly selected depending upon the purpose for improvement such as compatibility, a film forming property, a development property, an adhesion property, or the like.

The binder resins usually used are, for example, homopolymers or copolymers of (meth)acrylic acid, (meth)acrylates, (meth)acrylamide, maleic acid, (meth)acrylonitrile, styrene, vinyl acetate, vinylidene chloride, maleimide, and so on, polyethylene oxides, polyvinyl pyrrolidones, polyamides, polyurethanes, polyesters, polyethers, polyethylene terephthalates, acetylcelluloses, novolak resins, resol resins, polyvinyl phenols, polyvinyl butyrals, and so on.

Among these binder resins, preferred binder resins are those having a carboxyl group or a phenolic hydroxyl group in a side chain or in the main chain thereof. Development in an alkali solution becomes possible with use of the resins having these functional groups. Among them, preferred binder resins are resins having a carboxyl group, which have a high alkali development property; for example, (co)polymers of acrylic acid, resins of styrene/maleic anhydride, resins of novolak epoxy acrylate modified with an acid anhydride, and so on.

Particularly preferred binder resins are (co)polymers containing (meth)acrylic acid or a (meth)acrylate having a carboxyl group (these will be referred to as "acrylic resins" in the present invention). Namely, these acrylic resins are preferred in terms of easy controllability of performance and a production method because they are excellent in the development property and transparency and can provide various copolymers from a wide range of monomers.

Specific examples of the acrylic resins include resins that comprise, as an essential component, (meth)acrylic acid and/or a compound obtained by adding an acid (anhydride), such as (anhydrous) succinic acid, (anhydrous) phthalic acid, (anhydrous) maleic acid, or the like, to a hydroxyalkyl(meth)acrylate, such as succinic acid (2-(meth)acryloyloxyethyl) ester, adipic acid (2-acryloyloxyethyl) ester, phthalic acid (2-(meth)acryloyloxyethyl) ester, hexahydrophthalic acid (2-(meth)acryloyloxyethyl) ester, maleic acid (2-(meth)acryloyloxyethyl) ester, succinic acid (2-(meth)acryloyloxypropyl) ester, adipic acid (2-(meth)acryloyloxypropyl) ester, hexahydrophthalic acid (2-(meth)acryloyloxypropyl) ester, phthalic acid (2-(meth)acryloyloxypropyl) ester, maleic acid (2-(meth)acryloyloxypropyl) ester, succinic acid (2-(meth)acryloyloxybutyl) ester, adipic acid (2-(meth)acryloyloxybutyl) ester, hexahydrophthalic acid (2-(meth)acryloyloxybutyl) ester, phthalic acid (2-(meth)acryloyloxybutyl) ester, maleic acid (2-(meth)acryloyloxybutyl) ester, or the like; and that are copolymerized, if necessary, with one of various monomers, e.g., styrene type monomers such as styrene, α-methylstyrene, vinyltoluene, and so on; unsaturated group-containing carboxylic acids such as cinnamic acid, maleic acid, fumaric acid, maleic anhydride, itaconic acid, and so on; (meth)acrylates such as methyl (meth)acrylate, ethyl(meth)acrylate, propyl (meth)acrylate, allyl(meth)acrylate, butyl (meth)acrylate, 2-ethylhexyl(meth)acrylate, hydroxyethyl (meth)acrylate, hydroxypropyl(meth)acrylate, benzyl (meth)acrylate, hydroxyphenyl(meth)acrylate, methoxyphenyl(meth)acrylate, and so on; compounds obtained by adding to (meth)acrylic acid, one of lactones such as ε-caprolactone, β-propiolactone, γ-butyrolactone, δ-valerolactone, and so on; acrylonitrile; acrylamides such as (meth)acrylamide, N-methylolacrylamide, N,N-dimethylacrylamide, N-methacryloyl morpholine, N,N-dimethylaminoethyl (meth)acrylate, N,N-dimethylaminoethylacrylamide, and so on; vinyl acids such as vinyl acetate, vinyl versatate, vinyl propionate, vinyl cinnamate, vinyl pivalate, and so on.

For a purpose of increasing the strength of the coating film, acrylic resins preferably used are those obtained by copolymerization of from 10 to 98 mol %, preferably from 20 to 80 mol %, more preferably from 30 to 70 mol %, of one of monomers having a phenyl group, such as styrene, α-methylstyrene, benzyl(meth)acrylate, hydroxyphenyl(meth)acrylate, methoxyphenyl (meth)acrylate, hydroxyphenyl(meth)acrylamide, hydroxyphenyl(meth)acrylsulfoamide, and so on, and from 2 to 90 mol %, preferably from 20 to 80 mol %, more preferably from 30 to 70 mol %, of at least one monomer selected from the group consisting of (meth)acrylic acid, or (meth)acrylates having a carboxyl group, such as succinic acid (2-(meth)acryloyloxyethyl) ester, adipic acid (2-acryloyloxyethyl) ester, phthalic acid (2-(meth)acryloyloxyethyl) ester, hexahydrophthalic acid (2-(meth)acryloyloxyethyl) ester, maleic acid (2-(meth)acryloyloxyethyl) ester, and so on.

In addition, these resins preferably have an ethylenic double bond in a side chain. By using a binder resin having a double bond in a side chain, the photo-curing property of the composition for a color filter obtained is enhanced, whereby it is feasible to further improve the resolving property and adhesion property.

Means for introducing an ethylenic double bond into a binder resin include, for example, methods disclosed in JP-B-50-34443, JP-B-50-34444, and so on; i.e., a method of reacting a compound having both a glycidyl group/an epoxy cyclohexyl group, and a (meth)acryloyl group with a carboxylic group of a resin, and a method of reacting an acrylic acid chloride or the like with a hydroxyl group of a resin.

For example, a binder resin having an ethylenic double bond in a side chain is obtained by reacting a compound, such as glycidyl(meth)acrylate, allyl glycidyl ether, glycidyl α-ethylacrylate, crotonyl glycidyl ether, (iso)crotonic acid glycidyl ether, (3,4-epoxycyclohexyl)methyl(meth)acrylate, (meth)acrylic acid chloride, or (meth)acryl chloride, with a resin having a carboxyl group or a hydroxyl group. Particularly preferred binder resins are those resulting from a reaction with an alicyclic epoxy compound such as (3,4-epoxy cyclohexyl)methyl (meth)acrylate.

When an ethylenic double bond is preliminarily introduced into a resin having a carboxylic group or hydroxyl group as described above, it is preferable to bond a compound having an ethylenic double bond to from 2 to 50 mol %, preferably from 5 to 40 mol %, of the carboxyl group or hydroxyl group in the resin.

These acrylic resins preferably have a weight-average molecular weight, as measured by GPC (gel permeation chromatography), in a range of from 1,000 to 100,000. If the weight-average molecular weight is less than 1,000, it tends to be difficult to obtain a uniform film. On the other hand, if it exceeds 100,000, the development property tends to degrade. A preferred content of the carboxylic group is in a range of from 5 to 200 as an acid value (mgKOH/g). If the acid value is less than 5, the resin tends to be insoluble in an alkali developer. On the other hand, if it exceeds 200, the sensitivity may become lower.

As the binder resin, particularly preferred specific examples will be described below.

(a-1): "Alkali-Soluble Resin Obtainable by Adding an Unsaturated Monobasic Acid to at Least Some of Epoxy Groups in a Copolymer of an Epoxy Group-Containing (Meth)Acrylate with Another Radical Polymerizable Monomer, and Further Adding a Polybasic Acid Anhydride to at Least Some of Hydroxyl Groups Formed by the Above Addition Reaction"

As such a resin, a resin disclosed in JP-A-2005-154708, paragraphs 0090 to 0110, may, for example, be mentioned.

(a-2): "Carboxyl Group-Containing Linear Alkali-Soluble Resin"

As the carboxyl group-containing linear alkali-soluble resin is not particularly limited so long as it has carboxyl groups, and such a resin is usually obtained by polymerizing a polymerizable monomer having a carboxyl group. As such a resin, a resin disclosed in JP-A-2005-232432, paragraphs 0055 to 0066, may, for example, be mentioned.

(a-3): "A Resin Having an Epoxy Group-Containing Unsaturated Compound Added to Carboxyl Group Moieties of the Above Mentioned (a-2) Resin"

A resin having an epoxy group-containing unsaturated compound added to carboxyl group moieties of the above carboxyl group-containing resin (a-2), is particularly preferred.

The epoxy group-containing unsaturated compound is not particularly limited so long as it is one having an ethylenic unsaturated group and an epoxy group in its molecule.

For example, a non-cyclic epoxy group-containing unsaturated compound such as glycidyl(meth)acrylate, allyl glycidyl ether, glycidyl-α-ethylacrylate, crotonyl glycidyl ether, (iso)crotonic acid glycidyl ether, N-(3,5-dimethyl-4-glycidyl)benzylacrylamide or 4-hydroxybutyl (meth)acrylate glycidyl ether, may also be mentioned. However, from the viewpoint of the heat resistance and the after-mentioned dispersibility of pigment, an alicyclic epoxy group-containing unsaturated compound is preferred.

Here, as the alicyclic epoxy group-containing unsaturated compound, its alicyclic epoxy group may, for example, be a 2,3-epoxycyclopentyl group, a 3,4-epoxycyclohexyl group or a 7,8-epoxy{tricyclo[5.2.1.0]decy-2-yl} group.

Further, as the ethylenic unsaturated group, one derived from a (meth)acryloyl group is preferred. Particularly preferred is 3,4-epoxycyclohexyl methyl (meth)acrylate.

As such a resin, a resin disclosed in JP-A-2005-232432, paragraphs 0055 to 0066, may, for example, be mentioned.

(a-4): "Acrylic Resin"

The acrylic resin is a polymer obtained by polymerizing acrylic acid and/or an acrylate as a monomer component.

As a preferred acrylic resin, a resin disclosed in JP-A-2-2006-161035, paragraphs 0067 to 0086, may for example, be mentioned.

Such a binder resin is contained within a range of usually from 10 to 80 wt %, preferably from 20 to 70 wt %, in the total solid content of the composition for a color filter.

(b) Monomer

There is no particular restriction on the monomer as long as it is a polymerizable low molecular weight compound. A preferred monomer is an addition-polymerizable compound having at least one ethylenic double bond (hereinafter, abbreviated as an "ethylenic compound"). The ethylenic compound is a compound having an ethylenic double bond which is addition-polymerized by the action of a photopolymerization initiator system as described hereinafter, to cure when the composition for a color filter is exposed to active rays. Here the monomer in the present invention implies a concept obverse to a so-called polymer substance and implies a concept embracing not only monomers in a narrow sense but also dimers, trimers, and oligomers.

The ethylenic compound may be, for example, an unsaturated carboxylic acid, an ester of an unsaturated carboxylic acid with a monohydroxy compound, an ester of an aliphatic polyhydroxy compound with an unsaturated carboxylic acid, an ester of an aromatic polyhydroxy compound with an unsaturated carboxylic acid, an ester obtained by an esterification reaction of an unsaturated carboxylic acid and a polybasic carboxylic acid with a polyhydric hydroxy compound such as the aforementioned aliphatic polyhydroxy compound or aromatic polyhydroxy compound, an ethylenic compound with a urethane skeleton obtained by reacting a polyisocyanate compound with a (meth)acryloyl-containing hydroxy compound, or the like.

The unsaturated carboxylic acid may be, for example, (meth)acrylic acid, (anhydrous) maleic acid, crotonic acid, itaconic acid, fumaric acid, 2-(meth)acryloyloxyethyl succinic acid, 2-acryloyloxyethyl adipic acid, 2-(meth)acryloyloxyethyl phthalic acid, 2-(meth)acryloyloxyethyl hexahydrophthalic acid, 2-(meth)acryloyloxyethyl maleic acid, 2-(meth)acryloyloxypropyl succinic acid, 2-(meth)acryloyloxypropyl adipic acid, 2-(meth)acryloyloxypropyl hydrophthalic acid, 2-(meth)acryloyloxypropyl phthalic acid, 2-(meth) acryloyloxypropyl maleic acid, 2-(meth)acryloyloxybutyl succinic acid, 2-(meth)acryloyloxybutyl adipic acid, 2-(meth)acryloyloxybutyl hydrophthalic acid, 2-(meth) acryloyloxybutyl phthalic acid, 2-(meth) acryloyloxybutyl maleic acid, a monomer obtained by adding to (meth)acrylic acid one of lactones such as ε-caprolactone, β-propiolactone, γ-butyrolactone, δ-valerolactone, and so on, a monomer obtained by adding to a hydroxyalkyl(meth)acrylate, an acid (anhydride) such as (anhydrous) succinic acid, (anhydrous) phthalic acid or (anhydrous) maleic acid, or the like. Among them, (meth)acrylic acid and 2-(meth)acryloyloxyethyl succinic acid are preferred, and (meth)acrylic acid is more preferred. These may be used in combination of two or more.

The ester of an aliphatic polyhydroxy compound with an unsaturated carboxylic acid may be an acrylate such as ethylene glycol diacrylate, triethylene glycol diacrylate, trimethylolpropane triacrylate, trimethylolethane triacrylate, pentaerythritol diacrylate, pentaerythritol triacrylate, pentaerythritol tetraacrylate, dipentaerythritol tetraacrylate, dipentaerythritol pentaacrylate, dipentaerythritol hexaacrylate, glycerol acrylate, or the like. Further, the ester may be a methacrylate, an itaconate, a crotonate or a maleate obtained by replacing the acrylic acid moiety of the aforementioned acrylates with a methacrylic acid moiety, an itaconic acid moiety, a crotonic acid moiety or a maleic acid moiety, respectively.

The ester of an aromatic polyhydroxy compound with an unsaturated carboxylic acid may be hydroquinone diacrylate, hydroquinone dimethacrylate, resorcin diacrylate, resorcin dimethacrylate, pyrogallol triacrylate, or the like.

The ester obtained by an esterification reaction of an unsaturated carboxylic acid and a polybasic carboxylic acid with a polyhydric hydroxy compound is not necessarily a single substance, but it may be a mixture. Typical examples of the ester include a condensation product of acrylic acid, phthalic acid and ethylene glycol, a condensation product of acrylic acid, maleic acid and diethylene glycol, a condensation product of methacrylic acid, terephthalic acid and pentaerythritol, a condensation product of acrylic acid, adipic acid, butanediol and glycerol, and so on.

The ethylenic compound with a urethane skeleton obtained by reacting a polyisocyanate compound and a (meth)acryloyl group-containing hydroxy compound may be a reaction product of an aliphatic diisocyanate such as hexamethylene diisocyanate, trimethylhexamethylene diisocyanate, or the like; an alicyclic diisocyanate such as cyclohexane diisocyanate, isophorone diisocyanate, or the like; an aromatic diisocyanate such as tolylene diisocyanate, diphenylmethane diisocyanate, or the like, with a (meth)acryloyl group-containing hydroxy compound such as 2-hydroxyethyl acrylate, 2-hydroxyethyl methacrylate, 3-hydroxy(1,1,1-triacryloyloxymethyl)propane, 3-hydroxy(1,1,1-trimethacryloyloxymethyl)propane, or the like.

Other examples of the ethylenic compound used in the present invention include acryl amides such as ethylenebisacrylamide; allyl esters such as diallyl phthalate; vinyl group-containing compounds such as divinyl phthalate.

The compounding rate of the ethylenic compounds is usually in a range of from 10 to 80% by weight, preferably in a range of from 20 to 70% by weight, relative to the total solid content of the composition for a color filter.

(c) Colorant

In order to utilize the light from the backlight as effectively as possible, it is necessary to select a colorant so that, in accordance with the red, green and blue emission wavelengths of the backlight, the transmittance at the emission wavelengths of the phosphor in each color pixel becomes as high as possible, while the transmittance becomes as low as possible at the other emission wavelengths.

The present invention is characterized particularly by a high color reproducibility not available by conventional LED backlight, and accordingly, a due care is required for the selection of the colorants. Namely, in order to sufficiently utilize the characteristics of a backlight having deep red and green emission wavelengths characteristic to the present invention, it is required to satisfy the following conditions.

(c-1) Red Composition

Firstly, a red composition (red resist) constituting red pixels will be described.

The pigments to be used for the red composition in the present invention, may be organic pigments, such as azo type, phthalocyanine type, quinacridone type, benzimidazolone type, isoindoline type, dioxazine type, indanthrone type, perylene type and diketopyrrolopyrol type pigments, and, in addition thereto, various inorganic pigments.

Specifically, pigments having the following pigment numbers may, for example, be used. Here, the term "C. I." below means a color index (C. I.).

Red colorant: C. I. pigment red 1, 2, 3, 4, 5, 6, 7, 8, 9, 12, 14, 15, 16, 17, 21, 22, 23, 31, 32, 37, 38, 41, 47, 48, 48:1, 48:2, 48:3, 48:4, 49, 49:1, 49:2, 50:1, 52:1, 52:2, 53, 53:1, 53:2, 53:3, 57, 57:1, 57:2, 58:4, 60, 63, 63:1, 63:2, 64, 64:1, 68, 69, 81, 81:1, 81:2, 81:3, 81:4, 83, 88, 90:1, 101, 101:1, 104, 108, 108:1, 109, 112, 113, 114, 122, 123, 144, 146, 147, 149, 151, 166, 168, 169, 170, 172, 173, 174, 175, 176, 177, 178, 179, 181, 184, 185, 187, 188, 190, 193, 194, 200, 202, 206, 207, 208, 209, 210, 214, 216, 220, 221, 224, 230, 231, 232, 233, 235, 236, 237, 238, 239, 242, 243, 245, 247, 249, 250, 251, 253, 254, 255, 256, 257, 258, 259, 260, 262, 263, 264, 265, 266, 267, 268, 269, 270, 271, 272, 273, 274, 275, 276.

Further, for fine adjustment of the color, the following yellow colorant may be mixed to the above red colorant.

Yellow colorant: C. I. pigment yellow 1, 1:1, 2, 3, 4, 5, 6, 9, 10, 12, 13, 14, 16, 17, 24, 31, 32, 34, 35, 35:1, 36, 36:1, 37, 37:1, 40, 41, 42, 43, 48, 53, 55, 61, 62, 62:1, 63, 65, 73, 74, 75, 81, 83, 87, 93, 94, 95, 97, 100, 101, 104, 105, 108, 109, 110, 111, 116, 119, 120, 126, 127, 127:1, 128, 129, 133, 134, 136, 138, 139, 142, 147, 148, 150, 151, 153, 154, 155, 157, 158, 159, 160, 161, 162, 163, 164, 165, 166, 167, 168, 169, 170, 172, 173, 174, 175, 176, 180, 181, 182, 183, 184, 185, 188, 189, 190, 191, 191:1, 192, 193, 194, 195, 196, 197, 198, 199, 200, 202, 203, 204, 205, 206, 207, 208.

(c-2) Green Composition

Now, a green composition (green resist) constituting green pixels will be described.

The pigments to be used for the green composition of the present invention may be organic pigments, such as azo type and phthalocyanine type pigments, and, in addition thereto, various inorganic pigments.

Specifically, pigments having the following pigment numbers may, for example, be used.

Green colorant: C. I. pigment green 1, 2, 4, 7, 8, 10, 13, 14, 15, 17, 18, 19, 26, 36, 45, 48, 50, 51, 54, 55.

Further, for fine adjustment of the color, the above mentioned yellow colorant may be mixed to the above green colorant.

As green pixels, a specific example to satisfy the above conditions preferably comprises pigment green 36 and/or pigment green 7 as a green pigment, and at least one of pigment yellow 150, pigment yellow 138 and pigment yellow 139, as a yellow pigment for color adjustment.

In the present invention, in a case where a color image display device having a NTSC ratio of at least 87%, particularly at least 90%, is to be prepared, it is preferred to employ pigment green 7 instead of pigment green 36 from the viewpoint of the film-forming property. If pigment green 36 is used, the pigment concentration becomes high, whereby a problem such as development failure or foreign matter defects in die coat treatment may sometimes be brought about, and a due care will be required. Namely, for example, in a case where the after mentioned backlight of Example 3 is to be used, if, as shown in Table 2, it is designed to prepare a color filter with a green resist (Blend Example 1) using pigment green 7, the total of the pigment concentration becomes 37.7 wt %. On the other hand, if it is designed to prepare a color filter with a green resist (Blend Example 2) using pigment green 36, the total of the pigment concentration becomes 53.1 wt %. Such Blend Examples 1 and 2 correspond to the after mentioned Examples 3A and 3B, respectively.

In the present invention, a combination of pigments for green resist particularly suitable for the preparation of a color image display device having a NTSC ratio of at least 87%, particularly at least 90%, is a combination of pigment green 7 and pigment yellow 150, and their blend ratio (wt %) is pigment green 7:pigment yellow 150 being usually from 9:1 to 1:9, preferably from 8:2 to 2:8, more preferably from 7:3 to 3:7.

TABLE 2

| Green pixels | Pigment green 7 (wt %) | Pigment green 36 (wt %) | Pigment yellow 150 (wt %) | Clear (wt %) |
|---|---|---|---|---|
| Blend Example 1 | 19.4 | 0 | 18.3 | 62.3 |
| Blend Example 2 | 0 | 37.2 | 15.9 | 46.9 |

(c-3) Blue Composition

Now, a blue composition (blue resist) constituting blue pixels will be described.

As pigments to be used for the blue composition of the present invention, pigments having the following pigment numbers may, for example, be used.

Blue colorant: C. I. pigment blue 1, 1:2, 9, 14, 15, 15:1, 15:2, 15:3, 15:4, 15:6, 16, 17, 19, 25, 27, 28, 29, 33, 35, 36, 56, 56:1, 60, 61, 61:1, 62, 63, 66, 67, 68, 71, 72, 73, 74, 75, 76, 78, 79

Violet colorant: C. I. pigment violet 1, 1:1, 2, 2:2, 3, 3:1, 3:3, 5, 5:1, 14, 15, 16, 19, 23, 25, 27, 29, 31, 32, 37, 39, 42, 44, 47, 49, 50

(c-4) Fine Adjustment of Color of Color Composition

Further, irrespective of red, green or blue, the following pigments may further be used, as the case requires, for fine adjustment of the color.

Orange colorant: C. I. pigment orange 1, 2, 5, 13, 16, 17, 19, 20, 21, 22, 23, 24, 34, 36, 38, 39, 43, 46, 48, 49, 61, 62, 64, 65, 67, 68, 69, 70, 71, 72, 73, 74, 75, 77, 78, 79

Brown colorant: C. I. pigment brown 1, 6, 11, 22, 23, 24, 25, 27, 29, 30, 31, 33, 34, 35, 37, 39, 40, 41, 42, 43, 44, 45

It is, of course, possible to use other colorants such as dyes. The dyes may, for example, be an azo dye, an anthraquinone dye, a phthalocyanine dye, a quinonimine dye, a quinoline dye, a nitro dye, a carbonyl dye and a methine dye.

The azo dye may, for example, be C. I. acid yellow 11, C. I. acid orange 7, C. I. acid red 37, C. I. acid red 180, C. I. acid blue 29, C. I. direct red 28, C. I. direct red 83, C. I. direct yellow 12, C. I. direct orange 26, C. I. direct green 28, C. I. direct green 59, C. I. reactive yellow 2, C. I. reactive red 17, C. I. reactive red 120, C. I. reactive black 5, C. I. disperse orange 5, C. I. disperse red 58, C. I. disperse blue 165, C. I. basic blue 41, C. I. basic red 18, C. I. mordant red 7, C. I. mordant yellow 5 or C. I. mordant black 7.

The anthraquinone dye may, for example, be C. I. vat blue 4, C. I. acid blue 40, C. I. acid green 25, C. I. reactive blue 19, C. I. reactive blue 49, C. I. disperse red 60, C. I. disperse blue 56 or C. I. disperse blue 60.

With respect to others, the phthalocyanine dye may, for example be C. I. pad blue 5; the quinonimine dye may, for example, be C. I. basic blue 3 or C. I. basic blue 9; the quinoline dye may, for example, be C. I. solvent yellow 33, C. I. acid yellow 3 or C. I. disperse yellow 64; and the nitro dye may, for example, be C. I. acid yellow 1, C. I. acid orange 3 or C. I. disperse yellow 42.

Further, as colorants which may be used for the composition for a color filter, inorganic colorants such as barium sulfate, lead sulfate, titanium oxide, yellow lead, iron red, chromium oxide and carbon black, may, for example, be used.

Further, such colorants are preferably used after disperse treatment to have an average particle diameter of at most 1.3 μm, preferably at most 0.5 μm, more preferably at most 0.3 μm.

These colorants are incorporated in a range of usually from 5 to 60 wt %, preferably from 10 to 50 wt %, in the total solid content of the composition for a color filter.

(d) Additives

To the composition for a color filter, a photopolymerization initiator, a thermal polymerization inhibitor, a plasticizer, a storage stabilizer, a surface protecting agent, a smoothing agent, a coating-assisting agent and other additives may further be added, as the case requires.

(d-1) Photopolymerization Initiation System

In a case in which the composition for a color filter comprises an ethylenic compound as (b) a monomer, it is necessary to use a photopolymerization initiation system having a function of directly absorbing light or being sensitized with light to induce a decomposition or hydrogen abstraction reaction to generate polymerization-active radicals.

The photopolymerization initiation system is comprised of a system containing a polymerization initiator and an additive such as an accelerator. The polymerization initiator may be, for example, a radical activator, such as metallocene compounds including titanocene compounds as described in each of JP-A-59-152396 and JP-A-61-151197, hexaaryl biimidazole derivatives such as 2-(2'-chlorophenyl)-4,5-diphenyl imidazol, halomethyl-s-triazine derivatives, N-aryl-α-amino acids such as N-phenyl glycine, salts of N-aryl-α-amino acids, esters of N-aryl-α-amino acids, and so on as described in JP-A-10-39503.

The accelerator to be used is, for example, alkyl N,N-dialkylamino benzoate such as ethyl N,N-dimethylaminobenzoate, a mercapto compound having a heterocyclic ring such as 2-mercaptobenzothiazole, 2-mercaptobenzoxazole or 2-mercaptobenzoimidazole, an aliphatic polyfunctional mercapto compound, or the like. Each of the photopolymerization initiator and the additive may be used in combination of two or more kinds.

The compounding rate of the photopolymerization initiation system is in a range of from 0.1 to 30% by weight, preferably from 0.5 to 20% by weight, more preferably from 0.7 to 10% by weight to the total solid content of the composition of the present invention. If the compounding rate is too low, the sensitivity will become lower. On the other hand, if it is too high, the solubility of unexposed portions in a developer will be degraded, so as to easily induce development failure.

(d-2) Thermal Polymerization Inhibitor

The thermal polymerization inhibitor to be used may be, for example, hydroquinone, p-methoxyphenol, pyrogallol, catechol, 2,6-t-butyl-p-cresol, β-naphthol, or the like. The compounding rate of the thermal polymerization inhibitor is preferably in a range of from 0 to 3% by weight to the total solid content of the composition.

(d-3) Plasticizer

The plasticizer to be used may be, for example, dioctyl phthalate, didodecyl phthalate, triethylene glycol dicaprylate, dimethyl glycol phthalate, tricresyl phosphate, dioctyl adipate, dibutyl sebacate, glycerol triacetate, or the like. The compounding rate of the plasticizer is preferably in a range of at most 10% by weight to the total solid content of the composition.

(d-4) Sensitizing Dye

Furthermore, for a purpose of improving the sensitivity, a sensitizing dye according to a wavelength of an image exposure light source can be mixed in the composition for a color filter, if the case demands.

Examples of the sensitizing dye include xanthane dyes as described in JP-A-04-221958 and JP-A-04-219756, coumarin dyes having a heterocyclic ring as described in JP-A-03-239703 and JP-A-05-289335, 3-ketocoumarin compounds as described in JP-A-03-239703 and JP-A-05-289335, pyrromethene dyes as described in JP-A-06-19240, and dyes having a dialkyl aminobenzene skeleton as described in JP-A-47-2528, JP-A-54-155292, JP-B-45-37377, JP-A-48-84183, JP-A-52-112681, JP-A-58-15503, JP-A-60-88005, JP-A-59-56403, JP-A-02-69, JP-A-57-168088, JP-A-05-107761, JP-A-05-210240, and JP-A-04-288818.

Among these sensitizing dyes, preferred is an amino group-containing sensitizing dye, and more preferred is a compound having an amino group and a phenyl group in the same molecule. Particularly preferred is, for example, a benzophenone type compound such as 4,4'-bis(dimethylamino)

benzophenone, 4,4'-bis(diethylamino)benzophenone, 2-aminobenzophenone, 4-aminobenzophenone, 4,4'-diaminobenzophenone, 3,3'-diaminobenzophenone or 3,4-diaminobenzophenone; a p-dialkylaminophenyl group-containing compound such as 2-(p-dimethylaminophenyl) benzoxazole, 2-(p-diethylaminophenyl)benzoxazole, 2-(p-dimethylaminophenyl)benzo[4,5]benzoxazole, 2-(p-dimethylaminophenyl)benzo[6,7]benzoxazole, 2,5-bis(p-diethylaminophenyl)1,3,4-oxazole, 2-(p-dimethylaminophenyl)benzothiazole, 2-(p-diethylaminophenyl)benzothiazole, 2-(p-dimethylaminophenyl)benzimidazole, 2-(p-diethylaminophenyl)benzimidazole, 2,5-bis(p-diethylaminophenyl)1,3,4-thiadiazole, (p-dimethylaminophenyl)pyridine, (p-diethylaminophenyl) pyridine, (p-dimethylaminophenyl) quinoline, (p-diethylaminophenyl) quinoline, (p-dimethylaminophenyl)pyrimidine or (p-diethylaminophenyl)pyrimidine; or the like. Among them, most preferred is 4,4'-dialkylaminobezophenone.

The compounding rate of the sensitizing dye is normally in a range of from 0 to 20% by weight, preferably from 0.2 to 15% by weight, and more preferably from 0.5 to 10% by weight to the total solid content of the composition for a color filter.

(d-5) Other Additives

To the composition for a color filter, an adhesion-improving agent, a coating property-improving agent, a development-improving agent, and so on, may further be optionally added as other additives.

The composition for a color filter may be used as dissolved in a solvent, in order to control the viscosity and to dissolve the additives of the photopolymerization initiation system and others.

The solvent can be optionally selected in accordance with the components of the composition such as (a) the binder resin, (b) the monomer, etc. and the solvent may be, for example, diisopropyl ether, mineral spirit, n-pentane, amyl ether, ethyl caprylate, n-hexane, diethyl ether, isoprene, ethyl isobutyl ether, butyl stearate, n-octane, Varsol #2, Apco #18 solvent, diisobutylene, amyl acetate, butyl acetate, Apco thinner, butyl ether, diisobutyl ketone, methyl cyclohexene, methyl nonyl ketone, propyl ether, dodecane, Socal solvent No. 1 and No. 2, amyl formate, dihexyl ether, diisopropyl ketone, Solveso #150, (m, sec, t)-butyl acetate, hexene, Shell TS28 solvent, butyl chloride, ethyl amyl ketone, ethyl benzoate, amyl chloride, ethylene glycol diethyl ether, ethyl orthoformate, methoxymethylpentanone, methyl butyl ketone, methyl hexyl ketone, methyl isobutyrate, benzonitrile, ethyl propionate, methyl cellosolve acetate, methyl isoamyl ketone, methyl isobutyl ketone, propyl acetate, amyl acetate, amyl formate, bicyclohexyl, diethylene glycol monoethyl ether acetate, dipentene, methoxymethylpentanol, methyl amyl ketone, methyl isopropyl ketone, propyl propionate, propylene glycol-t-butyl ether, methyl ethyl ketone, methyl cellosolve, ethyl cellosolve, ethyl cellosolve acetate, carbitol, cyclohexanone, ethyl acetate, propylene glycol, propylene glycol monomethyl ether, propylene glycol monomethyl ether acetate, propylene glycol monoethyl ether, propylene glycol monoethyl ether acetate, dipropylene glycol monoethyl ether, dipropylene glycol monomethyl ether, dipropylene glycol monomethyl ether acetate, 3-methoxypropionic acid, 3-ethoxypropionic acid, methyl 3-ethoxypropionate, ethyl 3-ethoxypropionate, methyl 3-methoxypropionate, ethyl 3-methoxypropionate, propyl 3-methoxypropionate, butyl 3-methoxypropionate, diglyme, ethylene glycol acetate, ethylcarbitol, butylcarbitol, ethylene glycol monobutyl ether, propylene glycol-t-butyl ether, 3-methyl-3-methoxybutanol, tripropylene glycol methyl ether, 3-methyl-3-methoxybutyl acetate, or the like. These solvents may be used in combination of two or more.

The solid content in the color composition for a color filter is selected in accordance with a coating method to be applied. In a spin coat, a slit and spin coat, and a die coat widely used in the production of the color filter at present, an appropriate solid content is normally in a range of from 1 to 40% by weight and preferably in a range of from 5 to 30% by weight.

A combination of solvents is determined taking a dispersion stability of a pigment, a solubility to soluble components in the solid contents, such as the resin, monomer and photopolymerization initiator, a drying property in coating, and a drying property in a reduced-pressure drying step into consideration.

A composition for a color filter using the above compounded components is produced, for example, as follows.

First, a colorant is subjected to a dispersion treatment and controlled into a state of ink. The dispersion treatment is conducted by means of a paint conditioner, a sand grinder, a ball mill, a roll mill, a stone mill, a jet mill, a homogenizer or the like. The colorant is brought into a state of fine particles by the dispersion treatment, thereby achieving an improvement in transmittance of transmitted light and an improvement in a coating property.

The dispersion treatment is preferably conducted in such a system that a binder resin having a dispersing function, a dispersing agent such as a surfactant, a dispersing assistance, etc. are optionally used together with the colorant and the solvent. It is particularly preferable to use a polymer dispersing agent, by virtue of its excellent dispersion stability over time.

For example, when the dispersion treatment is conducted by use of the sand grinder, it is preferred to use glass beads or zirconia beads having a particle size of from 0.05 to several millimeters. A temperature in the dispersion treatment is normally set in a range of from 0° C. to 100° C., preferably from room temperature to 80° C. A dispersing time is appropriately adjusted because an appropriate time for the dispersion treatment varies depending on the composition of ink (the colorant, the solvent and the dispersing agent), instrument specifications of the sand grinder, and so on.

Then the binder resin, monomer, photopolymerization initiation system, and others are mixed into the color ink obtained by the above dispersion treatment, to form a uniform solution. Since fine foreign particles are often mixed into the solution in each of the dispersion treatment step and the mixing step, the resulting solution is preferably filtered by means of a filter or the like.

EXAMPLES

Now, the present invention will be described in further detail with reference to Preparation Examples, Examples and Comparative Examples, but it should be understood that the present invention is by no means restricted to the following Examples. In the following Examples, "parts" means "parts by weight".

(0) Preparation of Phosphors (0-1) Preparation of Red Phosphor
$Ca_{0.992}Eu_{0.008}AlSiN_3$ Hereinafter Sometimes Referred to as "CASN"

$Eu_2O_3$ (manufactured by RARE METALLIC CO., LTD.), $Ca_3N_2$ (manufactured by SERAC, 200 mesh pass), AlN (manufactured by TOKUYAMA Corporation, grade F) and $Si_3N_4$ (manufactured by Ube Industries, Ltd., SN-E10) were weighed in a nitrogen atmosphere so that the metal element compositional ratio would be Eu:Ca:Al:Si=0.008:0.992:1:1, and mixed by manpower for 20 minutes in a nitrogen atmosphere by means of an alumina mortar to obtain a phosphor raw material. The obtained phosphor raw material was filled in a boron nitride crucible, which was placed in a resistance heating type vacuum/pressure atmosphere heating furnace (manufactured by FUJI DEMPA KOGYO CO., LTD.) and evacuated and heated under a reduced pressure of $<5\times10^{-3}$ Pa (i.e. less than $5\times10^{-3}$ Pa) from room temperature to 800° C. at a temperature raising rate of 10° C./min. When the temperature reached 800° C., the temperature was maintained and high purity nitrogen gas (99.9995%) was introduced for 30 minutes until the pressure became 0.5 MPa. After the introduction, while the pressure was maintained at 0.5 MPa, the temperature was further raised to 1,800° C. at a temperature raising rate of 5° C./min, whereupon the system was maintained at that temperature for two hours and then left to cool to room temperature. The fluorescence property was evaluated, whereby the emission peak wavelength under excitation with 455 nm, was 648 nm.

(0-2) Preparation of Red Phosphor
$Ca_{0.97}Eu_{0.03}AlSi_{1.03}N_3$

Hereinafter Sometimes Referred to as "CASN2"

$Ca_3N_2$, AlN, $Si_3N_4$ and $EuF_3$ (manufactured by Shin-Etsu Chemical Co., Ltd.) were weighed in a nitrogen atmosphere so that the metal element compositional ratio would be Eu:Ca:Al:Si=0.03:0.97:1:1.03.
A CASN phosphor was obtained in the same manner as in the above (0-1) except that the pressure was 0.75 MPa, and the retention time at 1,800° C. was 3 hours. The fluorescence property was evaluated, whereby the emission peak wavelength under excitation with 455 nm was 666 nm.

(0-3) Preparation of Green Phosphor
$Ba_{1.39}Sr_{0.46}Eu_{0.15}SiO_4$

Hereinafter Sometimes Referred to as "BSS"

As raw materials for the phosphor, powders of barium carbonate ($BaCO_3$), strontium carbonate ($SrCO_3$), europium oxide ($Eu_2O_3$) and silicon dioxide ($SiO_2$) were used. Each of these phosphor raw materials had a purity of at least 99.9% and a weight median diameter $D_{50}$ within a range of at least 10 nm and at most 5 μm. These phosphor raw materials were weighed so that the molar ratio would be Ba:Sr:Eu:Si=1.39: 0.46:0.15:1. The powders of these phosphor raw materials were mixed by an automatic mortar sufficiently until the mixture became uniform and then filled in an alumina crucible, followed by firing under the atmospheric pressure in air at 1,100° C. for 12 hours.

Then, the content in the crucible was taken out, and as flux, $SrCl_2$ was added in an amount of 0.1 by the above molar ratio, followed by mixing and pulverization in a dry ball mill. The obtained mixed pulverized product was again filled in an aluminum crucible. At the time of firing, the raw materials were packed into the crucible, and solid carbon (block form) was put thereon, and a cover was put thereon. In a vacuum furnace, the pressure was reduced by a vacuum pump to 5 Pa or lower, and hydrogen-containing nitrogen gas (nitrogen: hydrogen=96:4 (volume ratio)) was introduced to the atmospheric pressure. This operation was repeated again, and then in a hydrogen-containing nitrogen gas (nitrogen:hydrogen=96:4 (volume ratio)) stream, firing was carried out by heating under the atmospheric pressure at 1,200° C. for 4 hours. The obtained fired product was pulverized by a ball mill and then sieved in a slurry state to remove coarse particles, followed by washing with water and rinsing with water to remove fine particles and then by drying and sieving to disintegrate agglomerated particles thereby to obtain a phosphor. The fluorescent property was evaluated, whereby the emission peak wavelength under excitation with 455 nm, was 525 nm.

(0-4) Preparation of Green Phosphor
$Ba_{1.65}Sr_{0.2}Eu_{0.15}SiO_4$

Hereinafter Sometimes Referred to as "BSS2"

A phosphor was prepared in the same manner as the above (0-3) except that the raw materials were sampled so that the molar ratio would be Ba:Sr:Eu:Si=1.65:0.2:0.15:1. The fluorescence property was evaluated, whereby the emission peak wavelength under excitation with 455 nm was 520 nm.

(0-5) Preparation of Green Phosphor
$Ba_{1.88}Eu_{0.12}Si_6O_8N_4$

Hereinafter Sometimes Referred to as "BSON"

Using 6.02 g of $BaCO_3$, 2.87 g of $SiO_2$, 2.23 g of $Si_3N_4$ and 0.34 g of $Eu_2O_3$ so that the charged composition would have a compositional ratio of Ba:Eu:Si=1.88:0.12:6, a phosphor having a charged composition of $Ba_{1.88}Eu_{0.12}Si_6O_8N_4$ was prepared as follows.

These raw material powders were all put into an agate automatic mortar, and ethanol was added, followed by mixing by a wet mixing method until the mixture became uniform. A paste-form mixture thus obtained was dried and filled in an alumina crucible, and the filled mixture was compression-molded by exerting a load lightly. This molded product was placed in a resistance heating-type tubular electric furnace equipped with a temperature controlling device and heated to 1,200° C. at a temperature raising rate of 4.8° C./min under the atmospheric pressure in a mixed stream of 96 volume % of nitrogen+4 volume % of hydrogen at a rate of 0.5 l/min, held at that temperature for 4 hours and then left to cool to room temperature. The obtained sample was pulverized by an alumina mortar, and the pulverized sample was again filled in an alumina crucible, and the filled product was compression-molded by exerting a load lightly. This alumina crucible was placed in a resistance heating system tubular electric furnace equipped with a temperature controlling device and heated to 1,350° C. at a temperature raising rate of 4.8° C./min under atmospheric pressure in a mixed gas stream of 96 volume % of nitrogen+4 volume % of hydrogen at a flow rate of 0.5 l/min, held at that temperature for 72 hours and then left to cool to room temperature. The fluorescence property of the obtained phosphor was evaluated, whereby the emission peak wavelength under excitation with 455 nm was 526 nm.

Here, as $Si_3N_4$, β-$Si_3N_4$ subjected to the following treatment, was employed. 292 g of α-$Si_3N_4$ (manufactured by Ube Industries, Ltd.) was filled in the form of a powder in a boron nitride crucible and compression-molded by exerting a load lightly. This boron nitride crucible was placed in a resistance heating type vacuum/pressure atmosphere heat treatment furnace (manufactured by FUJI DEMPA KOGYO CO., LTD.) and heated under vacuum from room temperature to 800° C. at a temperature raising rate of 20° C./min under a reduced pressure of <5×10⁻³ Pa. When the temperature reached 800° C., while the temperature was maintained, high purity nitrogen gas (99.9995%) was introduced for 30 minutes until the pressure became 0.92 MPa. After the introduction, while 0.92 MPa was maintained, the temperature was raised to 1,200° C. at a temperature raising rate of 20° C./min. After maintaining the temperature at that level for 5 minutes, the thermocouple was changed to a radiation thermometer, and the temperature was further raised to 2,000° C. at a temperature raising rate of 20° C./min. When the temperature reached 2,000° C., the temperature was maintained at that level for two hours, followed by heating to 1,800° C. at a rate of 20° C./min, whereupon the temperature was maintained at that level for 3 hours. After the firing, the temperature was lowered to 1,200° C. at a temperature lowering rate of 20° C./min and then left to cool. The fluorescence property was evaluated, whereby the emission peak wavelength under excitation with 455 nm was 526 nm.

With respect to $Si_3N_4$ before and after the above treatment, the X-ray diffraction measurement and the reflection spectrum measurement were carried out. The respective X-ray diffraction patterns were compared with $\alpha$-$Si_3N_4$ and $\beta$-$Si_3N_4$ peaks of PDF (Powder Diffraction File) 76-1407 and 75-0950, respectively, whereby it was confirmed that $\alpha$-$Si_3N_4$ before the treatment was completely phase-transferred to $\beta$-$Si_3N_4$ by the above treatment.

(1) Preparation of Backlight (1-1) Preparation Example 1

Preparation of Backlight 1 (BL-1)

A light-emitting device is prepared by the following procedure.

A blue light emitting diode having a peak emission wavelength of 454 nm is bonded to a cup bottom surface of a frame by die bonding, and then, the light emitting diode and the frame electrode are connected by wire bonding.

As a green-emitting phosphor, BSS is used, and as a red-emitting phosphor, CASN is used. These phosphors are kneaded into an epoxy resin to obtain a paste, which is applied and cured on the light emitting diode in the cup.

Then, a cyclic polyolefin type resin sheet (trade name "ZEONOR" manufactured by ZEON CORPORATION) of wedge shape, which has a size of 289.6×216.8 mm and a thicknesses varying along the direction of the short side between a maximum thickness of 2.0 mm and a minimum thickness of 0.6 mm, is used as a light guide, and a light source comprised of the above-mentioned light emitting diode is placed along the thick long side, so as to allow emitted light from the linear light source to efficiently enter the thick side (light entrance surface) of the light guide.

The surface opposite to the light exit surface of the light guide is patterned by transferring fine circular patterns of rough surfaces with gradually increasing diameter according to the distance from the linear light source, from a die to the surface. The diameter of the rough surface patterns is 130 μm near the light source, gradually increases with distance from the light source, and is 230 μm at the most distant position.

The die used in the formation of the fine circular patterns of the rough surfaces herein is prepared by laminating a dry film resist in a thickness of 50 μm on a SUS substrate, forming openings in portions corresponding to the patterns by photolithography, further subjecting the die to uniform blasting under a projection pressure of 0.3 MPa with spherical glass beads of #600 by a sandblasting method, and thereafter peeling the dry film resist off.

The light exit surface of the light guide is provided with a triangular prism array with the apex angle of 90° and the pitch of 50 μm so that the ridge lines are approximately perpendicular to the light entrance surface of the light guide, thus achieving a structure of enhancing a light collecting property of beams emitted from the light guide. A die used in the formation of the light collecting element array consisting of the triangular prism array is prepared by a process of cutting a stainless steel substrate overlaid with an M nickel coating by electroless plating, with a single-crystal diamond cutting tool.

A light reflecting sheet ("Lumirror E60L" manufactured by TORAY Industries, Inc.) is placed on the side opposite to the light exit surface of the light guide, a light diffuser sheet is placed on the light exit surface, and two sheets with a triangular prism array having the apex angle of 90° and the pitch of 50 μm ("BEFIII" manufactured by SUMITOMO 3M Limited) are placed on the light diffuser sheet so that the ridge lines of the respective two prism sheets become perpendicular to each other, thereby obtaining a backlight 1 (BL-1). A relative emission spectrum of the backlight 1 (BL-1) thus obtained is presented in FIG. 4. As shown in FIG. 4, the backlight 1 has one emission peak wavelength in each of the wavelength regions of 455 nm, 531 nm and 642 nm.

(1-2) Preparation Example 2

Preparation of Backlight 2 (BL-2)

Figure 5:
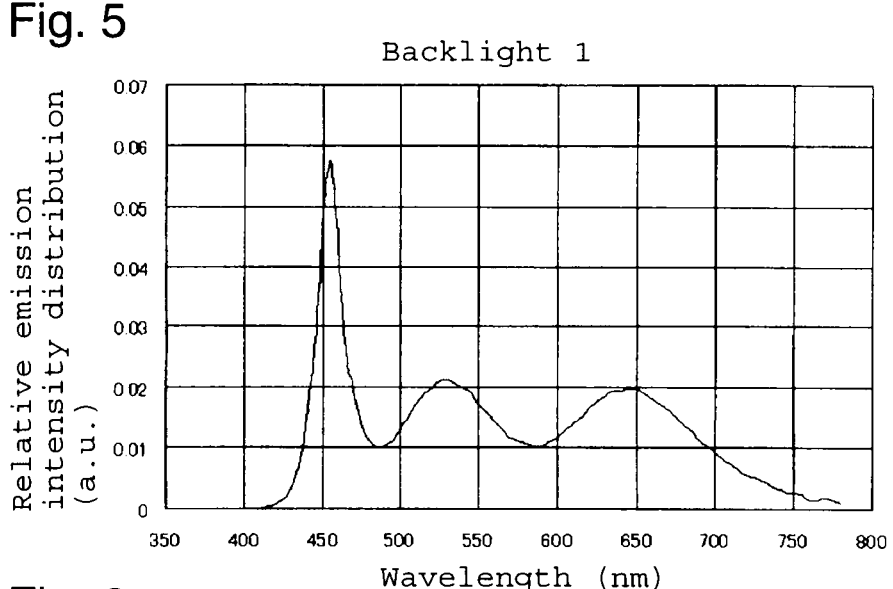
FIG. 5 is a relative emission spectrum of a backlight 1 obtained in Preparation Example 1.

A Backlight 2 (BL-2) is Prepared in the Same Manner as in Preparation Example 1 except that in Preparation Example 1, the compounding ratio of BSS and CASN is changed to bring about an emission spectrum as shown in FIG. 5. As shown in FIG. 5, the backlight 2 has one emission peak wavelength in each of the wavelength regions of 455 nm, 531 nm and 639 nm.

(1-3) Preparation Example 3

Preparation of Backlight 3 (BL-3)

Figure 6:
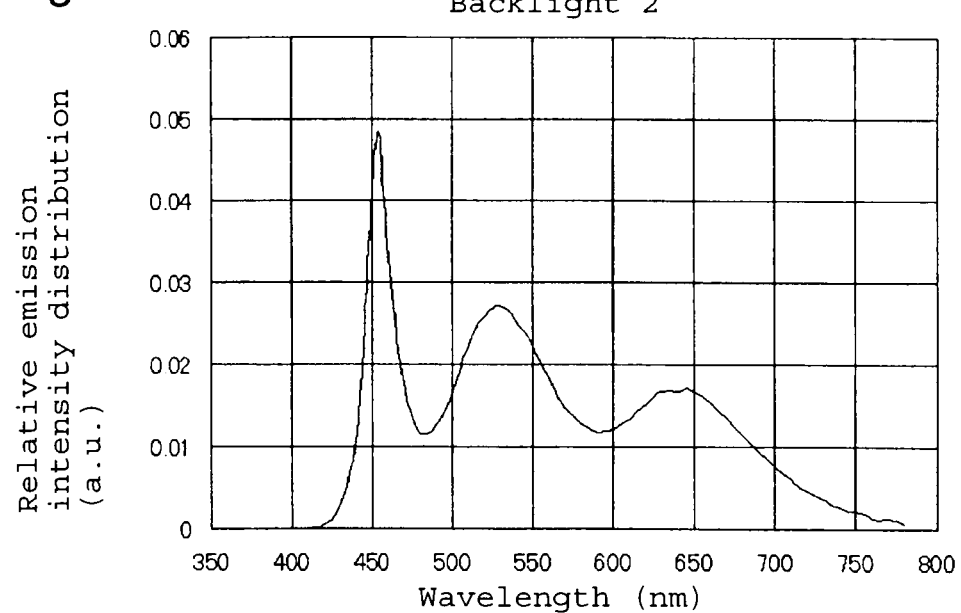
FIG. 6 is a relative emission spectrum of a backlight 2 obtained in Preparation Example 2.

A backlight 3 (BL-3) is prepared in the same manner as in Preparation Example 1 except that in Preparation Example 1, the compounding ratio of BSS and CASN is changed to bring about an emission spectrum as shown in FIG. 6. As shown in FIG. 6, the backlight 3 has one emission peak wavelength in each of the wavelength regions of 455 nm, 531 nm and 641 nm.

(1-4) Preparation Example 4

Preparation of Backlight 4 (BL-4)

Figure 7:
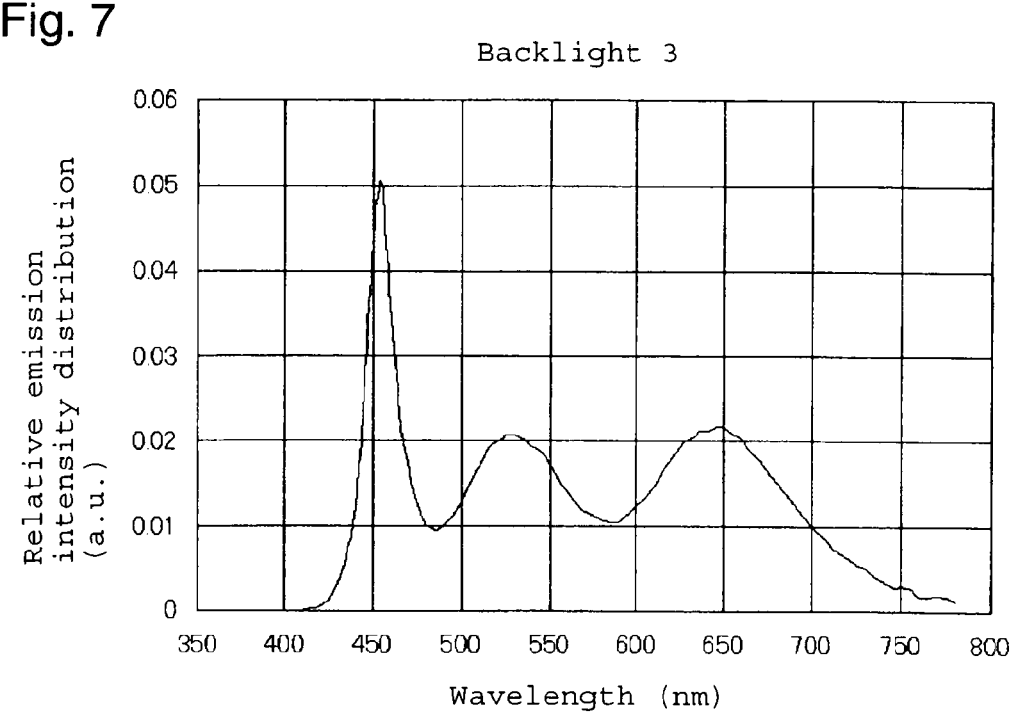
FIG. 7 is a relative emission spectrum of a backlight 3 obtained in Preparation Example 3.

A backlight 4 (BL-4) is prepared in the same manner as in Preparation Example 1 except that in Preparation Example 1, as a green emitting phosphor, BSS is used, and the compounding ratio of BSS and CASN is set to bring about an emission spectrum as shown in FIG. 7. As shown in FIG. 7, the backlight 4 has one emission peak wavelength in each of the wavelength regions of 456 nm, 516 nm and 642 nm.

(1-5) Preparation Example 5

Preparation of Backlight 5 (BL-5)

Figure 8:
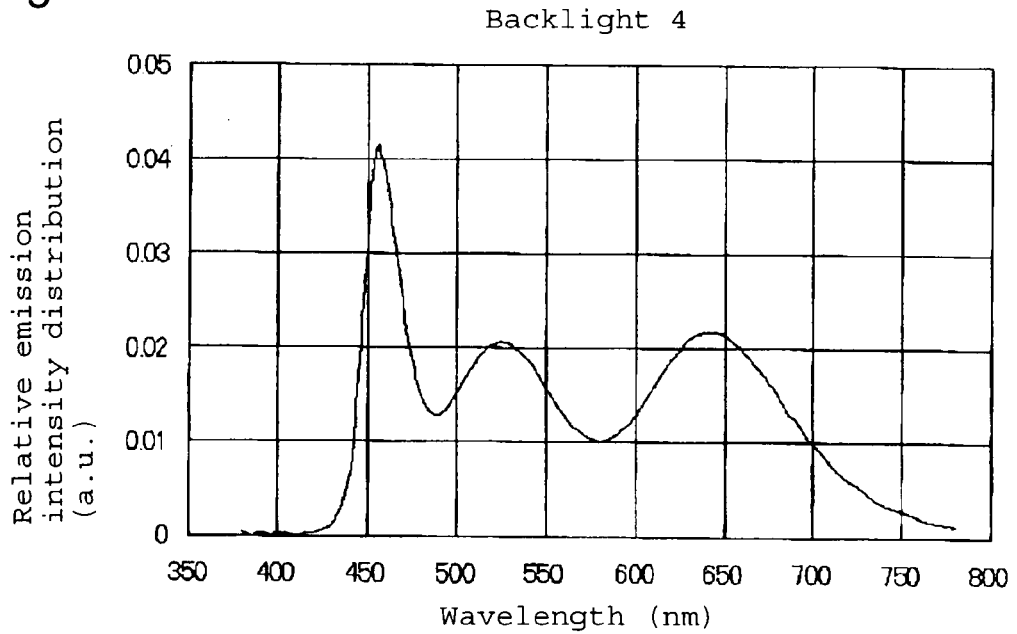
FIG. 8 is a relative emission spectrum of a backlight 4 obtained in Preparation Example 4.
Figure 10:
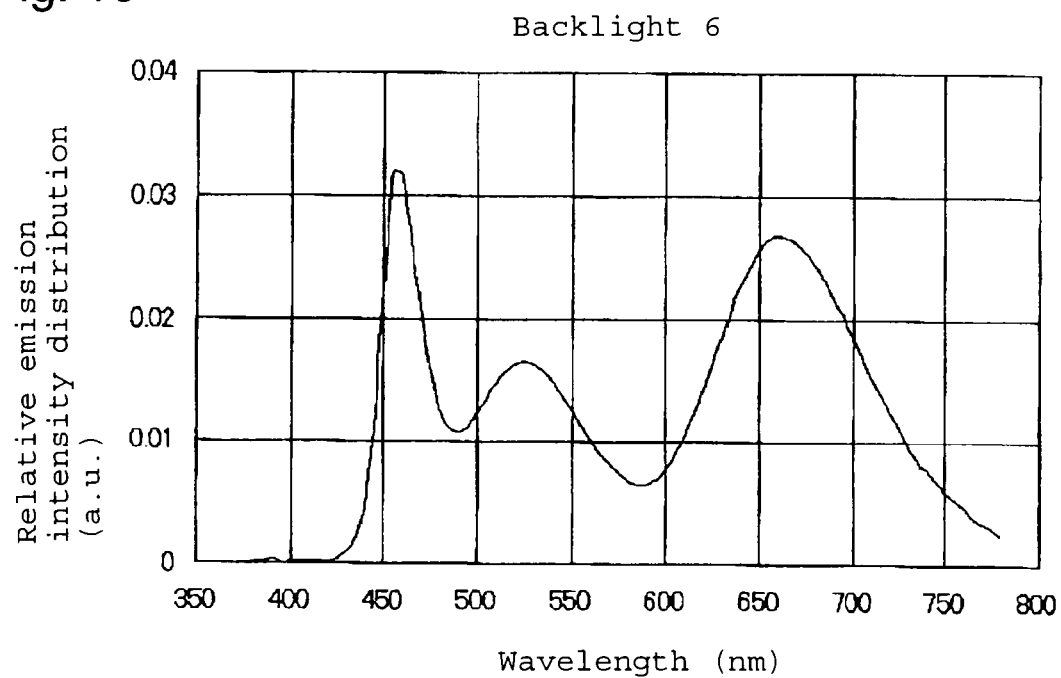
FIG. 10 is a relative emission spectrum of a backlight 6 obtained in Preparation Example 6.
Figure 13:
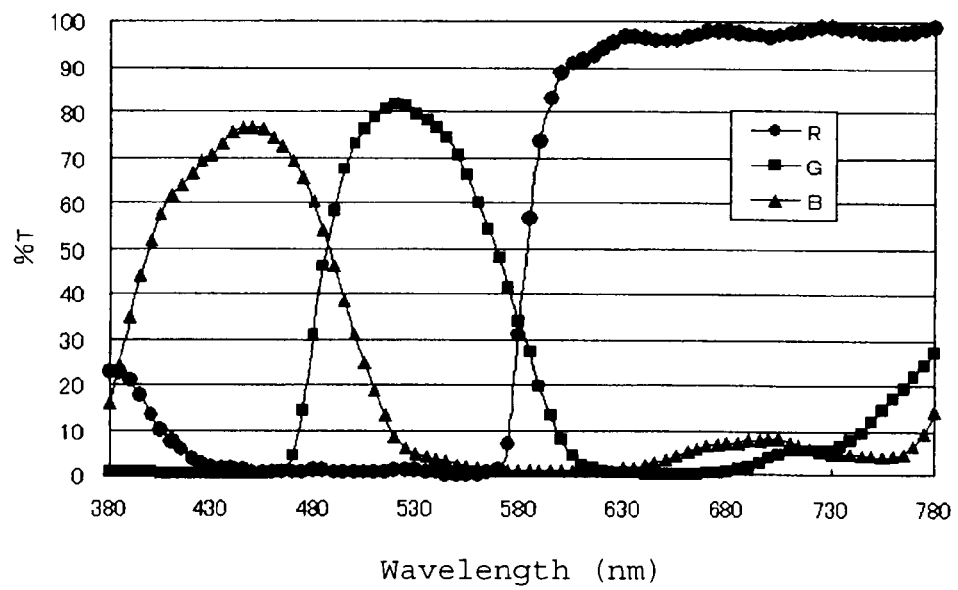
FIG. 13 is a transmittance spectrum of a color filter for Example 2.
Figure 14:
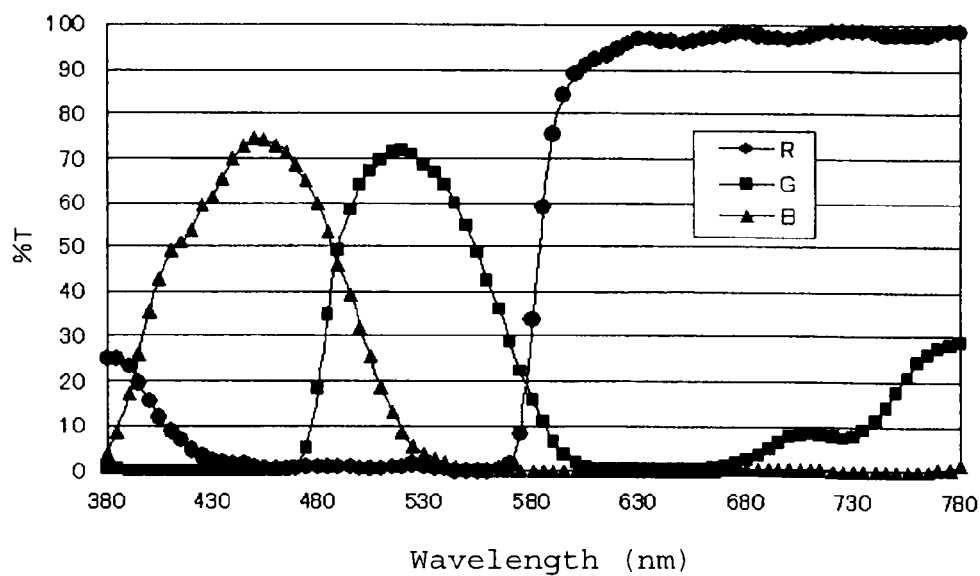
FIG. 14 is a transmittance spectrum of a color filter for Example 3.
Figure 15:
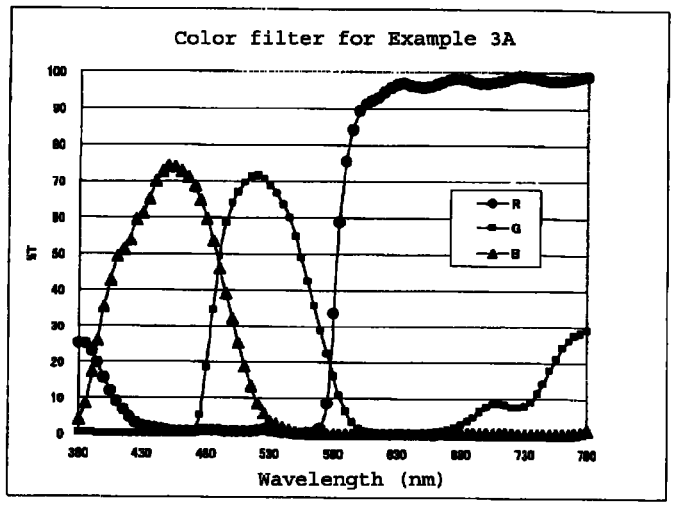
FIG. 15 is a transmittance spectrum of a color filter for Example 3A.
Figure 16:
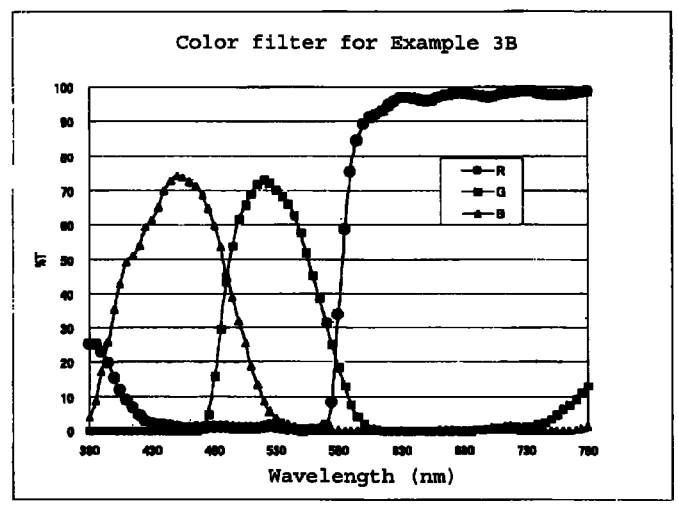
FIG. 16 is a transmittance spectrum of a color filter for Example 3B.
Figure 17:
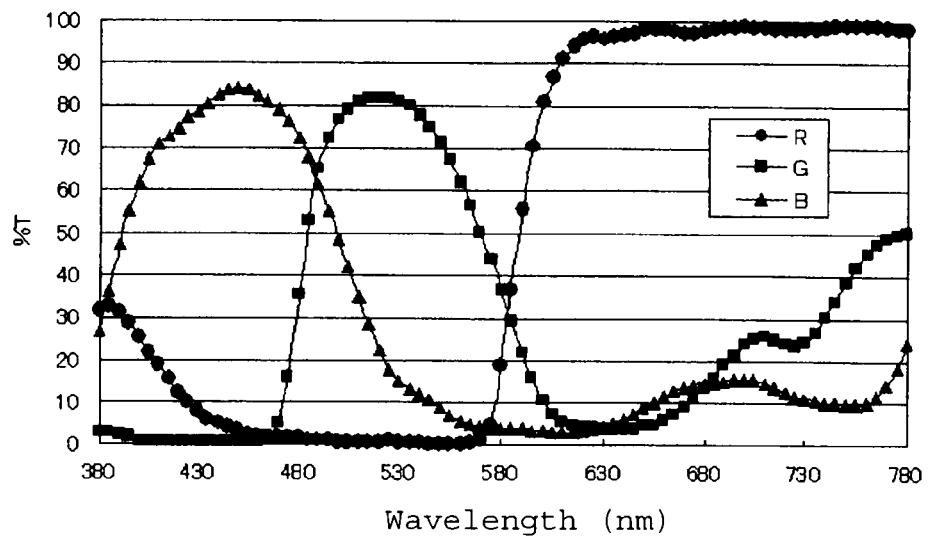
FIG. 17 is a transmittance spectrum of a color filter for Example 4.
Figure 18:
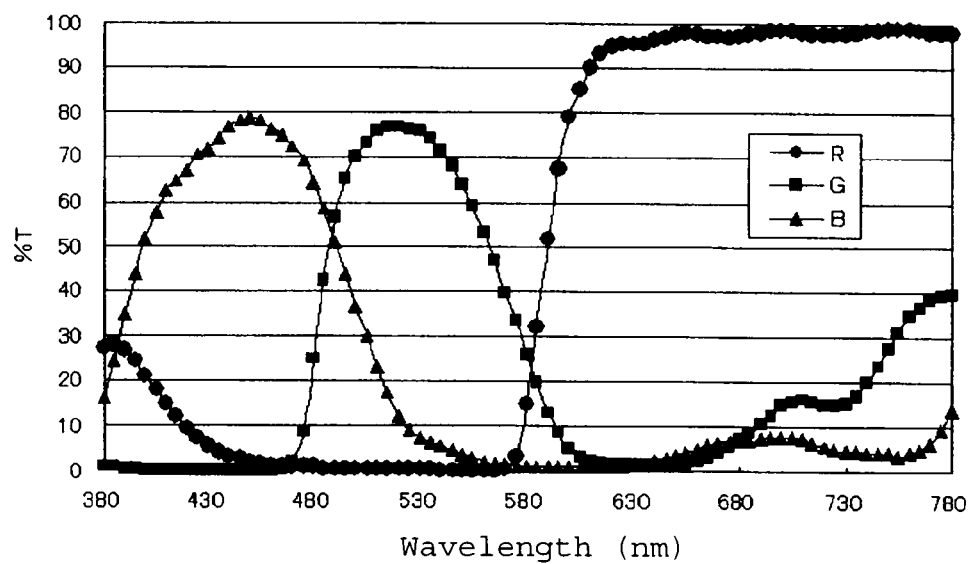
FIG. 18 is a transmittance spectrum of a color filter for Example 5.
Figure 19:
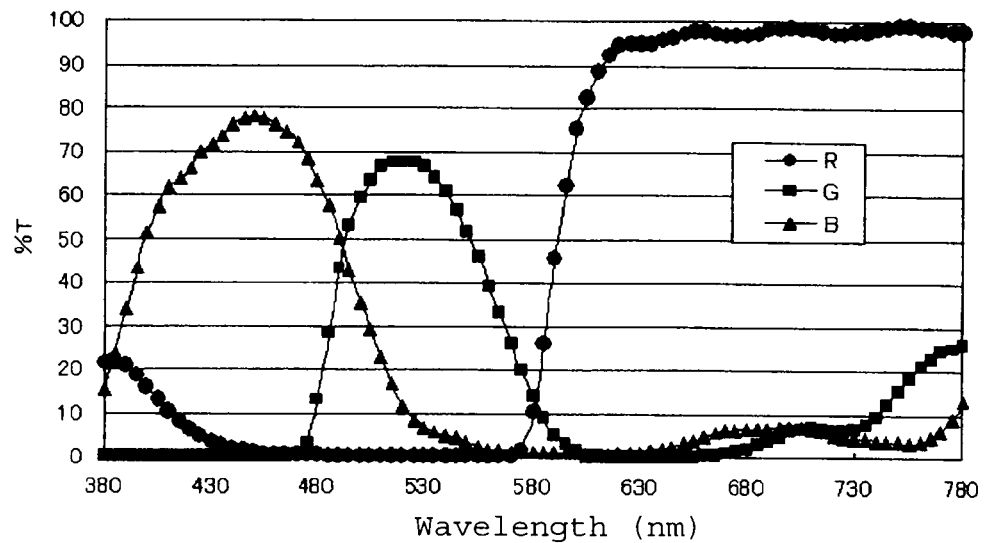
FIG. 19 is a transmittance spectrum of a color filter for Example 6.
Figure 20:
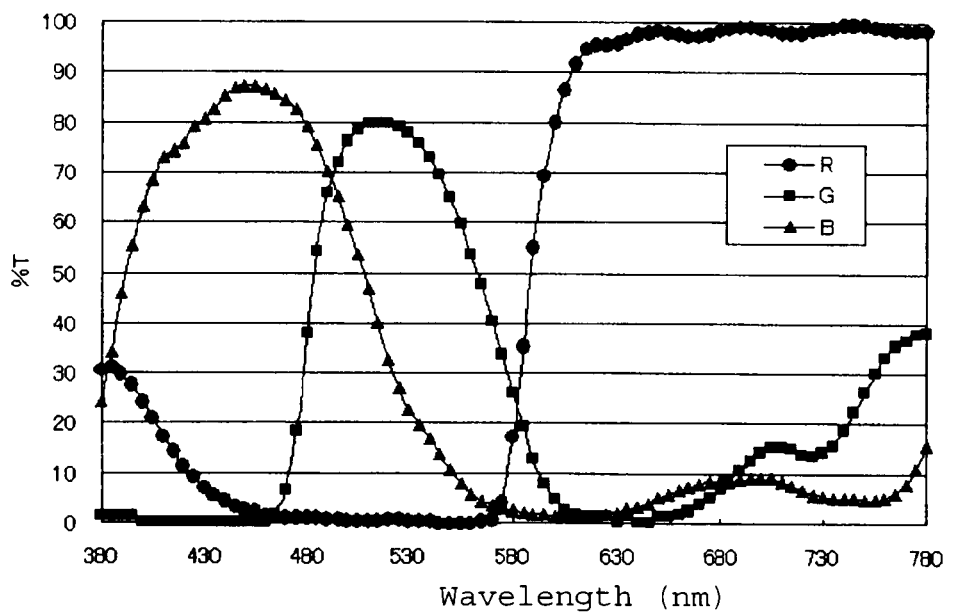
FIG. 20 is a transmittance spectrum of a color filter for Example 7.
Figure 23:
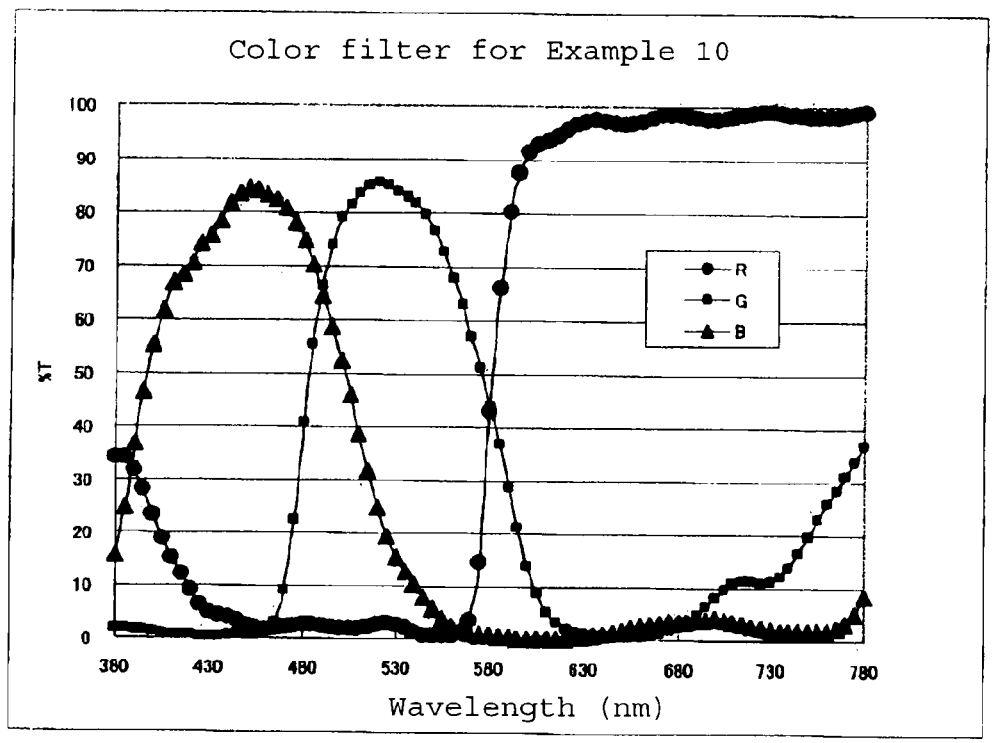
FIG. 23 is a transmittance spectrum of a color filter for Example 10.
Figure 24:
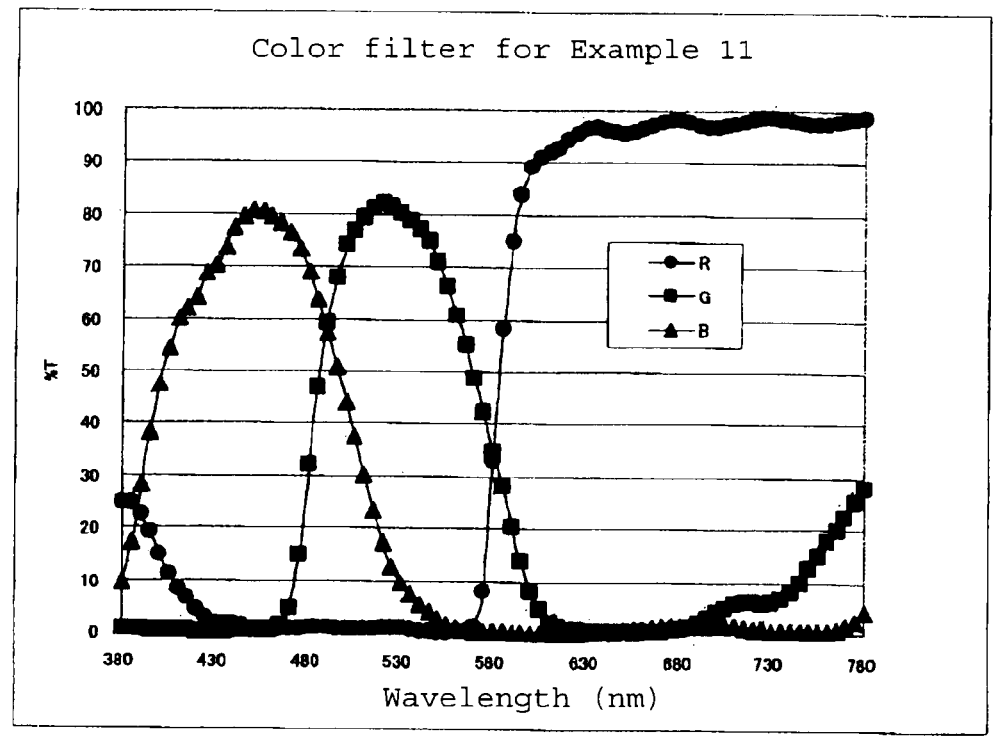
FIG. 24 is a transmittance spectrum of a color filter for Example 11.
Figure 25:
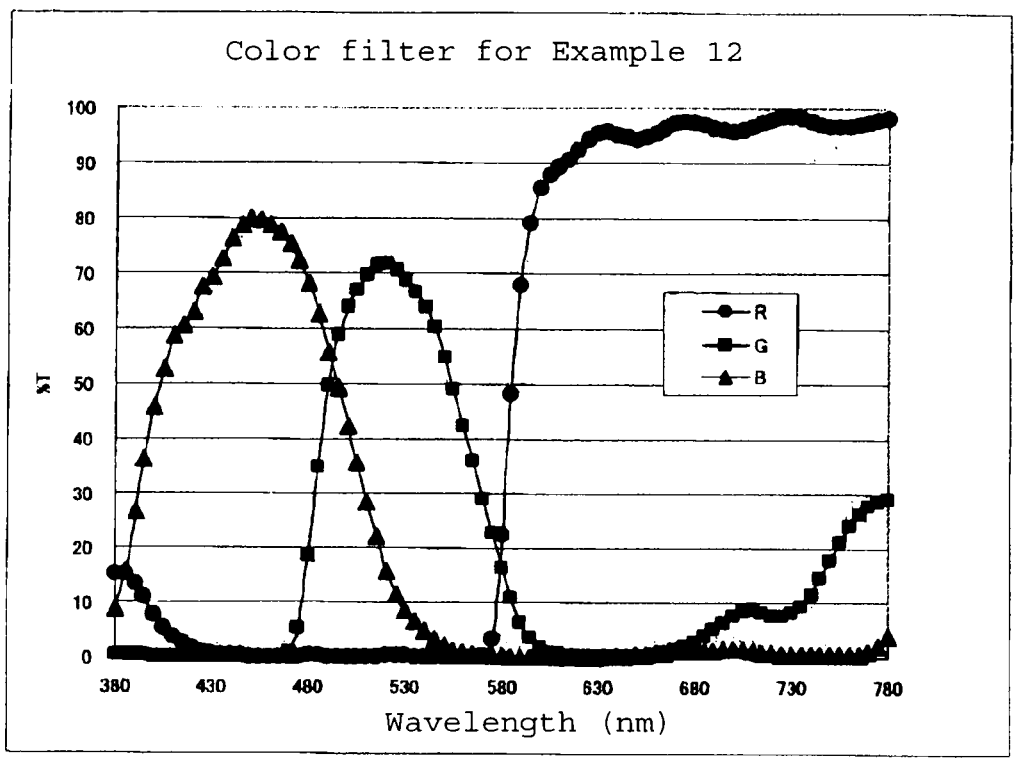
FIG. 25 is a transmittance spectrum of a color filter for Example 12.

A backlight 5 (BL-5) is prepared in the same manner as in Preparation Example 1 except that in Preparation Example 1, as a green emitting phosphor, BSON is used, and the compounding ratio of BSON and CASN is set to bring about an emission spectrum as shown in FIG. 8. As shown in FIG. 10, the backlight 5 has one emission peak wavelength in each of the wavelength regions of 456 nm, 532 nm and 461 nm.

(1-6) Preparation Example 6

Preparation of Backlight 6 (BL-6)

Figure 9:
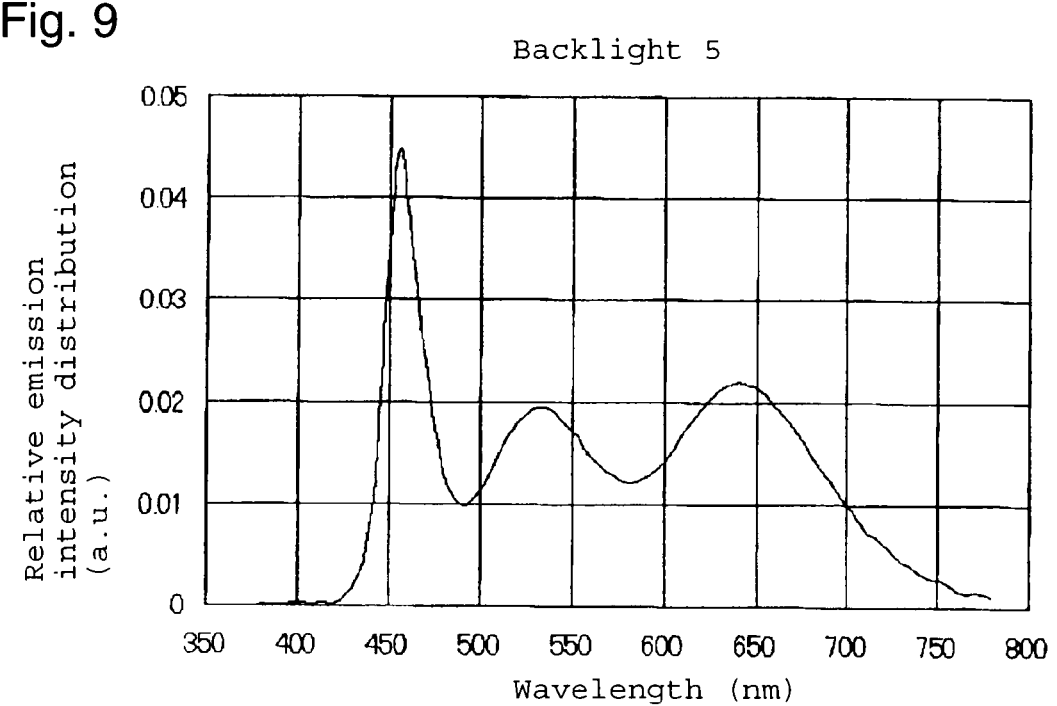
FIG. 9 is a relative emission spectrum of a backlight 5 obtained in Preparation Example 5.

A backlight 6 (BL-6) is prepared in the same manner as in Preparation Example 1 except that in Preparation Example 1, as a green emitting phosphor, BSS is used, and the compounding ratio of BSS and CASN2 is set to bring about an emission spectrum as shown in FIG. 9. As shown in FIG. 9, the backlight 4 has one emission peak wavelength in each of the wavelength regions of 456 nm, 531 nm and 666 nm.

(1-7) Preparation Example 7

Preparation of Conventional Backlight 7 as Comparative Example

A light emitting device is prepared by the following procedure. A blue color emitting diode having a peak emission wavelength of 460 nm is bonded to a cup bottom surface of a frame by die bonding, and then, the light emitting diode and frame electrodes are connected by wire bonding. As a yellow emitting phosphor, $Y_{2.8}Tb_{0.1}Ce_{0.1}Al_5O_{12}$ is employed. This phosphor is kneaded to an epoxy resin to obtain a paste, which is applied and cured on the light emitting diode in the cup. For the subsequent process, the same method as in Preparation Example 1 is used to obtain a conventional backlight 7 as Comparative Example. The relative emission spectrum of the backlight 7 thus obtained is shown in FIG. 11.

(2) Preparation Examples 8 and 9

Preparation of Binder Resins A and B (2-1) Preparation Example 8

Binder Resin A

55 Parts by weight of benzyl methacrylate, 45 parts by weight of methacrylic acid and 150 parts by weight of propylene glycol monomethyl ether acetate are put into a 500 ml separable flask, and the interior of the flask is sufficiently replaced with nitrogen. Thereafter, 6 parts by weight of 2,2'-azobisisobutyronitrile is added, followed by stirring at 80° C. for 5 hours to obtain a polymer solution. The prepared polymer has a weight average molecular weight of 8,000 and an acid value of 176 mg/KOH/g.

(2-2) Preparation Example 9

Binder Resin B

In a 500 ml separable flask, 145 parts by weight of propylene glycol monomethyl ether acetate is stirred while carrying out replacement with nitrogen, and the temperature is raised to 120° C. Then, 20 parts by weight of styrene, 57 parts of glycidyl methacrylate and 82 parts by weight of a monoacrylate having a tricyclodecane skeleton (FA-513M, manufactured by Hitachi Chemical Company, Ltd.) are dropwise added, followed by further stirring at 120° C. for two hours.

Then, the interior of the reactor is replaced with air, 27 parts by weight of acrylic acid, 0.7 part by weight of trisdimethylaminomethylphenol and 0.12 part by weight of hydroquinone are introduced, and the reaction is continued at 120° C. for 6 hours. Thereafter, 52 parts by weight of tetrahydrophthalic anhydride (THPA) and 0.7 part by weight of triethylamine are added, followed by a reaction at 120° C. for 3.5 hours.

The polymer thus obtained has a weight average molecular weight Mw of about 8,000.

(3) Preparation Example 10

Preparation of Clear Resist Solution

A resist solution is obtained by mixing the following components in the following proportions and stirring the components with a stirrer until the components are completely dissolved.
Binder resin B prepared in Preparation Example 9: 2.0 parts
Dipentaerythritol hexaacrylate: 1.0 part
Photopolymerization initiation system
2-(2'-chlorophenyl)-4,5-diphenylimidazole: 0.06 part
2-mercaptobenzothiazole: 0.02 part
4,4'-bis(diethylamino)benzophenone: 0.04 part
Solvent (propylene glycol monomethyl ether acetate): 9.36 parts
Surfactant ("FC-430" manufactured by SUMITOMO 3M Limited): 0.0003 part (4) Preparation of Color Filter (4-1) Preparation Example 11

Preparation of Red Pixels (for Examples 1 to 12 and Comparative Examples 1 and 2)

75 parts of propylene glycol monomethyl ether acetate, 16.7 parts of a red pigment P.R.254, 4.2 parts of acrylic dispersant "DB2000" manufactured by Big Chemie and 5.6 parts of binder resin A prepared in Preparation Example 8 are mixed and stirred with a stirrer for three hours to prepare a mill base having a solid content concentration of 25% by weight. This mill base was subjected to a dispersion treatment at a peripheral velocity of 10 m/s for a residence time of three hours with a bead mill system using 600 parts of 0.5-mmφ zirconia beads, thereby obtaining a P.R.254 dispersed ink.

Another mill base is prepared in the same composition as in the above P.R.254 case except for a change of the pigment to P.Y.139, and is subjected to a dispersion treatment under similar dispersion conditions for a residence time of two hours, thereby obtaining a P.Y.139 dispersed ink. Further, another mill base is prepared in the same composition as in the above P.R.254 except for a change of the pigment to P.Y.150, and is subjected to a dispersion treatment under similar dispersion conditions for a residence time of two hours, thereby obtaining a P.Y.150 dispersed ink.

Further, another mill base is prepared in the same composition as in the above P.R.254 except for a change of the pigment to P.R.177, and is subjected to a dispersion treatment under similar dispersion conditions for a residence time of three hours, thereby obtaining a P.R.177 dispersed ink.

The dispersed inks obtainable as described above and the resist solution obtainable in the above Preparation Example 9 are mixed and stirred in the compounding ratio as shown in the following Table 3, and a solvent (propylene glycol monomethyl ether acetate) is added thereto to bring the final solid content concentration to be 25 wt %, thereby obtaining a composition for a red color filter.

The composition for a color filter thus obtained was applied on a glass substrate of 10 cm×10 cm ("AN635" manufactured by Asahi Glass Company, Limited) by a spin coater, and dried. The entire surface of this substrate is irradiated with ultraviolet light with an exposure amount of 100 mJ/cm$^2$, followed by development with an alkali developer and then by post-baking in an oven at 230° C. for 30 minutes, thereby preparing a red pixel sample for measurement. The thickness of the red pixel after the preparation is adjusted to be 2.5 μm.

TABLE 3

| Red pixel | R254 | R177 | Y139 | Y150 | Clear resist |
|---|---|---|---|---|---|
| For Ex. 1 | 14.1 | 0.0 | 3.2 | 0.0 | 82.7 |
| For Ex. 2 | 20.4 | 0.0 | 5.1 | 0.0 | 74.5 |
| For Ex. 3 | 15.7 | 0.0 | 0.0 | 3.3 | 81.0 |
| For Ex. 3A | 15.7 | 0.0 | 0.0 | 3.3 | 81.0 |
| For Ex. 3B | 15.7 | 0.0 | 0.0 | 3.3 | 81.0 |
| For Ex. 4 | 14.5 | 5.6 | 0.0 | 0.0 | 79.9 |
| For Ex. 5 | 16.4 | 6.3 | 0.0 | 0.0 | 77.3 |
| For Ex. 6 | 19.5 | 7.5 | 0.0 | 0.0 | 73.0 |
| For Ex. 7 | 13.9 | 5.4 | 0.0 | 0.0 | 80.7 |
| For Ex. 8 | 15.9 | 6.1 | 0.0 | 0.0 | 78.0 |
| For Ex. 9 | 19.1 | 7.4 | 0.0 | 0.0 | 73.5 |
| For Ex. 10 | 12.2 | 0.0 | 0.0 | 2.6 | 85.2 |
| For Ex. 11 | 16.0 | 0.0 | 0.0 | 3.4 | 80.6 |
| For Ex. 12 | 21.5 | 0.0 | 0.0 | 4.5 | 74.0 |
| For Comp. Ex. 1 | 14.1 | 12.7 | 0.0 | 0.0 | 73.2 |
| For Comp. Ex. 2 | 16.7 | 17.2 | 0.0 | 0.0 | 66.1 |

(4-2) Preparation Example 12

Preparation of Green Pixel (for Examples 1 to 12, and Comparative Examples 1 and 2)

A mill base is prepared in the same composition as in the P.R.254 case in Preparation Example 11 except for a change of the pigment to P.G.36, and is subjected to a dispersion treatment under similar dispersion conditions for a residence time of one hour, thereby obtaining a P.G.36 dispersed ink. A mill base is prepared in the same manner by changing the pigment to P.G.7, and is subjected to a dispersion treatment under similar conditions for a residence time of two hours, thereby obtaining a P.G.7 dispersed ink.

Further, a mill base is prepared in the same composition as in Preparation Example 11 except for a change of the pigment to P.Y.150, and is subjected to a dispersion treatment under similar conditions for a residence time of two hours, thereby obtaining a P.Y.150 dispersed ink.

The dispersed inks obtainable as described above and the resist solution prepared in the above Preparation Example 9 are mixed and stirred in the compounding ratio as shown in the following Table 4, and a solvent (propylene glycol monomethyl ether acetate) is added to is bring the final solid content concentration to be 25 wt %, thereby obtaining a composition for a green color filter.

The composition for a color filter thus obtained is applied on a glass substrate of 10 cm×10 cm ("AN635", manufactured by Asahi Glass Company, Limited) by a spin coater, and dried. The entire surface of this substrate is irradiated with ultraviolet light with an exposure amount of 100 mJ/cm$^2$, followed by development with an alkali developer and then by post-baking in an oven at 230° C. for 30 minutes, thereby preparing a green pixel sample for measurement. The thickness of the green pixel after the preparation is adjusted to be 2.5 μm.

TABLE 4

| Green pixel | G36 | G7 | Y150 | Clear resist |
|---|---|---|---|---|
| For Ex. 1 | 17.1 | 0.0 | 8.2 | 74.7 |
| For Ex. 2 | 31.0 | 0.0 | 12.9 | 56.1 |
| For Ex. 3 | 0.0 | 19.4 | 18.3 | 62.3 |
| For Ex. 3A | 0.0 | 19.4 | 18.3 | 62.3 |
| For Ex. 3B | 37.2 | 0.0 | 15.9 | 46.9 |
| For Ex. 4 | 0.0 | 9.7 | 10.8 | 79.5 |
| For Ex. 5 | 0.0 | 13.0 | 14.4 | 72.6 |
| For Ex. 6 | 0.0 | 19.1 | 21.2 | 59.7 |
| For Ex. 7 | 0.0 | 14.5 | 9.7 | 75.8 |
| For Ex. 8 | 0.0 | 17.7 | 11.8 | 70.5 |
| For Ex. 9 | 0.0 | 26.0 | 17.3 | 56.7 |
| For Ex. 10 | 18.2 | 0.0 | 7.8 | 74.0 |
| For Ex. 11 | 23.3 | 0.0 | 10.0 | 66.7 |
| For Ex. 12 | 0.0 | 19.3 | 18.2 | 62.5 |
| For Comp. Ex. 1 | 37.5 | 0.0 | 3.3 | 59.2 |
| For Comp. Ex. 2 | 60.4 | 0.0 | 2.9 | 36.7 |

(4-3) Preparation Example 13

Preparation of Blue Pixel (for Examples 1 to 12 and Comparative Examples 1 and 2)

A mill base is prepared in the same composition as in the P.R.254 case in Preparation Example 11 except for a change of the pigment to P.G.15:6, and is subjected to a dispersion treatment under similar dispersion conditions for a residence time of one hour, thereby obtaining a P.G.15:6 dispersed ink.

Further, a mill base is prepared in the same composition as in the P.R.254 case in Preparation Example 11 except for a change of the pigment to P.V.23, and is subjected to a dispersion treatment under similar dispersion conditions for a residence time of two hours, thereby obtaining a P.V.23 dispersed ink.

The dispersed inks obtainable as described above, and the resist solution prepared in the above Preparation Example 9 are mixed and stirred in the compounding ratio as shown in the following Table 5, and a solvent (propylene glycol monomethyl ether acetate) is added to bring the final solid content concentration to be 25 wt %, thereby obtaining a composition for a blue color filter.

The composition for a color filter thus obtained is applied on a glass plate of 10 cm×10 cm ("AN635", manufactured by Asahi Glass Company, Limited) by a spin coater and dried. The entire surface of this substrate is irradiated with ultraviolet light with an exposure amount of 100 mJ/cm$^2$, followed by development with an alkali developer and then by post-baking in an oven at 230° C. for 30 minutes, thereby preparing a blue pixel sample for measurement. The thickness of the blue pixel after the preparation is adjusted to be 2.5 μm.

TABLE 5

| Blue pixel | B15:6 | V23 | G36 | Clear resist |
|---|---|---|---|---|
| For Ex. 1 | 10.5 | 4.5 | 0.0 | 85.0 |
| For Ex. 2 | 26.6 | 1.4 | 0.0 | 72.0 |
| For Ex. 3 | 8.5 | 3.6 | 0.0 | 87.9 |
| For Ex. 3A | 8.5 | 3.6 | 0.0 | 87.9 |
| For Ex. 3B | 8.5 | 3.6 | 0.0 | 87.9 |
| For Ex. 4 | 6.0 | 2.1 | 0.0 | 91.9 |
| For Ex. 5 | 7.7 | 2.7 | 0.0 | 89.6 |
| For Ex. 6 | 8.4 | 2.9 | 0.0 | 88.7 |
| For Ex. 7 | 8.6 | 1.3 | 0.0 | 90.1 |
| For Ex. 8 | 12.5 | 1.8 | 0.0 | 85.7 |
| For Ex. 9 | 13.0 | 1.9 | 0.0 | 85.1 |
| For Ex. 10 | 4.8 | 2.1 | 0.0 | 93.1 |
| For Ex. 11 | 6.1 | 2.6 | 0.0 | 91.3 |

TABLE 5-continued

| Blue pixel | B15:6 | V23 | G36 | Clear resist |
|---|---|---|---|---|
| For Ex. 12 | 6.4 | 2.7 | 0.0 | 90.9 |
| For Comp. Ex. 1 | 8.0 | 3.6 | 5.1 | 83.3 |
| For Comp. Ex. 2 | 16.4 | 1.4 | 9.7 | 72.5 |

(4-4) Color Filters

Color filters of Examples 1 to 12 and Comparative Examples 1 and 2 are prepared by combining the red, green and blue pixels shown in Tables 3 to 5. With respect to the respective color filters, the transmittance spectrum of each of the red pixel sample, the green pixel sample and the blue pixel sample was calculated, and the results are shown in FIGS. 12 to 25.

(5) Color Image Display Devices (5-1) Examples 1 to 3 and Comparative Examples 1 and 2

Color image display devices of Examples 1 to 3 and Comparative Examples 1 and 2 are prepared by combining the backlights (BL-1, BL-2, BL-3 and BL-19) shown in Preparation Examples 1 to 3 and 19 and color filters for Examples 1 to 3 and Comparative Examples 1 and 2. With respect to these color image display devices, the chromaticity (x, y, Y) was calculated from the calculated transmittance spectrum and the emission spectrum of backlight, and also the color reproduction property (NTSC ratio) and the brightness (color temperature) were obtained. Here, the value Y corresponds to the use efficiency of emitted light from the backlight. The results are shown in Table 6.

Further, in Example 3, a backlight and a color filter were actually prepared in accordance with the above production method, and they were combined to obtain a color image display device. And, the emission spectrum of the backlight, the transmittance spectrum of each color pixel sample in the color filter, and the NTSC ratio and color temperature of the color image display device, were measured.

The transmittance spectrum of each pixel sample was measured by a spectrophotometer ("U-3500", manufactured by Hitachi, Ltd.). The emission spectrum of the backlight was measured by a light luminance meter ("CS-1000", manufactured by KONICA MINOLTA HOLDINGS, INC.). Further, from the measured transmittance spectrum and the emission spectrum of the backlight, the chromaticity was calculated.

With respect to Example 3, the measured NTSC ratio and color temperature, and the chromaticity (x, y, Y) calculated based on the results of measurement of the transmittance spectrum of each pixel sample and the emission spectrum of the backlight, are shown in brackets in the corresponding section in Table 6.

TABLE 6

| Phosphor | | BSS + CASN | | | | Yellow phosphor BL-4 | |
|---|---|---|---|---|---|---|---|
| Backlight | | BL-1 | BL-2 | BL-3 | | | Comp. | Comp. |
| Color filter | | Ex. 1 | Ex. 2 | Ex. 3 | Ex. 3A | Ex. 3B | Ex. 1 | Ex. 2 |
| Red | x | 0.645 | 0.650 | 0.655 (0.646) | (0.652) | (0.652) | 0.645 | 0.660 |
| | y | 0.332 | 0.340 | 0.332 (0.335) | (0.332) | (0.332) | 0.330 | 0.330 |
| | Y | 24.9 | 20.0 | 25.8 (25.7) | (26.1) | (26.1) | 16.00 | 14.30 |
| Green | x | 0.257 | 0.236 | 0.214 (0.214) | (0.216) | (0.219) | 0.275 | 0.250 |
| | y | 0.610 | 0.660 | 0.680 (0.666) | (0.679) | (0.683) | 0.600 | 0.650 |
| | Y | 57.6 | 53.9 | 38.7 (38.6) | (39.1) | (40.0) | 42.10 | 30.20 |
| Blue | x | 0.154 | 0.147 | 0.147 (0.146) | (0.147) | (0.147) | 0.150 | 0.140 |
| | y | 0.080 | 0.080 | 0.060 (0.064) | (0.059) | (0.059) | 0.060 | 0.080 |
| | Y | 10.7 | 7.6 | 6.4 (6.8) | (6.3) | (6.3) | 5.10 | 5.80 |
| White | x | 0.307 | 0.304 | 0.327 (0.322) | (0.328) | (0.328) | 0.311 | 0.310 |
| | y | 0.307 | 0.347 | 0.294 (0.296) | (0.295) | (0.298) | 0.310 | 0.310 |
| | Y | 31.1 | 27.2 | 23.6 (23.7) | (23.8) | (24.1) | 21.07 | 16.77 |
| Color temperature (K) | | 7053 | 6836 | 5849 (6154) | (5788) | (5756) | 6781 | 6824 |
| NTSC ratio (%) | | 74 | 85 | 94 (89) | (93) | (93) | 74 | 85 |

The value Y of white color in Table 6 represents the light use efficiency of backlight as the entire color image display device. As shown in Table 6, when a color image display device is designed to have a high color reproduction range by EBU standard (NTSC ratio: 72%) or with a NTSC ratio of 85%, a conventional backlight brings about a remarkable decrease of the value Y, while by using the technique of the present invention, a high level of the value Y can be accomplished. Namely, it becomes possible to obtain a higher luminance by a low power consumption.

Further, with respect to Example 3, when the results obtained by simulation were compared with the results obtained by actual measurements, both results were substantially the same. Accordingly, also with respect to Examples 1 and 2 and Comparative Examples 1 and 2, it is considered that if the corresponding color image display devices are actually prepared, and various properties are measured, the same results as shown in Table 5 will be obtained. Namely, from the results of simulation in the respective Examples and the respective Comparative Examples, the properties such as the NTSC ratio and the light use efficiency of the actual color image display devices may be judged.

Color image display devices of Examples 4 to 6 are prepared by combining the backlight (BL-4) shown in Preparation Example 4 and the color filters of Examples 4 to 6. Further, even Adobe-RGB (NTSC ratio: 94%) which was not accomplished by a conventional backlight, since the thickness of the color filter tended to be too thick, and the plate making property was not obtained, can be accomplished by using the technique of the present invention.

Further, in Example 3, each of the coating films of the compositions for the respective color filters prepared in the above Preparation Examples 13 to 15 was exposed with 100 mJ/cm$^2$ by using a test pattern mask, followed by development, whereby it was confirmed that good patterns were obtained with respect to all samples. The film thickness after drying of the composition for each color filter actually prepared in Example 3 was 2.50 µm in each case.

(5-2) Examples 4 to 6

Color image display devices of Examples 4 to 6 were prepared by combining the backlights (BL-4, BL-5 and BL-6) shown in Preparation Examples 4 to 6 and the color filters for Examples 4 to 6. With respect to these color image display devices, in the same manner as in the above Examples 1 to 3, the chromaticity (x, y, Y), the NTSC ratio and the color temperature were obtained by calculation. The results are shown in Table 7.

Particularly, in Example 6, a backlight and a color filter were actually prepared, and they were combined to obtain a color image display device. With respect to the obtained color image display device, in the same manner as in Example 3, the transmittance spectrum of each color pixel sample, the emission spectrum of the backlight, and the NTSC ratio and color temperature of the color image display device were measured, and at the same time, the chromaticity (x, y, Y) was calculated based on the results of measurement of the transmittance spectrum of each color pixel and the emission spectrum of backlight, and these results are shown in brackets at a lower portion of the corresponding section in Table 7.

TABLE 7

| Phosphor | | BSS2 + CASN | | |
|---|---|---|---|---|
| Backlight | | BL-4 | BL-4 | BL-4 |
| Color filter | | Ex. 4 | Ex. 5 | Ex. 6 |
| Red | x | 0.650 | 0.660 | 0.670 |
| | | | | (0.668) |
| | y | 0.317 | 0.319 | 0.320 |
| | | | | (0.320) |
| | Y | 24.5 | 23.7 | 22.7 |
| | | | | (21.8) |
| Green | x | 0.238 | 0.224 | 0.201 |
| | | | | (0.201) |
| | y | 0.630 | 0.650 | 0.680 |
| | | | | (0.671) |
| | Y | 49.0 | 44.6 | 36.0 |
| | | | | (34.0) |
| Blue | x | 0.155 | 0.143 | 0.143 |
| | | | | (0.143) |
| | y | 0.125 | 0.092 | 0.090 |
| | | | | (0.082) |
| | Y | 15.6 | 9.9 | 9.6 |
| | | | | (8.6) |
| White | x | 0.314 | 0.318 | 0.318 |
| | | | | (0.315) |
| | y | 0.318 | 0.312 | 0.296 |
| | | | | (0.287) |
| | Y | 29.7 | 26.1 | 22.7 |
| | | | | (21.5) |
| Color temperature (K) | | 6488 | 6300 | 6434 |
| | | | | (6740) |
| NTSC ratio (%) | | 74 | 85 | 94 |
| | | | | (93) |

From Table 7, it is evident that also in Examples 4 to 6, like in Examples 1 to 3, it is possible to accomplish the a high light use efficiency as compared with a conventional case even at a high NTSC ratio.

Further, in Example 6, the simulation results and the results obtained by actual measurement were substantially the same, and accordingly, it is considered reasonable to judge the properties such as the NTSC ratio and the light use efficiency of an actual color image display device from the simulation results.

Further, in Example 6, the film thickness after drying the composition for each color filter actually prepared was 2.50 µm in each case, and thus, like in Example 3, it was confirmed that a good pattern is obtainable.

(5-3) Examples 7 to 9

Color image display devices of Examples 7 to 9 are prepared by combining the backlight (BL-5) shown in Preparation Example 5 and the color filters for Examples 7 to 9. With respect to these color image display devices, in the same manner as in the above Examples 1 to 3, the chromaticity (x, y, Y), the NTSC ratio and the color temperature were obtained by calculation. The results are shown in Table 8.

Particularly, with respect to Example 9, the backlight and the color filter were actually prepared, and they were combined to obtain a color image display device. With respect to the obtained color image display device, in the same manner as the above Example 3, the transmittance spectrum of each color pixel sample, the emission spectrum of the backlight, and the NTSC ratio and the color temperature of the color image display device were measured, and at the same time, based on the results of measurement of the transmittance spectrum of each color pixel and the emission spectrum of the backlight, the chromaticity (x, y, Y) was calculated, and the results are shown in brackets at lower portions of the corresponding sections in Table 8.

TABLE 8

| Phosphor | | BSON + CASN | | |
|---|---|---|---|---|
| | Backlight | BL-5 | BL-5 | BL-5 |
| | Color filter | Ex. 7 | Ex. 8 | Ex. 9 |
| Red | x | 0.650 | 0.660 | 0.670 (0.668) |
| | y | 0.319 | 0.321 | 0.321 (0.320) |
| | Y | 25.0 | 24.1 | 23.0 (21.7) |
| Green | x | 0.236 | 0.224 | 0.202 (0.195) |
| | y | 0.630 | 0.650 | 0.680 (0.675) |
| | Y | 44.4 | 40.1 | 31.7 (31.7) |
| Blue | x | 0.150 | 0.141 | 0.141 (0.141) |
| | y | 0.127 | 0.093 | 0.090 (0.091) |
| | Y | 17.2 | 11.0 | 10.5 (11.0) |
| White | x | 0.309 | 0.314 | 0.314 (0.303) |
| | y | 0.305 | 0.295 | 0.278 (0.274) |
| | Y | 28.9 | 25.1 | 21.7 (21.5) |
| Color temperature (K) | | 6951 | 6731 | 6984 (8167) |
| NTSC ratio (%) | | 74 | 85 | 94 (93) |

From Table 8, it is evident that also in Examples 8 to 9, like in Examples 1 to 3, it is possible to accomplish a high light use efficiency as compared with a conventional case even at a high NTSC ratio.

Further, in Example 9, the simulation results and the results obtained by actual measurement were substantially the same, whereby it is considered reasonable to judge the properties such as the NTSC ratio and the light use efficiency of an actual color image display device from the simulation results.

Further in Example 9, the film thickness after drying the composition for each color filter actually prepared was 2.50 μm in each case, and thus, like in Example 3, it was confirmed that a good pattern is obtainable.

(5-4) Examples 10 to 12

Color image display devices of Examples 10 to 12 are prepared by combining the backlight (BL-6) shown in Preparation Example 6 and the color filters for Examples 10 to 12. With respect to these color image display devices, like in the above Examples 1 to 3, the chromaticity (x, y, Y) the NTSC ratio and the color temperature were obtained by calculation. The results are shown in Table 9.

TABLE 9

| Phosphor | | BSS2 + CASN2 | | |
|---|---|---|---|---|
| Backlight | | BL-6 | | |
| | Color filter | Ex. 10 | Ex. 11 | Ex. 12 |
| Red | x | 0.650 | 0.670 | 0.680 |
| | y | 0.321 | 0.320 | 0.318 |
| | Y | 28.2 | 26.4 | 24.9 |
| Green | x | 0.232 | 0.221 | 0.199 |
| | y | 0.615 | 0.640 | 0.670 |
| | Y | 54.2 | 49.5 | 38.9 |
| Blue | x | 0.138 | 0.135 | 0.135 |
| | y | 0.120 | 0.100 | 0.096 |
| | Y | 15.0 | 11.4 | 10.8 |
| White | x | 0.334 | 0.320 | 0.321 |
| | y | 0.346 | 0.319 | 0.300 |
| | Y | 31.3 | 29.1 | 24.9 |
| Color temperature (K) | | 5412 | 6147 | 6184 |
| NTSC ratio (%) | | 74 | 85 | 94 |

From Table 9, it is evident that also in Examples 10 to 12, like in Examples 1 to 3, it is possible to accomplish a high light use efficiency as compared with a conventional case even at a high STSC percentage.

INDUSTRIAL APPLICABILITY

According to the present invention, it is possible to provide a color image display device which is capable of accomplishing a high color reproducing property as an entire image by adjustment with a color filter without impairing the brightness of the image even with a LED backlight and without impairing the productivity in mounting by carrying out emission of red, green and blue by one chip and yet whereby adjustment of the white balance is easy, and thus its industrial applicability is extremely high in the field of e.g. compositions for color filters, the color filters, and color image display devices.

The entire disclosure of Japanese Patent Application No. 2006-116018 filed on Apr. 19, 2006 including specification, claims, drawings and summary is incorporated herein by reference in its entirety.

The invention claimed is:
1. A color image display device comprising:
a plurality of light shutters;
a color filter having color elements of at least three colors of red, green and blue corresponding to the light shutters; and
a backlight for transmission illumination,
wherein the backlight has a phosphor layer or a phosphor film, the phosphor layer or the phosphor film comprises a compound represented by formula (2B):

$$M1_x Ba_y M2_z L_u O_v N_w \qquad (2B),$$

where M1 is at least one activating element selected from the group consisting of Cr, Mn, Fe, Ce, Pr, Nd, Sm, Eu, Tb, Dy, Ho, Er, Tm and Yb, M2 is at least one bivalent metal element selected from the group consisting of Sr, Ca, Mg and Zn, L is a metal element selected from metal elements belonging to Groups 4 and 14 of the Periodic Table, and x, y, z, u, v and w are numerical values satisfying, respectively:

$0.00001 \leq x \leq 3$, $0 \leq y \leq 2.99999$, $2.6 \leq x+y+z \leq 3$, $0 < u \leq 11$, $8 < v < 25$, and $0 < w \leq 17$, and the compound represented by the formula (2B) is a green phosphor having an emission peak wavelength within a range of from 500 nm to 530 nm.

2. The color image display device according to claim 1, wherein each pixel of the color filter has a film thickness of from 0.5 μm to 3.5 μm.

3. The color image display device according to claim 1, wherein, in the formula (2B), M1 comprises Eu or Ce, M2 is at least one of Sr and Ca, L comprises Si, x satisfies $0.03 \leq x \leq 45$, y satisfies $1.2 \leq y \leq 2.95$, u satisfies $3 \leq u \leq 11$, v satisfies $9 < v < 13$, and w satisfies $0 < w < 10$.

4. The color image display device according to claim 3, wherein L is Si.

* * * * *

UNITED STATES PATENT AND TRADEMARK OFFICE
CERTIFICATE OF CORRECTION

PATENT NO. : 8,451,401 B2  
APPLICATION NO. : 12/297645  
DATED : May 28, 2013  
INVENTOR(S) : Shin Kawana et al.

Page 1 of 1

It is certified that error appears in the above-identified patent and that said Letters Patent is hereby corrected as shown below:

On the title page, Item (86), the Application Filing Date is incorrect. Item (86) should read:

--(86) PCT No.: PCT/JP2007/058546

§ 371 (c)(1),
(2), (4) Date: Apr. 1, 2009--

Signed and Sealed this
Thirtieth Day of July, 2013

Teresa Stanek Rea
*Acting Director of the United States Patent and Trademark Office*